(12) United States Patent
Park et al.

(10) Patent No.: US 11,564,285 B2
(45) Date of Patent: Jan. 24, 2023

(54) ELECTRONIC DEVICE FOR TRANSMITTING, TO COVER DEVICE, DATA ACQUIRED FROM EXTERNAL ELECTRONIC DEVICE, ON BASIS OF IDENTIFICATION INFORMATION OF COVER DEVICE, AND CONTROL METHOD

(71) Applicant: SAMSUNG ELECTRONICS CO., LTD., Suwon-si (KR)

(72) Inventors: Seo Yeon Park, Suwon-si (KR); Won Geun Shim, Suwon-si (KR); Yong Sang Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 337 days.

(21) Appl. No.: 16/770,209

(22) PCT Filed: Oct. 26, 2018

(86) PCT No.: PCT/KR2018/012848
§ 371 (c)(1),
(2) Date: Jun. 5, 2020

(87) PCT Pub. No.: WO2019/112174
PCT Pub. Date: Jun. 13, 2019

(65) Prior Publication Data
US 2020/0296794 A1    Sep. 17, 2020

(30) Foreign Application Priority Data
Dec. 6, 2017  (KR) .................. 10-2017-0166936

(51) Int. Cl.
*H04B 1/401* (2015.01)
*H04B 5/00* (2006.01)
(Continued)

(52) U.S. Cl.
CPC .............. *H04W 88/02* (2013.01); *G06F 8/65* (2013.01); *G06F 21/57* (2013.01); *H04B 1/401* (2013.01);
(Continued)

(58) Field of Classification Search
CPC . H02J 50/60; H04W 8/24; H04W 4/80; G06F 21/57; H04B 1/401
See application file for complete search history.

(56) References Cited

U.S. PATENT DOCUMENTS 9,128,796 B2    9/2015  Chitre et al.
9,577,716 B2 *  2/2017  Nambord ............. H04B 5/0031
(Continued)

FOREIGN PATENT DOCUMENTS

KR    10-2006-0090119    8/2006
KR       10-1453024     10/2014

OTHER PUBLICATIONS

International Search Report for PCT/KR2018/012848, dated Jan. 29, 2019, 4 pages.
(Continued)

Primary Examiner — Iqbal Zaidi
(74) Attorney, Agent, or Firm — Nixon & Vanderhye, P.C.

(57) ABSTRACT

An electronic device for transmitting, to a cover device, data acquired from an external electronic device, on the basis of identification information of the cover device, and a control method are disclosed. An electronic device according to various embodiments of the present document comprises: a housing; a first antenna and a second antenna which are accommodated in the housing; a first wireless communication circuit set to provide first wireless communication by using the first antenna; a second wireless communication circuit set to provide second wireless communication by
(Continued)

using the second antenna; and a control circuit accommodated in the housing and operably connected to the first wireless communication circuit and the second wireless communication circuit, wherein the control circuit detects coupling between a cover device, which can be coupled to one side of the electronic device, and the electronic device, and the cover device includes a third antenna and a third wireless communication circuit set to provide the first wireless communication by using the third antenna, and can be set to: acquire, through the first wireless communication circuit, identification information related to the cover device from the cover device at least on the basis of the detection; acquire, through the second wireless communication circuit, data corresponding to the identification information from an external electronic device; and transmit, through the first wireless communication circuit, the acquired data to the third wireless communication circuit included in the cover device.

12 Claims, 35 Drawing Sheets

(51) Int. Cl.
*H04W 8/24* (2009.01)
*H04W 88/02* (2009.01)
*H04W 4/80* (2018.01)
*G06F 8/65* (2018.01)
*G06F 21/57* (2013.01)

(52) U.S. Cl.
CPC ............ *H04B 5/0037* (2013.01); *H04W 4/80* (2018.02); *H04W 8/245* (2013.01)

(56) References Cited

U.S. PATENT DOCUMENTS

| | | |
|---|---|---|
| 2006/0069825 A1 | 3/2006 | Hodder |
| 2012/0117557 A1 | 5/2012 | Li |
| 2013/0309966 A1 | 11/2013 | Aldana et al. |
| 2015/0028999 A1* | 1/2015 | Roskosch .......... G06K 7/10356 |
| | | 340/10.1 |
| 2015/0180525 A1 | 6/2015 | Chen |
| 2016/0028430 A1 | 1/2016 | Crawford et al. |
| 2017/0140590 A1* | 5/2017 | Nishiyama ............... G07C 9/28 |

OTHER PUBLICATIONS

Written Opinion of the ISA for PCT/KR2018/012848, dated Jan. 29, 2019, 7 pages.

* cited by examiner

ELECTRONIC DEVICE FOR TRANSMITTING, TO COVER DEVICE, DATA ACQUIRED FROM EXTERNAL ELECTRONIC DEVICE, ON BASIS OF IDENTIFICATION INFORMATION OF COVER DEVICE, AND CONTROL METHOD

This application is the U.S. national phase of International Application No. PCT/KR2018/012848 filed 26 Oct. 2018, which designated the U.S. and claims priority to KR Patent Application No. 10-2017-0166936 filed 6 Dec. 2017, the entire contents of each of which are hereby incorporated by reference.

BACKGROUND

1. Field

The disclosure relates to an electronic device configured to transmit data acquired from an external electronic device to a cover device, based on identification information of the cover device, and a method for controlling the same.

2. Description of Related Art

In line with recent development of cover devices, recently provided cover devices can not only protect electronic devices from external impacts, but can also support (in other words, assist) various functions (in others, actions) provided by the electronic devices while being electrically connected to the electronic devices. For example, when a call event (for example, receiving a telephone call) has occurred while a cover device is connected to an electronic device, the cover device displays an interface that indicates occurrence of the call event via the display provided in the cover device such that the user can recognize occurrence of the call event via the cover device. As such, cover devices are provided not only simply as physical tools, but also to be able to perform functions as individual electronic devices.

SUMMARY

A cover device may include various devices, such as a processor, a communication module, or a memory, in order to provide various functions to the user while being connected to an electronic device. The cover device may have a program stored therein so as to control various devices constituting the cover device. The program (for example, firmware) stored in the cover device may need to be updated periodically or aperiodically.

The user of an electronic device (for example, smartphone) may use a designated application program (the term "application program", as used herein, may be simply referred to as "application") in order to control the cover device. The designated application may need to be activated when the cover device is connected to the electronic device.

According to various embodiments of the disclosure, an electronic device is provided, wherein when a cover device is connected to the electronic device, data can be transmitted to the cover device by using short-range wireless communication.

According to various embodiments of the disclosure, an electronic device is provided, wherein when a cover device is connected to the electronic device, data and power can be transmitted to the cover device by using short-range wireless communication.

According to various embodiments of the disclosure, a cover device is provided, wherein when the cover device is connected to an electronic device, data related to an update of a program of the cover device (for example, control circuit of the cover device) can be received from the electronic device by using short-range wireless communication, and the program of the cover device can then be updated.

An electronic device according to various embodiments of the disclosure may include: a housing; a first antenna and a second antenna housed in the housing; a first wireless communication circuit configured to provide first wireless communication by using the first antenna; a second wireless communication circuit configured to provide second wireless communication by using the second antenna; and a control circuit housed in the housing and operably connected to the first wireless communication circuit and the second wireless communication circuit. The control circuit may be configured to: detect coupling between a cover device that can be coupled to a surface of the electronic device and the electronic device, the cover device including a third antenna and a third wireless communication circuit configured to provide the first wireless communication by using the third antenna; acquire identification information related to the cover device from the cover device via the first wireless communication circuit, at least based on the detection; acquire data corresponding to the identification information from an external electronic device via the second wireless communication circuit; and transmit the data to the third wireless communication circuit included in the cover device via the first wireless communication circuit.

An electronic device according to various embodiments of the disclosure may include: a first antenna configured to provide short-range wireless communication; a second antenna configured to provide long-range wireless communication; a first wireless communication circuit configured to perform communication with a first external electronic device by using the first antenna; a second wireless communication circuit configured to perform communication with a second external electronic device by using the second antenna; and a control circuit operably connected to the first wireless communication circuit and the second wireless communication circuit. The control circuit may be configured to: detect connection of the first external electronic device with the electronic device via the first wireless communication circuit; acquire identification information related to the first external electronic device from the first external electronic device via the first wireless communication circuit, at least based on the detection; acquire data corresponding to the identification information from the second external electronic device via the second wireless communication circuit; and transmit power for driving the first external electronic device and the data to the first external electronic device via the first wireless communication circuit.

An electronic device according to various embodiments of the disclosure may include: a housing; an antenna housed in the housing; a wireless communication circuit configured to provide wireless communication by using the antenna; and a control circuit operably connected to the wireless communication circuit. The control circuit may be configured to: acquire power from an external electronic device coupled to a surface of the electronic device, via the wireless communication circuit; receive data transmitted from the external electronic device via the wireless communication circuit while the wireless communication circuit and the control circuit are driven based on the acquired power; and update a program of the electronic device by using the received data.

According to various embodiments of the disclosure, data may be transmitted to a cover device by using short-range wireless communication, while the cover device and an electronic device are connected, thereby updating a program of the cover device.

According to various embodiments of the disclosure, power may be provided to the cover device by using short-range wireless communication.

According to various embodiments of the disclosure, an inactivated application may be activated and provided to the user, according to connection of the cover device.

It is obvious to a person skilled in the art that advantageous effects of various embodiments of the disclosure are not limited to the above-described effects, and various effects are incorporated in the disclosure.

DETAILED DESCRIPTION

In the disclosure, terms including ordinal numbers, such as first and second, may be used to describe various components, but the components are not limited by the terms. The terms are solely used for the purpose of distinguishing one component from another. For example, a first component may be referred to as a second component without deviating from the scope of the disclosure, and the second component may be similarly referred to as the first component. In addition, the term "and/or" may include a combination of multiple relevant described items, or one of multiple relevant described items.

Figure 1A:
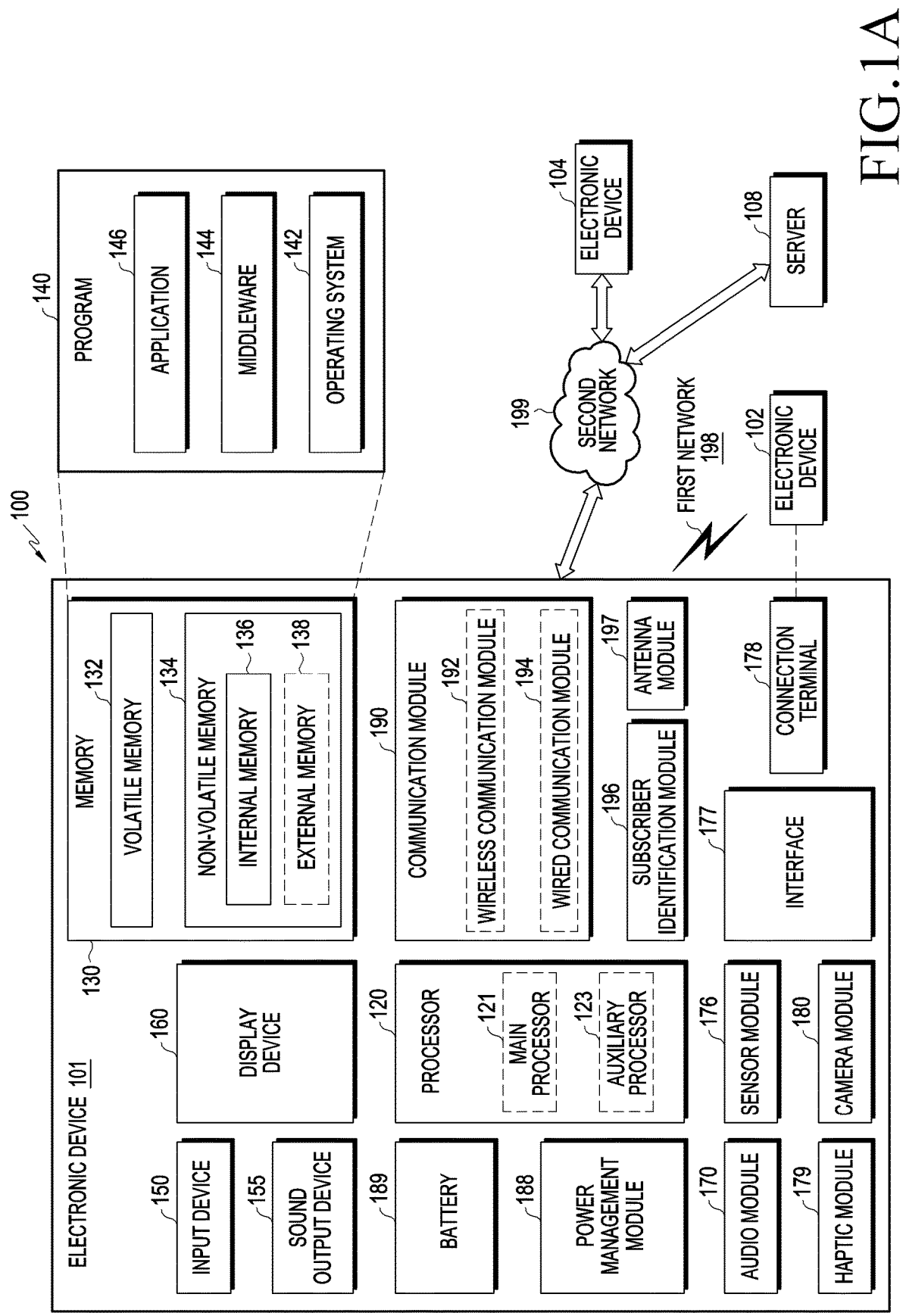
FIG. 1A is a block diagram illustrating an electronic device inside a network environment according to various embodiments.

FIG. 1A is a block diagram illustrating an electronic device 101 in a network environment 100 according to various embodiments.

Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit or an application processor), and an auxiliary processor 123 (e.g., a graphics processing unit, an image signal processor, a sensor hub processor, or a communication processor) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a pen input device (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a SD card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images.

According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or WAN). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to various embodiments of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 1B:
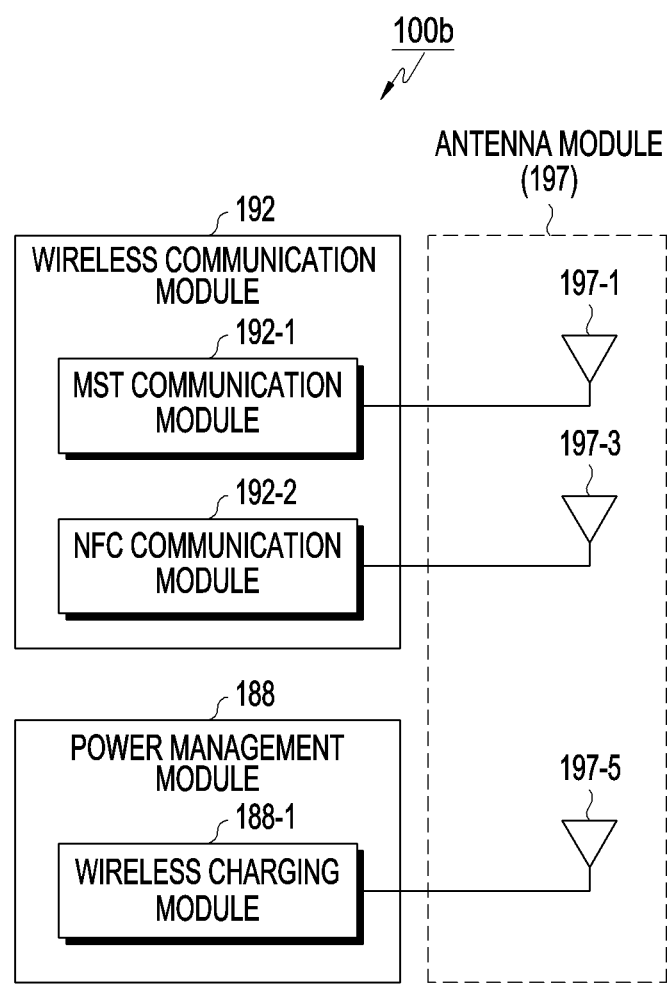
FIG. 1B is a block diagram regarding a wireless communication module, a power management module, and an antenna module of an electronic device according to various embodiments.

FIG. 1B is a block diagram 100b illustrating the wireless communication module 192, the power management module 188, and the antenna module 197 of the electronic device 101 according to various embodiments. Referring to FIG. 1B, the wireless communication module 192 may include a MST communication module 192-1 or a NFC communication module 192-2, and the power management module 188 may include a wireless charging module 188-1. In such a case, the antenna module 197 may separately include a plurality of antennas that include a MST antenna 197-1 connected with the MST communication module 192-1, a NFC antenna 197-3 connected with the NFC communication module 192-2, and a wireless charging antenna 197-5 connected with the wireless charging module 188-1. For ease of description, the same components as those described in regard to FIG. 1A are briefly described or omitted from the description.

The MST communication module 192-1 may receive a signal (for example, a signal containing control information or payment information) from the processor 120, generate a magnetic signal corresponding to the received signal, and then transfer the generated magnetic signal to the external electronic device 102 (e.g., a POS device) via the MST antenna 197-1. According to an embodiment, the MST communication module 192-1 may include, for example, a switching module (not shown) that includes one or more switches connected with the MST antenna 197-1, and control the switching module to change the direction of voltage or current supplied to the MST antenna 197-1. The change of the direction of the voltage or current allows the direction of the magnetic signal (e.g., a magnetic field) emitted from the MST antenna 197-1 and transferred to the external electronic device 101 via wireless shot-range communication 198, for example, to change accordingly. The magnetic signal transferred with its direction changing may cause a form and an effect similar to those of a magnetic field that is generated when a magnetic card is swiped through a card reader of the electronic device 102. According to an embodiment, for example, payment-related information and a control signal that are received by the electronic device 102 in the form of the magnetic signal may be further transmitted to a payment server (e.g., a server 108) via the network 199.

The NFC communication module 192-2 may obtain a signal (e.g., a signal containing control information or payment information) from the processor 120 and transmit the obtained signal to the external electronic device 102 via the NFC antenna 197-3. According to an embodiment, the NFC communication module 192-2 may receive a signal (e.g., a signal containing control information or payment information) transmitted from the external electronic device 102 via the NFC antenna 197-3.

The wireless charging module 188-1 may wirelessly transmit power to the external electronic device 102 (e.g., a cellular phone or wearable device) via the wireless charging antenna 197-5, or wirelessly receive power from the external electronic device 102 (e.g., a wireless charging device). The wireless charging module 188-1 may support various wireless charging schemes including, for example, a magnetic resonance scheme or a magnetic induction scheme.

According to an embodiment, some of the MST antenna 197-1, the NFC antenna 197-3, or the wireless charging antenna 197-5 may share at least part of their radiators. For example, the radiator of the MST antenna 197-1 may be used as the radiator of the NFC antenna 197-3 or the wireless charging antenna 197-5, or vice versa. When the MST antenna 197-1, the NFC antenna 197-3, or the wireless charging antenna 197-5 shares at least a partial area of the radiator thereof, [In such a case] the antenna module 197 may include a switching circuit (not shown) adapted to selectively connect or disconnect (e.g. open) at least part of the antennas 197-1, 197-3, or 197-5 under the control of the wireless communication module 192 (e.g., the MST communication module 192-1 or the NFC communication module 192-2) or the power management module (e.g., the wireless charging module 188-1). For example, when the electronic device 101 uses a wireless charging function, the NFC communication module 192-2 or the wireless charging module 188-1 may control the switching circuit to temporarily disconnect at least a partial area of the radiators shared by the NFC antenna 197-3 and the wireless charging antenna 197-5 from the NFC antenna 197-3 and to connect the at least partial area of the radiators with the wireless charging antenna 197-5.

According to an embodiment, at least one function of the MST communication module 192-1, the NFC communication module 192-2, or the wireless charging module 188-1 may be controlled by an external processor (e.g., the processor 120). According to an embodiment, at least one specified function (e.g., a payment function) of the MST communication module 192-1 or the NFC communication module 192-2 may be performed in a trusted execution environment (TEE). According to various embodiments, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

Figure 2:
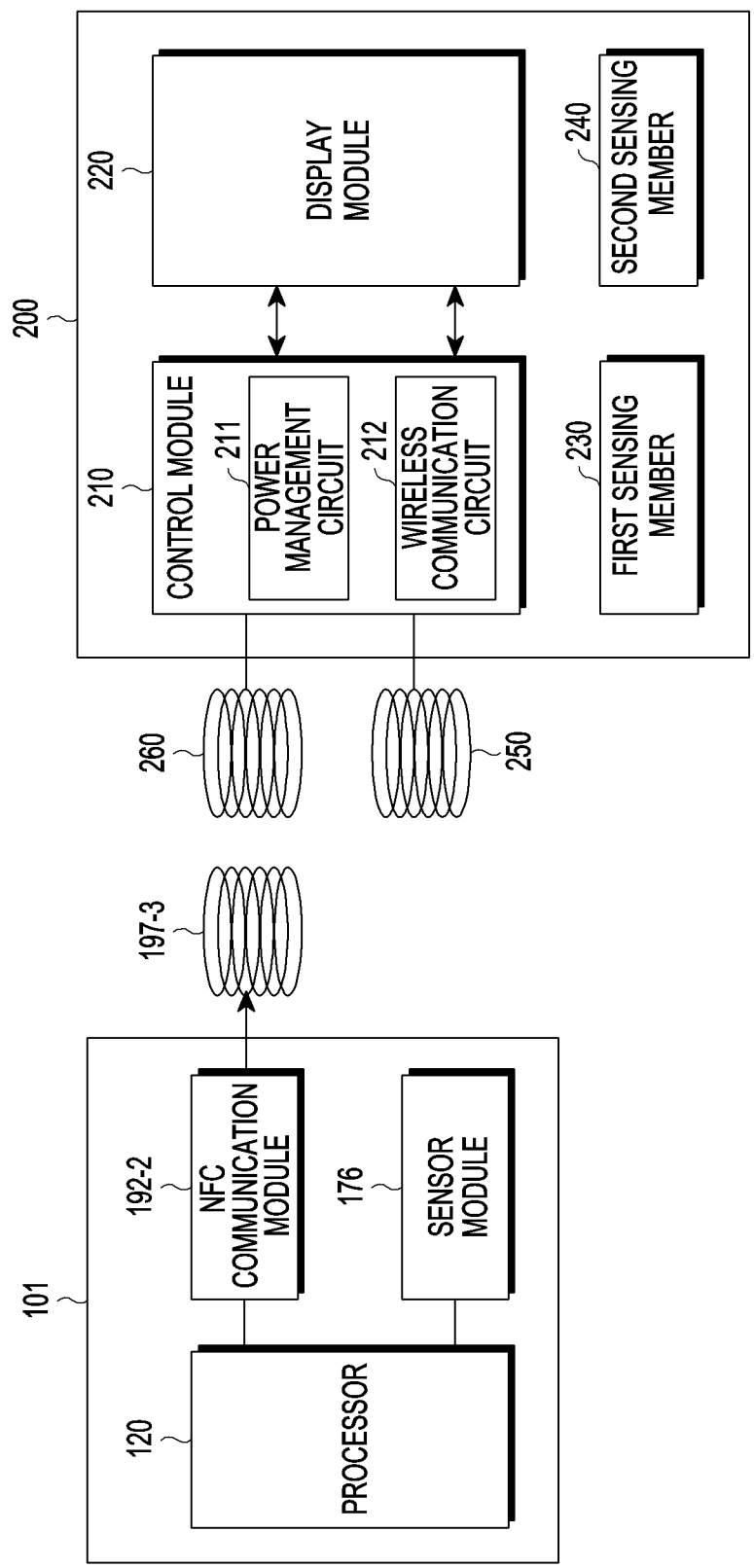
FIG. 2 is an exemplary diagram for describing an electronic device and a cover device according to various embodiments.

FIG. 2 is an exemplary diagram for describing an electronic device and a cover device according to various embodiments.

Referring to FIG. 2, the electronic device 101 according to various embodiments of the disclosure may include an NFC communication module 192-2, a processor 120, a sensor module 176, and an NFC antenna 197-3.

The NFC communication module 192-2 according to various embodiments of the disclosure may transmit/receive signals between a cover device 200 or an external electronic device (e.g., electronic device 102 or 104 in FIG. 1A) by using a short-range wireless communication protocol (for example, an NFC protocol or a non-standard protocol using at least a part of the NFC protocol). For example, the NFC communication module 192-2 according to various embodiments of the disclosure may transmit, in response to occurrence of an event, a radio frequency signal including power for operating in a first operating mode (for example, reader mode) for a designated time period and activating the cover device 200 (in other words, entering an operable state) and data corresponding to the event, to the cover device 200. The event according to various embodiments of the disclosure may include various events, such as call reception, text message reception, a power key input, playing music, alarm, schedule, or timer expiration. The event according to various embodiments of the disclosure may include an event for updating a program (for example, firmware) stored in the memory of the cover device, or an event for authenticating the cover device 200.

As used herein, the term "mode", "configuring in a specific mode", or "switching to a specific mode" is mentioned, for convenience of description, in connection with various functions/operations performed according to various embodiments of the disclosure. That is, the term "mode" as used herein refers to a state itself in which a specific function/functions or an operation/operations are performed. Accordingly, the term "configuring a specific mode" simply means a change to a state in which a function/functions or an operation/operations can be performed according to a specific mode (in other words, configuring such an environment), and does not necessarily mean that an input (for example, user input) for "configuring a specific mode" or "switching to a specific mode" is necessary or that specific hardware and/or software needs to be changed.

The NFC communication module 192-2 according to various embodiments of the disclosure may transmit an authentication request signal including power to the cover device 200 via the NFC antenna 197-3, in order to request authentication with the cover device 200. The electronic device 101 according to various embodiments of the disclosure may receive a response to the authentication request signal transmitted to the cover device 200 from the cover device 200.

According to various embodiments of the disclosure, the amount of power transmitted to the cover device 200 to activate the cover device 200 and the amount of power transmitted to the cover device 200 together with the authentication request signal may be identical to or different from each other. According to various embodiments of the disclosure, the bands of one or more frequencies used during short-range communication between the electronic device 101 and the cover device 200 may be identical to or different from each other.

The NFC communication module 192-2 according to various embodiments of the disclosure may be operably connected to a processor for processing data transmitted/received via the NFC communication module 192-2. The NFC communication module 192-2 may receive a command for detecting the existence of an external electronic device (for example, electronic device 102 or 104 in FIG. 1A) from the processor 120 for a first time period (in other words, while operating in a first operating mode). The NFC communication module 192-2 according to various embodiments of the disclosure may transmit a detection request signal for detection of an external electronic device to the cover device 200 according to the command from the processor 120. According to various embodiments of the disclosure, if no response signal is received from the cover device 200 for a designated time, or if a response signal including error data (e.g., bit data such as 1 (false)) is received, the NFC communication module 192-2 according to various embodiments of the disclosure may transmit a response to the command to the processor 120. The NFC communication module 192-2 according to various embodiments of the disclosure may determine, if no response signal is received from the cover device 200 for a designated time, or if a response signal including error data is received, that no external electronic device exists near the electronic device 101 or the cover device 200. If it is determined that an external electronic device exists, the NFC communication module 192-2 according to various embodiments of the disclosure may transmit a response indicating existence of the external electronic device to the processor 120. If an external electronic device exists, the processor 120 according to various embodiments of the disclosure may control the NFC communication module 192-2 such that the NFC communication module 192-2 operates in a second operating mode (for example, card mode) for a second time period.

While operating in the first operating mode, the NFC communication module 192-2 according to various embodiments of the disclosure may suspend transmitting a radio frequency signal from the electronic device 101 to the cover device 200 and may determine whether or not an external electronic device exists. According to various embodiments of the disclosure, if it is determined that an external electronic device exists, the NFC communication module 192-2 may transmit a signal indicating existence of the external electronic device to the processor 120. The processor 120 according to various embodiments of the disclosure may control the NFC communication module 192-2 such that the NFC communication module 192-2 operates in a second operating mode for a second time period. For example, if a data request signal is received from the external electronic device, the NFC communication module 192-2 according to various embodiments of the disclosure may transmit a response signal to the data request signal to the external electronic device. If the data request signal includes power, the NFC communication module 192-2 according to various embodiments of the disclosure may transmit a response to the data request signal to the external electronic device by using the received power. If the data request signal includes insufficient power, the NFC communication module 192-2 according to various embodiments of the disclosure may transmit a response to the data request signal to the external electronic device by using power in the electronic device 101. If the operation with the NFC communication module 192-2 and the external electronic device is completed, the processor 120 according to various embodiments of the disclosure may control the NFC communication module 192-2 so as to switch the operating mode of the NFC communication module 192-2 to a standby mode (in other words, search mode) or to the first operating mode.

The NFC communication module 192-2 according to various embodiments of the disclosure may transmit an event checkup signal for checking for an occurrence of an event in the cover device 200 periodically to the cover device 200 via the NFC antenna 197-3. The NFC communication module 192-2 according to various embodiments of the disclosure may receive a radio-frequency signal from the cover device 400 as a response to the event checkup signal.

The processor 120 according to various embodiments of the disclosure may drive the operating system or an application program so as to control multiple hardware or software components connected to the processor 120 and to perform various kinds of data processing and computation. The processor 120 according to various embodiments of the disclosure may be implemented as a system-on-chip (SoC). The processor 120 according to various embodiments of the disclosure may further include a graphic user interface (GPU) and/or an image signal processor.

If a sensing signal is received from the sensor module 176 configured to sense a first sensing member 230 as a result of sensing the electronic device 101 fastened to the cover device 200, the processor 120 according to various embodiments of the disclosure may transmit an authentication request signal including power for performing authentication with the cover device 200 to the cover device 200 via the NFC communication module 192-2. According to various embodiments of the disclosure, authentication with the cover device 200 may include legitimate product authentication for determining whether or not the cover device 200 is a legitimate product. The power included in the authentication request signal according to various embodiments of the disclosure may have an amount of power used to perform authentication between the electronic device 101 and the cover device 200. According to various embodiments of the disclosure, the authentication operation may be performed periodically or aperiodically (e.g., when a designated event (e.g., coupling of the electronic device 101 to the cover device 200, charging of the electronic device 101, powering on/off of the electronic device 101, or the like) is detected).

The processor 120 according to various embodiments of the disclosure may perform authentication with the cover device 200 if an authentication response signal is received from the cover device 200 in response to the authentication request signal. According to various embodiments of the disclosure, if the cover device 200 is acceptable (in other words, if the same is a legitimate product), the processor 120 according to various embodiments of the disclosure may determine whether the front cover portion of the cover device 200 is in an open state or a closed state. The processor 120 according to various embodiments of the disclosure may sense a second sensing member 240 provided on at least a part of the front cover portion of the cover device 200 via the sensor module 176, may determine that the front cover portion is in a closed state if the second sensing member 240 is sensed, and may determine that the front cover portion is in an open state if the second sensing member 240 is not sensed. The processor 120 according to various embodiments of the disclosure may determine, if the front cover portion is in a closed state, whether or not an event for supplying first power to the cover device 200 occurs.

According to various embodiments of the disclosure, if the front cover portion of the cover device 200 is in the closed state, the electronic device 101 may switch to a standby mode. The standby mode according to various embodiments of the disclosure may refer to an operating mode needed by the electronic device 101 to perform at least one of an operation for detecting an event such as call reception, message reception, or the like, an operation for determining the open/closed state of the front cover portion of the cover device 200, an operation for sensing attachment/detachment of the rear cover portion of the cover device 200, and an operation for sensing existence of an external electronic device.

If an event such as call reception occurs while the front cover portion of the cover device 200 is in the closed state, the processor 120 according to various embodiments of the disclosure may control the NFC communication module 192-2 so as to operate in a first operating mode for a first time period. The processor 120 according to various embodiments of the disclosure may transmit a radio-frequency signal including power for activating the cover device 200 and data to the cover device 200 via the NFC communication module 192-2. According to various embodiments of the disclosure, the power included in the radio-frequency signal transmitted from the electronic device 101 to the cover device 200 may include an amount of power used by the cover device 200 to perform an operation related to the occurred event. The data according to various embodiments of the disclosure may include data used to perform an operation corresponding to the event. For example, if a message is received, the processor 120 may transmit a radio-frequency signal including data for indicating message reception (e.g., message content, reception number, or the like) and power used to display data for indicating message reception (e.g., power for activating the cover device 200), to the cover device 200. The cover device 200 according to various embodiments of the disclosure may be driven by using the received power. The cover device 200 according to various embodiments of the disclosure may display data related to message reception by using the power. The processor 120 according to various embodiments of the disclosure may determine whether or not a response event regarding the occurred event occurs within a designated time after transmission of the radio-frequency signal to the cover device 200.

If it is determined that the front cover portion of the cover device 200 according to various embodiments of the disclosure is in an open state, the processor 120 according to various embodiments of the disclosure may drive the display device 160 (e.g., display) of the electronic device 101 so as to display data related to the occurred event via the display device 160. The processor 120 according to various embodiments of the disclosure may display a screen, such as a locked screen or a standby screen, on which event-related information is displayed, via the display.

According to various embodiments of the disclosure, if the open state of the front cover portion of the cover device 200 is not sensed, the processor 120 may retransmit a radio-frequency signal to the cover device 200 via the NFC antenna 197-3 a designated number of times or periodically. Accordingly, the cover device 200 according to various embodiments of the disclosure may periodically display data related to the detected event on the display module 220 of the cover device 200 such that the user recognizes event that occurred in the electronic device 101.

If the occurred event requires a response from the cover device 200, the processor 120 according to various embodiments of the disclosure may periodically transmit an event checkup signal for checking for an occurrence of a response event in the cover device 200 to the cover device 200 via the NFC communication module 192-2. The event checkup signal according to various embodiments of the disclosure may include a polling signal. The response event in the cover device 200 according to various embodiments of the disclosure may include various input events including a key input, a touch, a hovering, a drag, a swipe, and a combination thereof.

If a radio-frequency signal is received from the cover device 200 as a response signal regarding the occurred event, the processor 120 according to various embodiments of the disclosure may perform an operation (in other words, function) corresponding to the received second radio-frequency signal. According to various embodiments of the disclosure, the response signal may include a signal resulting from an input including a key input, a touch, a hovering, a drag, a swipe, and a combination thereof. For example, if a response signal that accepts or refuses call reception is received in response to occurrence of a call reception event, the processor 120 according to various embodiments of the disclosure may allow or refuse the call reception.

Various operations or functions performed by the NFC communication module 192-2 according to various embodiments of the disclosure may be controlled by the processor 120 to be performed by the communication module (e.g., communication module 190) of the electronic device 101.

According to various embodiments of the disclosure, in order to prevent degradation of NFC performance of the electronic device 101 when the cover device 200 is coupled to the electronic device 101, the processor 120 may configure a first program for controlling the NFC communication module 192-2 while the electronic device 101 is not coupled to the cover device 200 and a second program for controlling the NFC communication module 192-2 while the electronic device 101 is coupled to the cover device 200 (e.g., store the programs in the memory (e.g. memory 130 in FIG. 1A)). According to various embodiments of the disclosure, if the cover device 200 is not fastened to the electronic device 101, the processor 120 may perform an operation with the cover device 200 by using the first program. According to various embodiments of the disclosure, if the cover device 200 is coupled to the electronic device 101, the processor 120 may perform an operation with the cover device 200 by using the second program.

The sensor module 176 according to various embodiments of the disclosure may include at least one sensor for sensing whether or not the electronic device 101 is coupled to the cover device 200 and whether the front cover portion of the cover device 200 is opened or closed.

The sensor module 176 according to various embodiments of the disclosure may sense whether or not the cover device 200 is coupled to the electronic device 101 and, upon sensing that the cover device 200 is coupled to the electronic device 101, may transmit a signal related to the sensing to the processor 120. The sensor module 176 according to various embodiments of the disclosure may be positioned to correspond to the first sensing member 230 used to sense whether or not the electronic device 101 is mounted on the cover device 200. The first sensing member 230 according to various embodiments of the disclosure may include a magnetic body or a magnetic material, which has magnetic characteristics, a contact protrusion, or the like. When the first sensing member 230 according to various embodiments of the disclosure is configured with a magnetic body or a magnetic material, the sensor module 176 according to various embodiments of the disclosure may include a sensor (e.g., Hall sensor) capable of sensing the magnetic body or the magnetic material. When the first sensing member 230 according to various embodiments of the disclosure is configured with a contact protrusion, the sensor module 176 according to various embodiments of the disclosure may include a sensor (e.g., touch-sensitive sensor) capable of sensing a contact of the contact protrusion.

The sensor module 176 according to various embodiments of the disclosure may sense whether the front cover portion of the cover device 200 is open or closed and, upon sensing the opening of the front cover portion, may transmit a sensing signal to the processor 120. The sensor module 176 according to various embodiments of the disclosure may be positioned to correspond to a second sensing member 240 used to sense whether the front cover portion of the cover device 200 is open or closed. The second sensing member 240 according to various embodiments of the disclosure may include a magnetic body or a magnetic material, which has magnetic characteristics, a contact protrusion, or the like. When the second sensing member 240 according to various embodiments of the disclosure is configured with a magnetic body or a magnetic material, the sensor module 176 according to various embodiments of the disclosure may include a sensor capable of sensing the magnetic body or the magnetic material. When the second sensing member 240 according to various embodiments of the disclosure is configured with a contact protrusion, the sensor module 176 according to various embodiments of the disclosure may include a sensor capable of sensing a contact of the contact protrusion.

The NFC antenna 197-3 according to various embodiments of the disclosure may transmit a radio-frequency signal to the cover device 200 and may send an event checkup signal for identifying occurrence of an event in the cover device 200. The NFC antenna 197-3 according to various embodiments of the disclosure may receive a radio-frequency signal including a response to the event checkup signal from the cover device 200. The NFC antenna 197-3 according to various embodiments of the disclosure may be modified and implemented in a form appropriate for the electronic device 101. The NFC antenna 197-3 according to various embodiments of the disclosure may be implemented in an annular shape. According to various embodiments of the disclosure, the radio-frequency signal transmitted from the electronic device 101 to the cover device 200 and the radio-frequency signal transmitted from the cover device 200 to the electronic device 100 may have an identical frequency range (e.g., frequency range of 10 MHz to 14.99 MHz) or different frequency ranges.

While transmitting a radio-frequency signal to the cover device 200, the NFC antenna 197-3 according to various embodiments of the disclosure may transmit (or broadcast) a search signal for searching for an external electronic device and may receive a response signal from a detected external electronic device.

The cover device 200 according to various embodiments of the disclosure may include a control module 210, a display module 220, a first sensing member 230, a second sensing member 240, a first antenna 250, and a second antenna 260. According to various embodiments of the disclosure, the second antenna 260 may be omitted in the process of manufacturing the cover device 200 and then manufactured. For example, the cover device 200 may use the first antenna 250 so as to perform a function/functions or an operation/operations performed by the second antenna 260. According to various embodiments of the disclosure, at least one function or operation performed by the first antenna 250 and at least one function or operation performed by the second antenna 260 may be shared with each other. For example, at least one function or operation performed by the first antenna 250 may be performed by the second antenna 260, and at least one function or operation performed by the second antenna 260 may be performed by the first antenna 250.

If the electronic device 101 and the cover device 200 are coupled, the control module 210 according to various embodiments of the disclosure may receive an authentication request signal for authentication between the electronic device 100 and the cover device 200 from the electronic device 101 via the first antenna 250. In response to the authentication request signal, the control module 210 according to various embodiments of the disclosure may transmit an authentication response signal to the electronic device 101 via the first antenna 250 and may perform authentication between the electronic device 101 and the cover device 200.

If a first radio-frequency signal is received from the electronic device 101, the control module 210 according to various embodiments of the disclosure may determine whether or not to operate the display module 220 based on data included in the received first radio-frequency signal. At least partially based on the determination regarding whether or not to operate the display module 220, the control module 210 according to various embodiments of the disclosure may operate the display module 220 by using power included in the received first radio-frequency signal and may display data included in the first radio-frequency signal via the display module 220.

If a first radio-frequency signal is received via the first antenna 250 and the second antenna 260, the control module 210 according to various embodiments of the disclosure may transmit power included in the first radio-frequency signal to the display module 220. The control module 210 according to various embodiments of the disclosure may control the display module 220 such that information related to data received from the electronic device 101 is displayed via the display module 220.

The control module 210 according to various embodiments of the disclosure may receive an event checkup signal for checking for an occurrence of an event in the cover device 200 from the electronic device 101 via the first antenna 250 periodically or aperiodically. If no event is detected, the control module 210 according to various embodiments of the disclosure may produce a radio-frequency signal including information indicating that no event is detected, in response to the received event checkup signal. The control module 210 according to various embodiments of the disclosure may transmit the produced radio-frequency signal to the electronic device 101 via the first antenna 250. If occurrence of an event is detected, the control module 210 according to various embodiments of the disclosure may transmit a radio-frequency signal including data following the occurred event to the electronic device 101 via the first antenna 250.

The control module 210 according to various embodiments of the disclosure may include a power management circuit 211 and a wireless communication circuit 220. According to various embodiments of the disclosure the wireless communication circuit 212 may include an NFC module. According to various embodiments of the disclosure, the power management circuit 211 and the wireless communication circuit 212 may be configured as separate modules.

The power management circuit 221 according to various embodiments of the disclosure may receive (in other words, acquire) power included in the radio-frequency signal transmitted from the electronic device 101 by using at least one of the first antenna 250 or the second antenna 260. The wireless communication circuit 212 according to various embodiments of the disclosure may receive (in other words, acquire) data included in the first radio-frequency signal from the electronic device 101 via the first antenna 250. According to various embodiments of the disclosure, if the occurred event is call reception, the wireless communication circuit 212 may receive data related to the call reception (e.g., interface information indicating call reception) from the electronic device 101. As the electronic device 101 is mounted on the cover device 200, the wireless communication circuit 212 according to various embodiments of the disclosure may receive an authentication request signal from the electronic device 101 via the first antenna 250. The wireless communication circuit 212 according to various embodiments of the disclosure may transmit an authentication response signal to the electronic device 101 in response to the authentication request signal and perform authentication with the electronic device 101.

The control module 210 according to various embodiments of the disclosure may transmit a control signal to the power management circuit 211 so as to supply power to the display module 220. The power management circuit 211 according to various embodiments of the disclosure may transmit first power to the display module 220 according to the control signal from the control module 210. If power is supplied to the display module 220 according to various embodiments of the disclosure, the control module 210 according to various embodiments of the disclosure may transmit data to the display module 220 such that the display module 220 displays information related to the data by using the data.

The wireless communication circuit 212 according to various embodiments of the disclosure may receive an event checkup signal from the electronic device 101 via the first antenna 250 periodically or aperiodically and may transmit the same to the display module 220. The wireless communication circuit 212 according to various embodiments of the disclosure may receive a radio-frequency signal to be transmitted to the electronic device 101 or a signal corresponding to the radio-frequency signal from the display module 220 in response to transmission of the event checkup signal. In response to receiving a signal (e.g., a radio-frequency signal or a signal corresponding to the radio-frequency signal) transmitted from the display module 220, the wireless communication circuit 212 according to various embodiments of the disclosure may transmit the radio-frequency signal to the electronic device 101 via the first antenna 250. According to various embodiments of the disclosure, the event checkup signal may include a polling signal. According to various embodiments of the disclosure, the radio-frequency signal may include data indicating whether or not an event has occurred or, if an event has occurred, input data that has been input according to the occurred event.

The display module 220 according to various embodiments of the disclosure may be driven by power received from the power management circuit 211. The display module 220 according to various embodiments of the disclosure may operate based on data received from the wireless communication circuit 212. The display module 220 according to various embodiments of the disclosure may display information regarding an event by using data (e.g., a character, a number, a special character, a emoticon, or the like) transmitted from the electronic device 101, or may display information that reflects at least one of a dimming effect, an animation effect, and an upward/downward/leftward/rightward movement effect. According to various embodiments of the disclosure, the data may include data regarding at least one of an image for the display, an effect applied to the image, and the time to display the image. The display module 220 according to various embodiments of the disclosure may include multiple light-emitting elements. The light-emitting elements according to various embodiments of the disclosure may be provided on the display module 220 in various types (e.g., matrix type). The light-emitting elements according to various embodiments of the disclosure may include at least one of an LED, an OLED, an electrophoretic display (EPD), an LCD, and electronic ink (E-ink). The display module 220 according to various embodiments of the disclosure may have an input device configured to receive user input data following occurrence of a user input event. The input device according to various embodiments of the disclosure may include at least one of a touch panel, a (digital) pen sensor, a key, and an ultrasonic input device, for example. If an event checkup signal is received from the electronic device 101, the display module 220 according to various embodiments of the disclosure may check whether or not an input event has occurred. If occurrence of an input event has been detected, the display module 220 according to various embodiments of the disclosure may transmit data regarding the input event to the wireless communication circuit 212. According to various embodiments of the disclosure, the input data may include an acceptance input regarding the event (e.g., call reception) that occurred in the electronic device 101 or a refusal input.

The first sensing member 230 according to various embodiments of the disclosure may sense whether or not the cover device 200 is fastened to the electronic device 101. The first sensing member 230 according to various embodiments of the disclosure may be positioned to correspond to the sensor module 176.

The second sensing member 240 according to various embodiments of the disclosure may sense whether the front cover portion of the cover device 200 is opened or closed. The second sensing member 240 according to various embodiments of the disclosure may be positioned to correspond to the sensor module 176.

The first antenna 250 according to various embodiments of the disclosure may receive an authentication request signal for performing authentication between the electronic device 101 and the cover device 200 from the electronic device 101. The first antenna 250 according to various embodiments of the disclosure may transmit an authentication response signal to the electronic device 101 in response to the authentication request signal. The first antenna 250 according to various embodiments of the disclosure may receive a radio-frequency signal from the electronic device 101 and may transmit a radio-frequency signal including a response regarding occurrence of an event in the cover device 200 (e.g., whether or not the cover device 200 has performed an operation following the occurred (or detected) event) or a response regarding event detection (e.g., whether or not the cover device 200 has detected a user input such as the user's touch input) to the electronic device 101. The first antenna 250 according to various embodiments of the disclosure may operate based on a frequency band (e.g., 10 MHz to 14.99 MHz) identical to the resonance frequency of the NFC antenna 197-3 of the electronic device 101.

The cover device 200 according to various embodiments of the disclosure may receive a first radio-frequency signal from the electronic device 101 by using the second antenna 260. The second antenna 260 according to various embodiments of the disclosure may be modified and configured in a type which is identical to the NFC antenna 197-3 of the electronic device 101, or which is appropriate for the cover device 200. According to various embodiments of the disclosure, the second antenna 260 may be configured in an annular shape. The second antenna 260 according to various embodiments of the disclosure may be configured in a specific frequency band so as to minimize resonance frequency shifting due to coupling with the NFC antenna 197-3 of the electronic device 101 during coupling between the electronic device 101 and the cover device 200. According to various embodiments of the disclosure, the specific frequency band may include a designated frequency band (e.g., 15 MH to 30 MHz) for minimizing resonance frequency shifting due to coupling with the NFC antenna 197-3 of the electronic device 101.

The electronic device 101 and the cover device 200 according to various embodiments of the disclosure may perform communication by using an NFC standard protocol (e.g., type A protocol, type B protocol, or type F protocol). The electronic device 101 and the cover device 200 according to various embodiments of the disclosure may perform communication by using an NFC non-standard protocol (e.g., type S protocol). According to various embodiments of the disclosure, if a tag with an external NFC tag device is sensed, the electronic device 101 may perform an operation with the external NFC tag device by using the NFC standard protocol.

If the cover device 200 is fastened thereto, the electronic device 101 according to various embodiments of the disclosure may sense the first sensing member 230 provided on the cover device 200 and may perform an operation with the cover device 200 by using an NFC protocol (e.g., type S protocol) different from the NFC standard protocol. The electronic device 101 according to various embodiments of the disclosure may perform an operation by using a protocol different from the external NFC tag and the cover device 200, thereby preventing erroneous operations of the cover device 200. Regarding the NFC non-standard protocol (e.g., type S protocol) according to various embodiments of the disclosure, Korean Laid-open Patent Publication No. 10-2016-0035427 (Application No. 10-2014-0127027) or U.S. Laid-open Patent Publication No. 2016/0088476 (application Ser. No. 14/861,507), for example, may be referred to.

Figure 3:
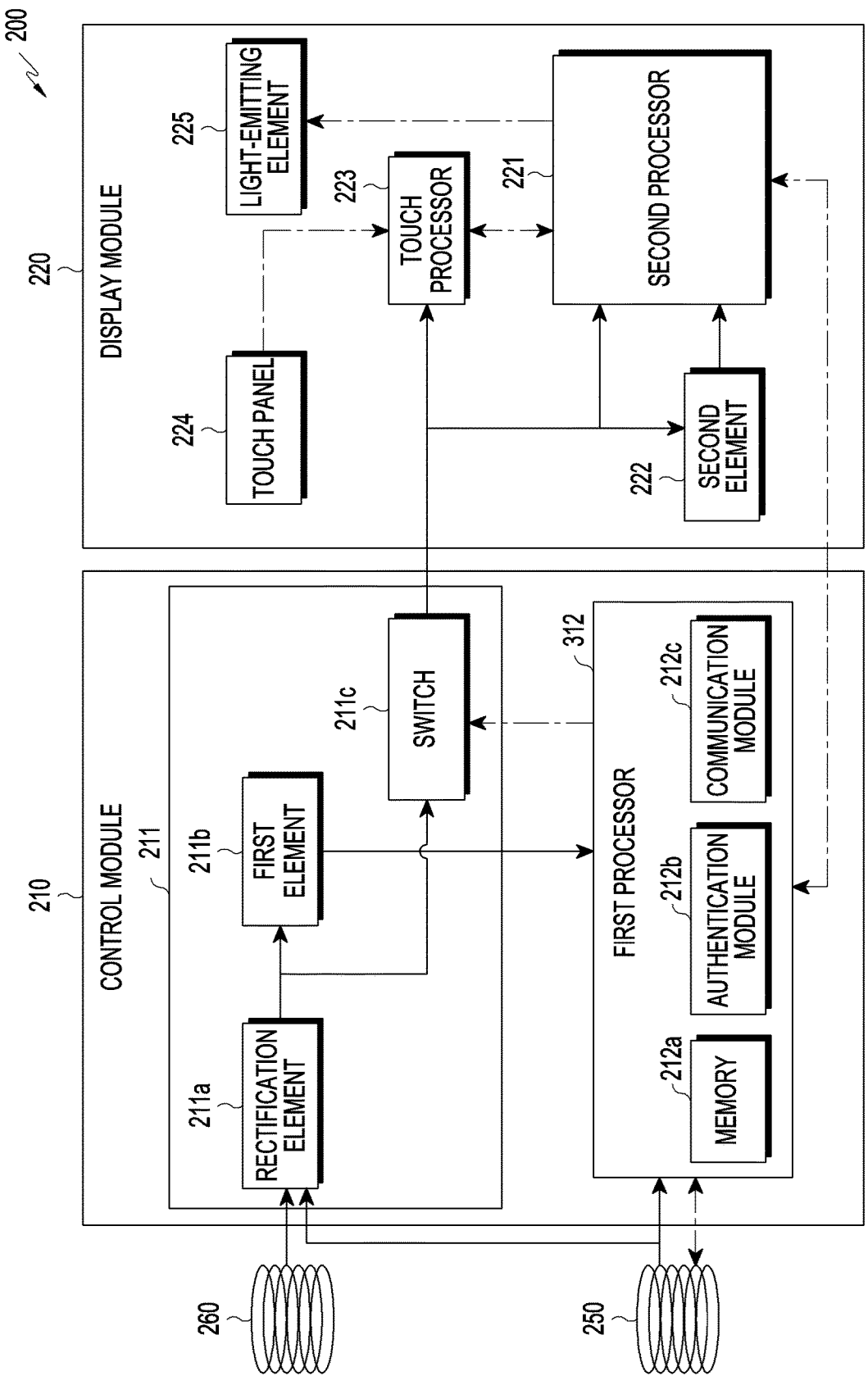
FIG. 3 is an exemplary diagram for describing a cover device according to various embodiments.

FIG. 3 is an exemplary diagram for describing a cover device according to various embodiments.

Referring to FIG. 3, the cover device 200 according to various embodiments of the disclosure may include a control module 210 including a wireless communication circuit 212 and a power management circuit 211, a display module 220, a first antenna 250, and a second antenna 260.

The power management circuit 211 according to various embodiments of the disclosure may include a rectification element 211a, a first element 211b, and a switch 211c. The wireless communication circuit 212 according to various embodiments of the disclosure may include a first processor 312 including a memory 212a, an authentication module 212b, and a communication module 212c.

According to various embodiments of the disclosure, if an authentication request signal is received from the electronic device 101 via the first antenna 250, the first processor 312 according to various embodiments of the disclosure may transmit a response signal regarding the authentication request to the electronic device 101, thereby performing authentication with the electronic device 101. The authentication request signal according to various embodiments of the disclosure may include power required (in other words, used) by the first processor 312 to perform authentication. The cover device 200 according to various embodiments of the disclosure may transmit an authentication response signal to the electronic device 201 as a response to the authentication request signal, and the electronic device 101 and the cover device 200 may thereby perform authentication. According to various embodiments of the disclosure, power included in the authentication request signal may be transmitted to the rectification elements 211a. According to various embodiments of the disclosure, the authentication request signal may be received via the second antenna 260.

If power included in a radio-frequency signal is received from the electronic device 101 according to various embodiments of the disclosure via the second antenna 260, the first processor 312 according to various embodiments of the disclosure may control the switch 211c such that the received power is transmitted to the display module 220. For example, the first processor 312 according to various embodiments of the disclosure may turn the switch 211 on such that power is transmitted to the display module 220 via the switch 211c. If no power is received from the electronic device 101, the electronic device 101 according to various embodiments of the disclosure may have the switch 211c turned off.

If data of a first radio-frequency signal is received via the first antenna 250, the first processor 312 according to various embodiments of the disclosure may transmit the received data to the display module 220.

According to various embodiments of the disclosure, if a radio-frequency signal (in other words, first radio-frequency signal) for detecting occurrence of an event (e.g., when an incoming call event has occurred) in the cover device 200 is received from the electronic device 101 via the first antenna 250, the first processor 312 according to various embodiments of the disclosure may transmit the radio-frequency signal to the display module 220. If a response to the radio-frequency signal is received from the display module 220 according to various embodiments of the disclosure, the first processor 312 according to various embodiments of the disclosure may transmit a radio-frequency signal (in other words, second radio-frequency signal) including a response to the radio-frequency signal (e.g., first radio-frequency signal) to the electronic device 101 via the first antenna 250.

According to various embodiments of the disclosure, if a user input (e.g., touch input) regarding the cover device 200 (e.g., display module 220) is received, the first processor 312 may use the first antenna 250 so as to transmit a radio-frequency signal (e.g., second radio-frequency signal) including data regarding whether or not a user input event has occurred to the electronic device 101.

The memory 212a according to various embodiments of the disclosure may store various kinds of data (e.g., software) used by at least one component of the cover device 200 and input data or output data regarding a command related thereto. The memory 212a according to various embodiments of the disclosure may include a volatile memory (e.g., volatile memory 132 in FIG. 1A) or a non-volatile memory (e.g., non-volatile memory 134a in FIG. 1A). Although an embodiment is illustrated in FIG. 3 wherein the memory 212a according to various embodiments of the disclosure is included in the first processor 312, this is exemplary. The memory 212a according to various embodiments of the disclosure may be configured to be housed in the cover device 200 in a position separated from the first processor 312.

If an authentication request signal is received from the electronic device 101, the authentication module 212b according to various embodiments of the disclosure may transmit an authentication response signal to the electronic device 101 via the first antenna 250 as a response to the authentication request signal and may perform authentication with the electronic device 101.

If power input via the first antenna 250 or the second antenna 260 is rectified by the rectification element 211a and transmitted to the switch 211c, the first processor 212 according to various embodiments of the disclosure may control power supply to the switch 211c such that the rectified first power is transmitted to the display module 220.

The communication module 212c according to various embodiments of the disclosure may receive an event checkup signal from the electronic device 101 via the first antenna 250. If a response to the event checkup signal is received from the display module 220, the control module 210 (e.g., communication module 212c) according to various embodiments of the disclosure may transmit a radio-frequency signal including the received response to the electronic device 101 via the first antenna 250.

According to various embodiments of the disclosure, at least one of various devices constituting the first processor 312, for example, the memory 212a, the authentication module 212b, and the communication module 212c, may be configured separately from the first processor 312 (in other words, so as not to be included as a component).

The rectification element 211a according to various embodiments of the disclosure may change (or rectify) power received via the first antenna 250 or the second antenna 260 from an analog current (AC) to a digital current (DC) and may transmit the same to the first element 211b or the switch 211c.

The first element 211b according to various embodiments of the disclosure may change the voltage of the received DC power to a specific voltage and may transmit the same to the first processor 312. According to various embodiments of the disclosure, the first element 213 may change the voltage of the power to a designated voltage used by the first processor 312 and then transmit the same to the first processor 312. The first element 213 according to various embodiments of the disclosure may include a low drop out (LDO). According to various embodiments of the disclosure, if the voltage of the received power belongs to a voltage range used by the first processor 213, the first element 211b according to various embodiments of the disclosure may be omitted. The first element 211b according to various embodiments of the disclosure may change the voltage of the power received from the rectification element 211a and may deliver the power to the display module 220. According to various embodiments of the disclosure, the second element 222 may be included in the power management circuit 211. According to various embodiments of the disclosure, if the second element 222 is included in the power management circuit 211, the switch 211c may be omitted. According to various embodiments of the disclosure, if the second element 222 is included in the power management circuit 211, the first processor 312 may control the second element 222 so as to supply power to the second processor 211 and the touch processor 223.

The switch 211c according to various embodiments of the disclosure may transmit rectified power to the display module 220 according to a control signal from the first processor 312 according to various embodiments of the disclosure. According to various embodiments of the disclosure, interchangeably with the switch 211c or additionally to the switch 211c, a regulator for changing power rectified by the rectification element 211a to a system operating power supply to the cover device 200, or an LDO for changing the same to a voltage used by the display module 220, may be included in the cover device 200 or may be used thereby.

The display module 220 according to various embodiments of the disclosure may include a second processor 221, a second element 222, a touch processor 223, a touch panel 224, and a light-emitting element 225.

The second processor 221 according to various embodiments of the disclosure may be included in the plate or housing of the cover device 200 and may be driven by power transmitted from the switch 211c. If data is transmitted from the first processor 312, the second processor 221 according to various embodiments of the disclosure may control the display module 220 so as to display the transmitted data. The second processor 221 according to various embodiments of the disclosure may include, as a main control circuit (e.g., driver circuit), at least one of a micro controller unit (MCU), an application processor (AP), and a field programmable gate array (FPGA). The second processor 221 according to various embodiments of the disclosure may receive data (e.g., a character, a number, a special character, an icon, or the like) included in a first radio-frequency signal via the first processor 312, and may control the light-emitting element 225 so as to display the received data. The second processor 221 according to various embodiments of the disclosure may receive a radio-frequency signal (in other words, event detection signal) for detecting occurrence of an event (e.g., when an incoming call event has occurred) in the cover device 200 from the first processor 312. The second processor 221 according to various embodiments of the disclosure may transmit a response to the radio-frequency signal to the first processor 312. If a radio-frequency signal is received, the second processor 221 according to various embodiments of the disclosure may query the touch processor 223 regarding whether or not an input event has occurred with regard to the touch panel 224. If no input event has occurred with regard to the touch panel 224 according to various embodiments of the disclosure, the second processor 221 according to various embodiments of the disclosure may receive a response indicating that no input event has occurred from the touch processor 224 as a response to the query. The second processor 221 according to various embodiments of the disclosure may transmit the response to the query to the first processor 312. If no response to the query is received from the touch processor 224 within a designated time, the second processor 221 according to various embodiments of the disclosure may determine that no input event has occurred with regard to the touch panel 424. The second processor 221 according to various embodiments of the disclosure may transmit a response indicating the no input event has occurred to the first processor 221. If an input event has occurred with regard to the touch panel 224 according to various embodiments of the disclosure, the second processor 221 according to various embodiments of the disclosure may receive a response including input data that has been input via the touch panel 224 as a response to the query from the touch processor 224, and may transmit the received response to the first processor 312. For example, the input data may include data indicating whether to accept or refuse the event that occurred in the electronic device 101. The second processor 221 according to various embodiments of the disclosure may control the light-emitting element 225 so as to display data related to occurrence of an event in the electronic device 101 (e.g., a character, a number, an icon, or the like for indicating call reception, message reception, an alarm, a timer, the battery level, music playback, a notification, volume adjustment, or the like). If input data regarding the data displayed via the touch panel 224 according to various embodiments of the disclosure (e.g., a user touch or a key input for accepting or refusing call reception, message reception, an alarm, a timer, the battery level, music playback, a notification, volume adjustment, or the like) is received, the second processor 221 may transmit the received input data to the first processor 211.

The second element 222 according to various embodiments of the disclosure may change the voltage of power input via the switch 211c according to various embodiments of the disclosure to a designated voltage used by the second processor 221, and may transmit the same to the second processor 221. The second element 222 according to various embodiments of the disclosure may include an LDO. According to various embodiments of the disclosure, if the voltage of the power is equal to the voltage used by the second processor 221, the second element 222 may be omitted. According to various embodiments of the disclosure, the second element 222 may be included in the power management circuit 211.

The touch processor 223 according to various embodiments of the disclosure may be driven by power received from the switch 211c. If a query regarding whether or not an event occurs in the touch panel 224 is received from the second processor 221, the touch processor 223 according to various embodiments of the disclosure may transmit a response to the query to the second processor 221.

The touch panel 224 according to various embodiments of the disclosure may use at least one of a capacitive scheme, a pressure-sensitive scheme, an infrared scheme, and an ultrasonic scheme. The touch panel 224 according to various embodiments of the disclosure may further include a tactile layer so as to provide the user with a tactile response. If a user input event occurs, the touch panel 224 according to various embodiments of the disclosure may transmit input data regarding the occurred input event to the touch processor 223. The touch panel 224 according to various embodiments of the disclosure may be positioned on the upper or lower end of the light-emitting element 225. The touch panel 224 according to various embodiments of the disclosure may have a size equal to, smaller than, or larger than that of the light-emitting element 225.

The light-emitting element 225 (which may include one light-emitting element or multiple light-emitting elements) according to various embodiments of the disclosure may display data received from the electronic device 101 according to a control signal from the second processor 221. The light-emitting element 225 according to various embodiments of the disclosure may include at least one of an LED, an OLED, an EPD, an LCD, and E-ink. The light-emitting element 225 according to various embodiments of the disclosure may be turned on/off under the control of the second processor 221 so as to display data. The light-emitting element 225 according to various embodiments of the disclosure may be turned on/off according to a control signal from the second processor 221 so as to display at least one of a character, a number, an icon, and an image. The light-emitting element 225 according to various embodiments of the disclosure may be turned on/off according to a control signal from the second processor 221. The light-emitting element 225 according to various embodiments of the disclosure may display data so as to reflect at least one of a dimming effect, an animation effect, and an upward/downward/leftward/rightward movement effect according to a control signal from the second processor 221.

The first antenna 250 according to various embodiments of the disclosure may receive an authentication request signal for requesting authentication regarding the cover device 200 from the electronic device 101 and may transmit an authentication response signal to the electronic device 101. The first antenna 250 according to various embodiments of the disclosure may receive data included in a first radio-frequency signal from the electronic device 101. The first antenna 250 according to various embodiments of the disclosure may receive an event checkup signal from the electronic device 101 and may transmit a second radio-frequency signal, which is an event response signal, to the electronic device 101.

The second antenna 260 according to various embodiments of the disclosure may receive power included in a first radio frequency from the electronic device 101.

Although FIG. 3 illustrates an embodiment in which the second processor 221 is included in the display module 220, this is exemplary. According to various embodiments of the disclosure, the second processor 221 may be housed and disposed in the cover device 200 separately from the display module 220.

Figure 4A:
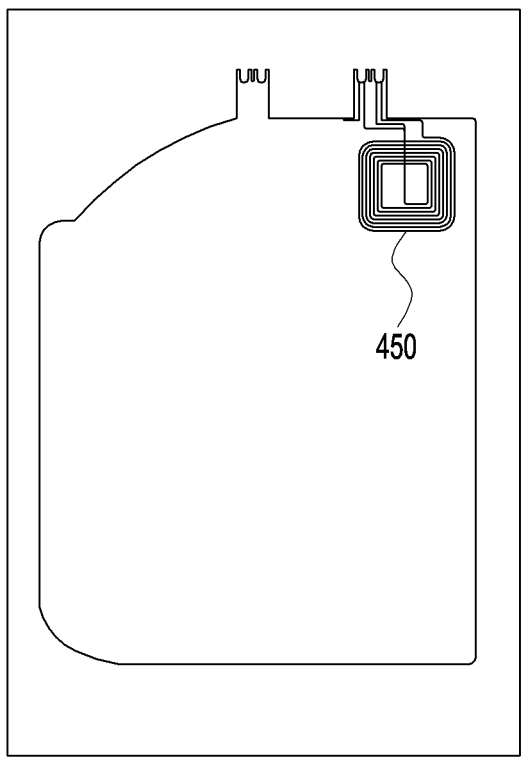
FIGS. 4A and 4B are exemplary diagrams for describing disposition of a first antenna and a second antenna of a cover device according to various embodiments.
Figure 4B:
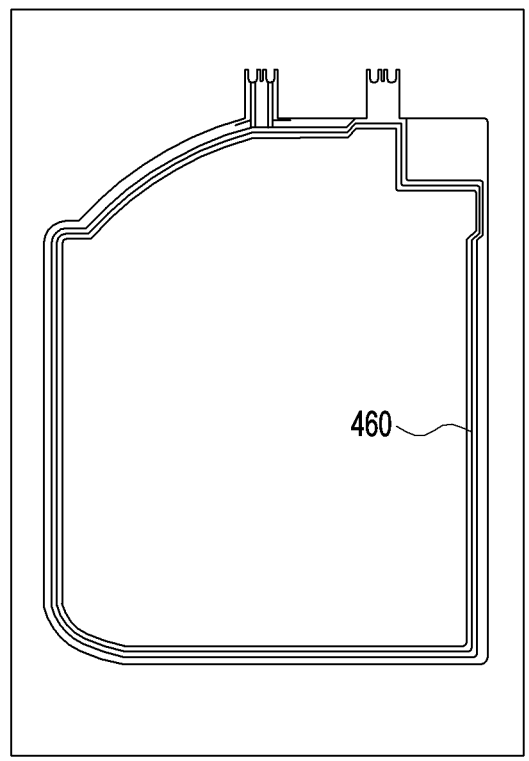

FIG. 4 is an exemplary diagram for describing disposition of a first antenna and a second antenna of a cover device according to various embodiments.

Referring to FIG. 4, the cover device 200 according to various embodiments of the disclosure may include a first antenna 450 configured to transmit/receive data and a second antenna 460 configured to receive power. According to various embodiments of the disclosure, the first antenna 450 and the second antenna 460 may be configured (in other words, designed) to have different sizes and/or shapes, thereby preventing degradation of performance of the NFC antenna 197-3 of the electronic device 101 according to various embodiments of the disclosure. The electronic device 101 and the cover device 200 according to various embodiments of the disclosure are capable of transmitting/receiving data by using low-power communication, and the first antenna 450 according to various embodiments of the disclosure may accordingly be configured to have a size smaller than that of the second antenna 460. The second antenna 460 according to various embodiments of the disclosure may be configured to have a size equal to or larger than that of the NFC antenna 197-3 of the electronic device 101, in order to improve the power reception efficiency.

The second antenna 460 of the cover device 200 according to various embodiments of the disclosure may be configured such that the coil length thereof overlaps one turn more than the NFC antenna 197-3 of the electronic device 101. According to various embodiments of the disclosure, if the second antenna 460 of the cover device 20 has a three-turn length, the NFC antenna 197-3 of the electronic device 101 may be configured have a two-turn length.

The first antenna 450 and the second antenna 460 (in other words, dual antenna) according to various embodiments of the disclosure may overlap the NFC antenna 197-3 of the electronic device 101, following coupling between the electronic device 101 and the cover device 200. According to various embodiments of the disclosure, different resonance frequencies may be configured with regard to the first antenna 450 and the second antenna 460 such that a normal operation is possible when the NFC antenna 197-3 and the dual antenna (e.g., the first antenna 450 and the second antenna 460) of the cover device 200 overlap. According to various embodiments of the disclosure, the first antenna 450 may be configured to have the same resonance frequency band (e.g., 10 MHz to 14.99 MHz) as that of the NFC antenna 197-3 of the electronic device 101.

The second antenna 460 according to various embodiments of the disclosure may be configured to have a specific frequency band (e.g., 15 MHz to 30 MHz) so as not to overlap the frequency band of the NFC antenna 197-3 in view of resonance frequency shifting resulting from coupling between the NFC antenna 197-3 and the second antenna 460 when the electronic device 101 and the cover device 200 are coupled.

Figure 5:
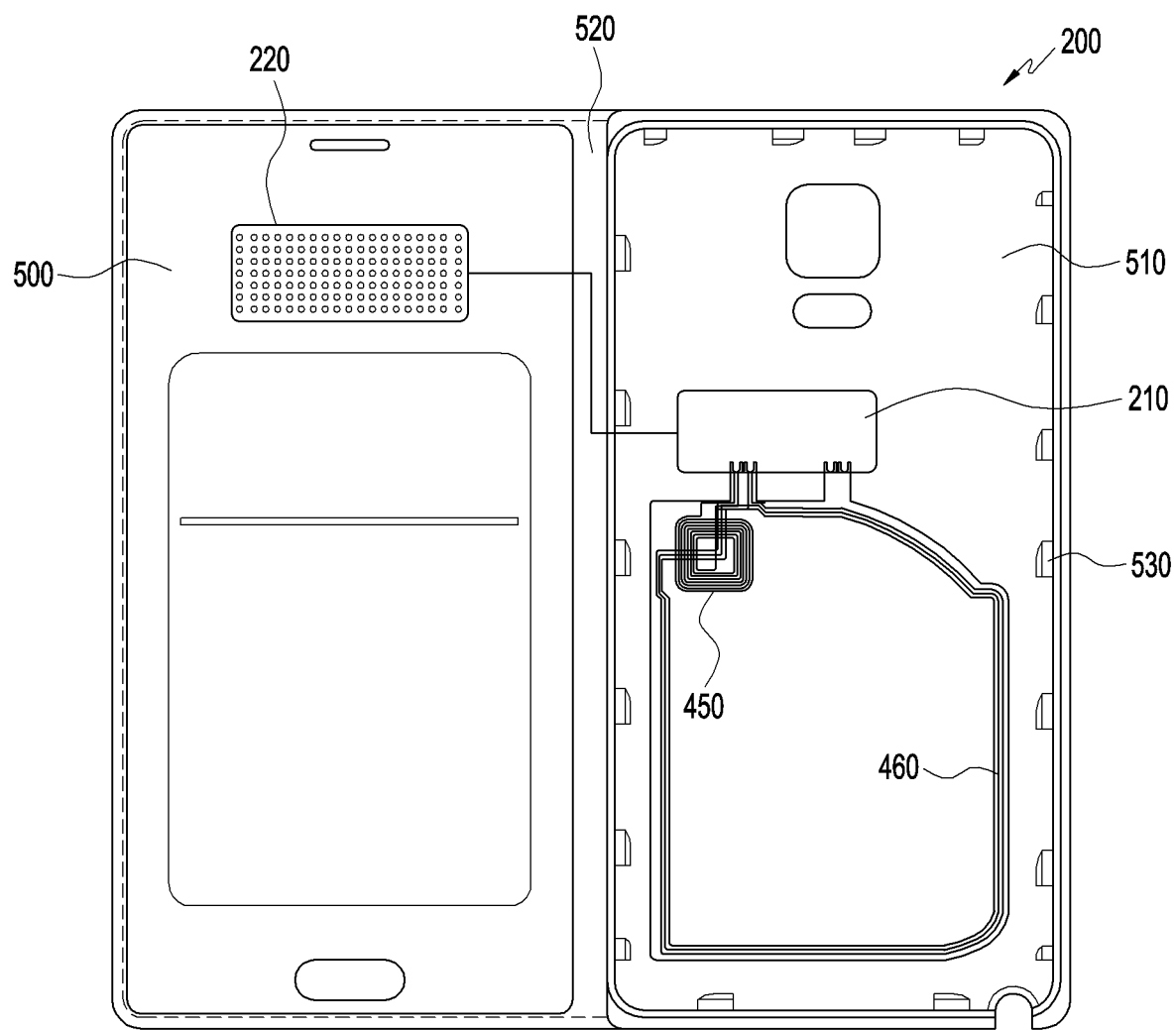
FIG. 5 is an exemplary diagram for describing a cover device according to various embodiments.

FIG. 5 is an exemplary diagram for describing a cover device according to various embodiments.

Referring to FIG. 5, the cover device 200 according to various embodiments of the disclosure may include a housing, and the housing may include a first surface 500 facing in a first direction, a second surface 510 facing in a second direction that is opposite to the first direction, and a third surface 520 surrounding a part of the space between the first surface 500 and the second surface 510. The cover device 200 according to various embodiments of the disclosure may include a front cover portion (e.g., first surface 500) and a rear cover portion (e.g., second surface 510). The cover device 200 according to various embodiments of the disclosure may be fabricated such that the same is coupled to at least a part of the housing of the electronic device 101 and thus provides a function of protecting the electronic device 101 from external impacts.

The cover device 200 according to various embodiments of the disclosure may include a connecting member 530 configured to connect the housing of the cover device 200 to the electronic device 101 in an attachable/detachable manner. At least one connecting member 530 according to various embodiments of the disclosure may be configured on at least a part of the second surface 510. If the electronic device 100 is manufactured to have an integrated battery (in other words, if the electronic device 101 does not have a replaceable battery for supplying power thereto), the cover device 200 according to various embodiments of the disclosure may be manufactured so as to cover at least some of the rear surface of the housing of the electronic device 101 (e.g., a surface of the electronic device 101 facing the surface through which at least a part of the display device 160 is exposed) and the side surface thereof, and then coupled to the electronic device 101.

A display module 220 may be disposed on the first surface 500 according to various embodiments of the disclosure and may be electrically connected to the control module 210. A second sensing member 240 may be disposed on at least a part of the first surface 500 according to various embodiments of the disclosure so as to sense opening/closing of the first surface (e.g., front cover portion) 800. The electronic device 101 according to various embodiments of the disclosure may sense the second sensing member 240 via a sensor module 176. The electronic device 101 according to various embodiments of the disclosure may determine that the front cover portion is closed if the second sensing member 240 is sensed via the sensor module 176 and may determine that the front cover portion is open if the second sensing member 240 is not sensed. The electronic device 101 according to various embodiments of the disclosure may suspend power transmission to the cover device 20 if opening of the front cover portion is sensed while transmitting power to the cover device 200.

A first antenna 450 having a first conductive pattern configured to receive data of a first radio-frequency signal from the electronic device 101 may be disposed inside the second surface 510 according to various embodiments of the disclosure. A second antenna 460 having a second conductive pattern configured to receive power of the first radio-frequency signal from the electronic device 101 may be disposed inside the second surface 510 according to various embodiments of the disclosure. A control module 210 electrically connected to the first antenna 450 and the second antenna 230 may be disposed inside the second surface 510 according to various embodiments of the disclosure.

Figure 6:
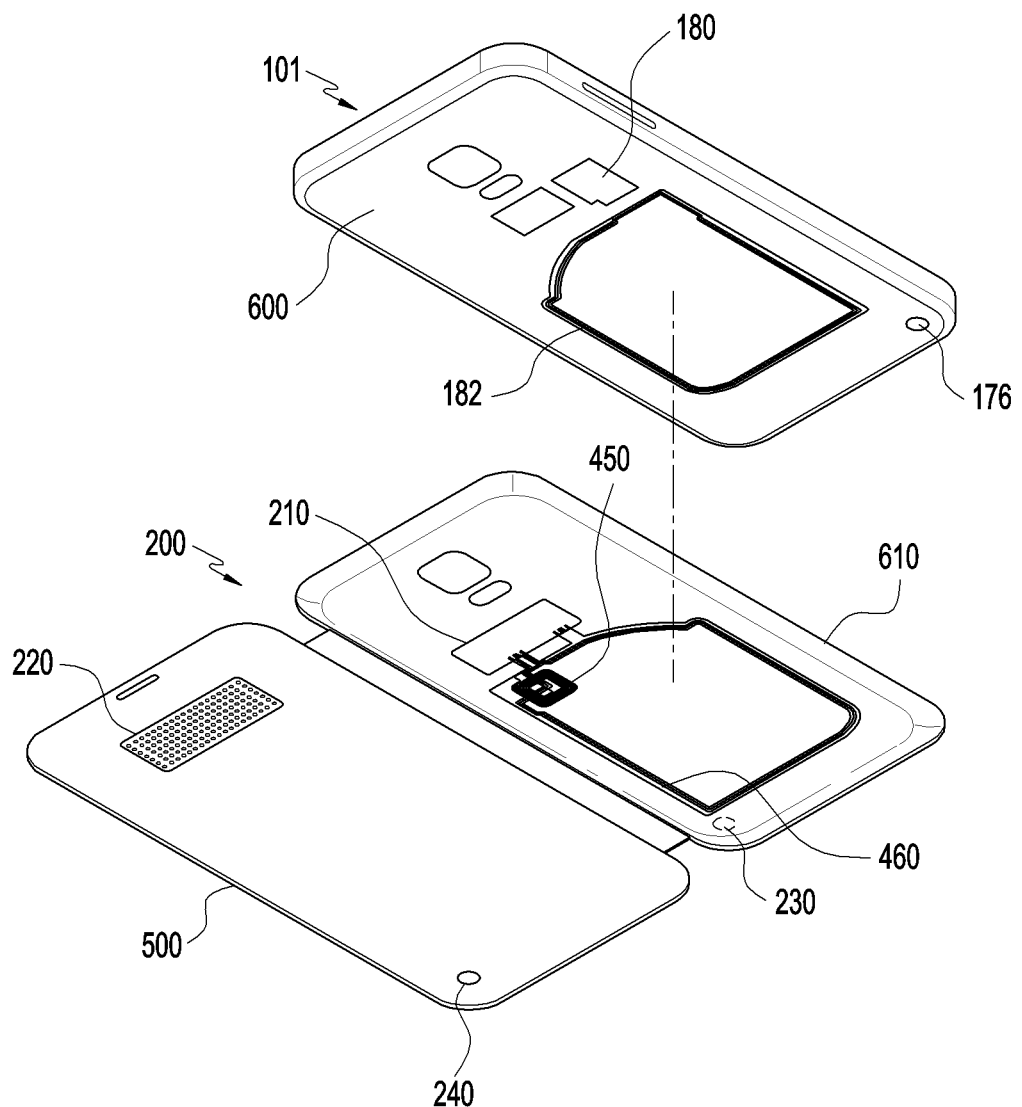
FIG. 6 is an exemplary diagram for describing coupling between an electronic device and a cover device according to various embodiments.

FIG. 6 is an exemplary diagram for describing coupling between an electronic device and a cover device according to various embodiments.

Referring to FIG. 6, the cover device 200 according to various embodiments of the disclosure may include a first surface 500 and a second surface 510. At least one of a first antenna 450, a second antenna 460, and a control module 210 may be disposed inside the second surface 510 according to various embodiments of the disclosure. A first sensing member 230 may be disposed inside the second surface 510 according to various embodiments of the disclosure. A display module 220 may be disposed on a part of the first surface 500 according to various embodiments of the disclosure.

The electronic device 101 according to various embodiments of the disclosure may have an NFC communication module 192-2 and an NFC antenna 197-3 disposed on the rear surface 600. The NFC antenna 197-3 according to various embodiments of the disclosure may be positioned to correspond to the second antenna 460 of the cover device 200. A sensor module 176 may be disposed on the rear surface 600 of the electronic device 100 according to various embodiments of the disclosure.

The second surface 500 of the cover device 200 according to various embodiments of the disclosure may include a structure that enables coupling to the rear surface 600 of the electronic device 101 according to various embodiments of the disclosure. According to various embodiments of the disclosure, the term "structure that enables coupling" may include both a case of physical coupling and a case of electric coupling.

If the electronic device 101 is coupled to the second surface 510 of the cover device 200 according to various embodiments of the disclosure, the first sensing member 230 of the cover device 200 may be sensed by the sensor module 176 of the electronic device 101 according to various embodiments of the disclosure. If the first sensing member 230 of the cover device 200 is sensed by the sensor module 176, the electronic device 101 according to various embodiments of the disclosure may determine that the electronic device 101 is coupled to the cover device 200.

The electronic device 101 according to various embodiments of the disclosure may transmit an authentication request signal to the cover device 200 via the NFC antenna 197-3. Upon receiving the authentication request signal via the first antenna 450, the cover device 200 may transmit an authentication response signal to the electronic device 101 as a response to the authentication request signal. Upon receiving the authentication response signal, the electronic device 101 may perform authentication with the cover device 200 based on the received authentication response signal.

Figure 7:
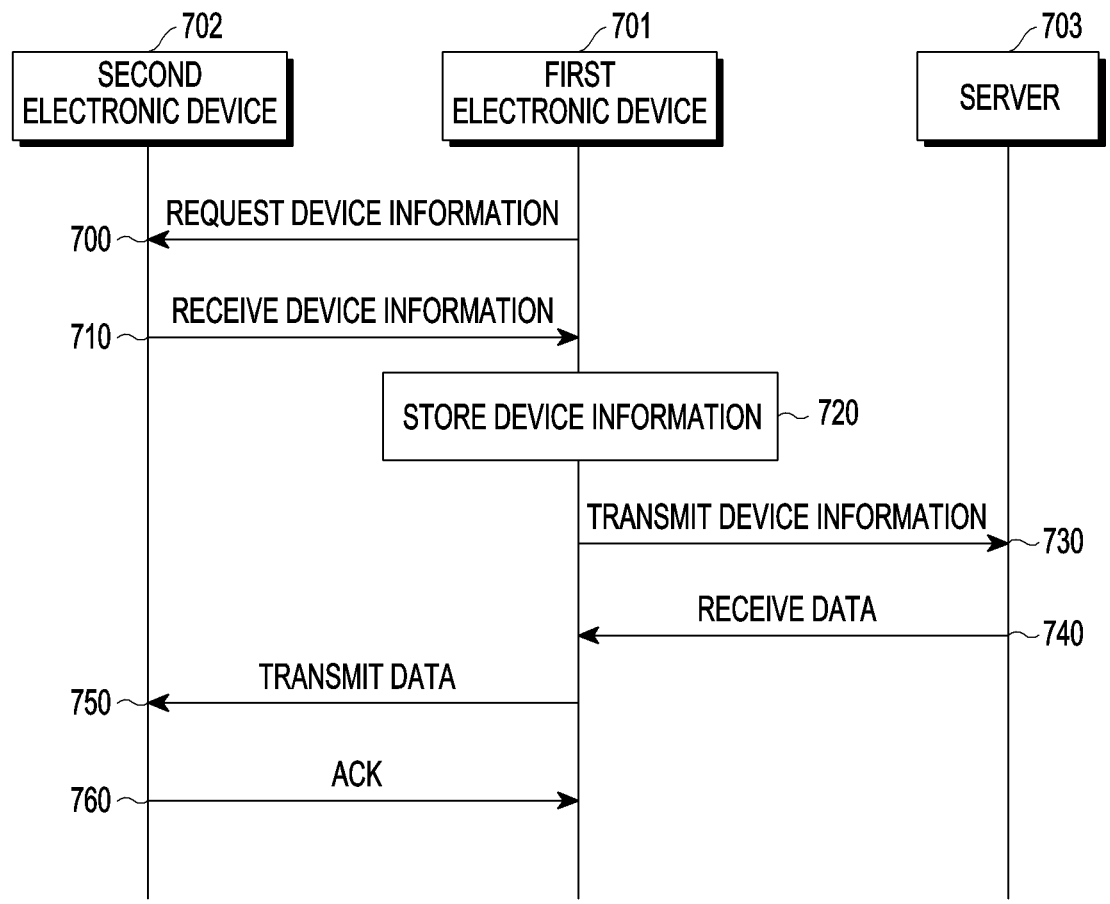
FIG. 7 is an exemplary diagram for describing a function or an operation of transmitting data received from a server to a second electronic device (e.g., cover device) according to various embodiments.

FIG. 7 is an exemplary diagram for describing a function or an operation of transmitting data received from a server to a second electronic device 702 (e.g., cover device 200) according to various embodiments. According to various embodiments of the disclosure, the first electronic device 701 (e.g., electronic device 101) according to various embodiments of the disclosure may be coupled to a second electronic device (e.g., the cover device 200 in FIG. 2).

Referring to FIG. 7, the first electronic device 701 (e.g., processor 120 in FIG. 1A) according to various embodiments of the disclosure may request device information of the second electronic device 702 by using a communication module (e.g., NFC communication module 192-2 in FIG. 2) in operation 700. According to various embodiments of the disclosure, the device information according to operation 700 may include at least one of information for authenticating whether or not the second electronic device 702 is a legitimate product, information regarding the type of the second electronic device 702 (e.g., the model name of the second electronic device 702, the model number of the second electronic device 702, the year/month/date of manufacturing of the second electronic device 702, the nation in which the second electronic device 702 is made, the color of the second electronic device 702, the coupling type of the second electronic device 702, the size of the second electronic device 702, and the like), program information (e.g., firmware version information) of the second electronic device 702, and the operating state of the second electronic device 702. According to various embodiments of the disclosure, the program information of the second electronic device 702 may include program information regarding the processor (e.g., first processor 312 or second processor 221 in FIG. 3) of the second electronic device 702. According to various embodiments of the disclosure, operation 700 may be performed following various trigger events, such as coupling between the first electronic device 701 and the second electronic device 702, charging of the first electronic device 701, powering on/off of the first electronic device 701, and arrival of a designated time (e.g., 10 PM).

In the disclosure, the term "program of the control module (in other words, control circuit) 210 of the cover device 200" is briefly referred to as "program of the cover device" in some cases, for convenience of description. However, this is for convenience of descriptions of various embodiments of the disclosure, and such a use of the term is not to be interpreted as excluding a program regarding the authentication module.

The first electronic device 701 (e.g., processor 120 in FIG. 1A) according to various embodiments of the disclosure may receive device information of the second electronic device 702 by using the communication module (e.g., NFC communication module 192-2 in FIG. 2) in operation 710.

The first electronic device 701 (e.g., processor 120 in FIG. 1A) according to various embodiments of the disclosure may store the received device information of the second electronic device 702 by using a memory (e.g., memory 130 in FIG. 1A) in operation 720.

The first electronic device 701 (e.g., processor 120 in FIG. 1A) according to various embodiments of the disclosure may transmit at least some of the device information of the first electronic device 701 and the device information of the second electronic device 702 to the server 703 by using the communication module (e.g., communication module 190 in FIG. 1A) in operation 730. According to various embodiments of the disclosure, the device information of the first electronic device 701 may include at least one of the MAC address of the first electronic device 701, the identification number (e.g., international mobile equipment identify (IMEI), telephone number, or the like) of the first electronic device 701, and type information of the first electronic device 701 (e.g., the model number of the first electronic device 701, the model name of the first electronic device 701, manufacturer information of the first electronic device 701, or the like).

The first electronic device 701 (e.g., processor 120 in FIG. 1A) according to various embodiments of the disclosure may receive data to be transmitted to the second electronic device 702 from the server 703 according to various embodiments of the disclosure by using the communication module (e.g., communication module 190 in FIG. 1A) in operation 740. According to various embodiments of the disclosure, the data received from the server 703 according to operation 740 may include data for updating a program regarding the authentication module (e.g., authentication module 212b in FIG. 3) of the second electronic device 702 and/or the processor (e.g., second processor 221 in FIG. 3) thereof. According to various embodiments of the disclosure, the data received from the server 703 according to operation 740 may include data regarding an application that can be executed (in other words, executable) in the second electronic device 702. According to various embodiments of the disclosure, the application that can be executed in the second electronic device 702 may include at least one of a texting application that can be executed via the display (e.g., display module 220 in FIG. 3) of the second electronic device 702, a background screen application, and a notification application. However, this is exemplary, and the data received from the server 703 according to operation 740 may further include data regarding various applications that can be executed in the second electronic device 702. The server 703 according to various embodiments of the disclosure may determine data to be transmitted to the first electronic device 701 based on device information received from the first electronic device 701. For example, the server 703 according to various embodiments of the disclosure may transmit data for firmware update to the first electronic device 101 based on firmware identification information regarding the processor of the second electronic device 702 and the model number of the second electronic device 702, among device information transmitted from the first electronic device 701.

The first electronic device 701 (e.g., processor 120 in FIG. 1A) according to various embodiments of the disclosure may transmit data received from the server 703 to the second electronic device 702 by using the communication module (e.g., NFC communication module 192-2 in FIG. 2) in operation 750. According to various embodiments of the disclosure, operation 750 may be performed based on at least some of designated time information (e.g., when designated to update firmware at 10 PM), designated position information (e.g., when designated to update firmware if the position of the first electronic device 701 is determined to be a designated position (e.g., company)), and use pattern information of the electronic device (e.g., when designated to transmit data to the second electronic device 702 during a period of time (e.g., 1 AM to 5 AM) during which the call originating time and/or the text message originating time of the user of the first electronic device 701 are equal to or less than designated number of times). However, this is exemplary, and data may be transmitted to the second electronic device 702 in operation 750 regardless of the designated time information, the designated position information, and the user's pattern information.

The first electronic device 701 (e.g., processor 120 in FIG. 1A) according to various embodiments of the disclosure may receive a response regarding operation 750 from the second electronic device 702 by using the communication module (e.g., NFC communication module 192-2 in FIG. 2) in operation 760. According to various embodiments of the disclosure, the response regarding operation 750 may include a response indicating that data received by the second electronic device 702 has been correctly installed.

A firmware update regarding the first processor 312 of the cover device 200 according to various embodiments of the disclosure and/or the processor (e.g., second processor 221) thereof may be performed when it is determined, for example, that the version of software related to the operation of the first processor 312 of the cover device 200 and/or the version of software related to the operation of the second processor 221 are different from the version of software capable of communicating with the electronic device 101. A firmware update regarding the first processor 312 of the cover device 200 according to various embodiments of the disclosure and/or the second processor 221 thereof may be performed by the first processor 312 and/or the second processor 221 together or independently (in other words, individually), according to the software version. According to various embodiments of the disclosure, the electronic device 101 may acquire the version of software related to the operation of the first processor 312 of the cover device 200 and/or the version of software related to the operation of the second processor 221 by transmitting a version information request command (CMD) to the cover device 200.

Hereinafter, an exemplary case in which the program according to various embodiments of the disclosure is firmware will be described. However, this is an example for describing various embodiments of the disclosure, and the following description does not limit the program according to various embodiments of the disclosure.

Figure 8A:
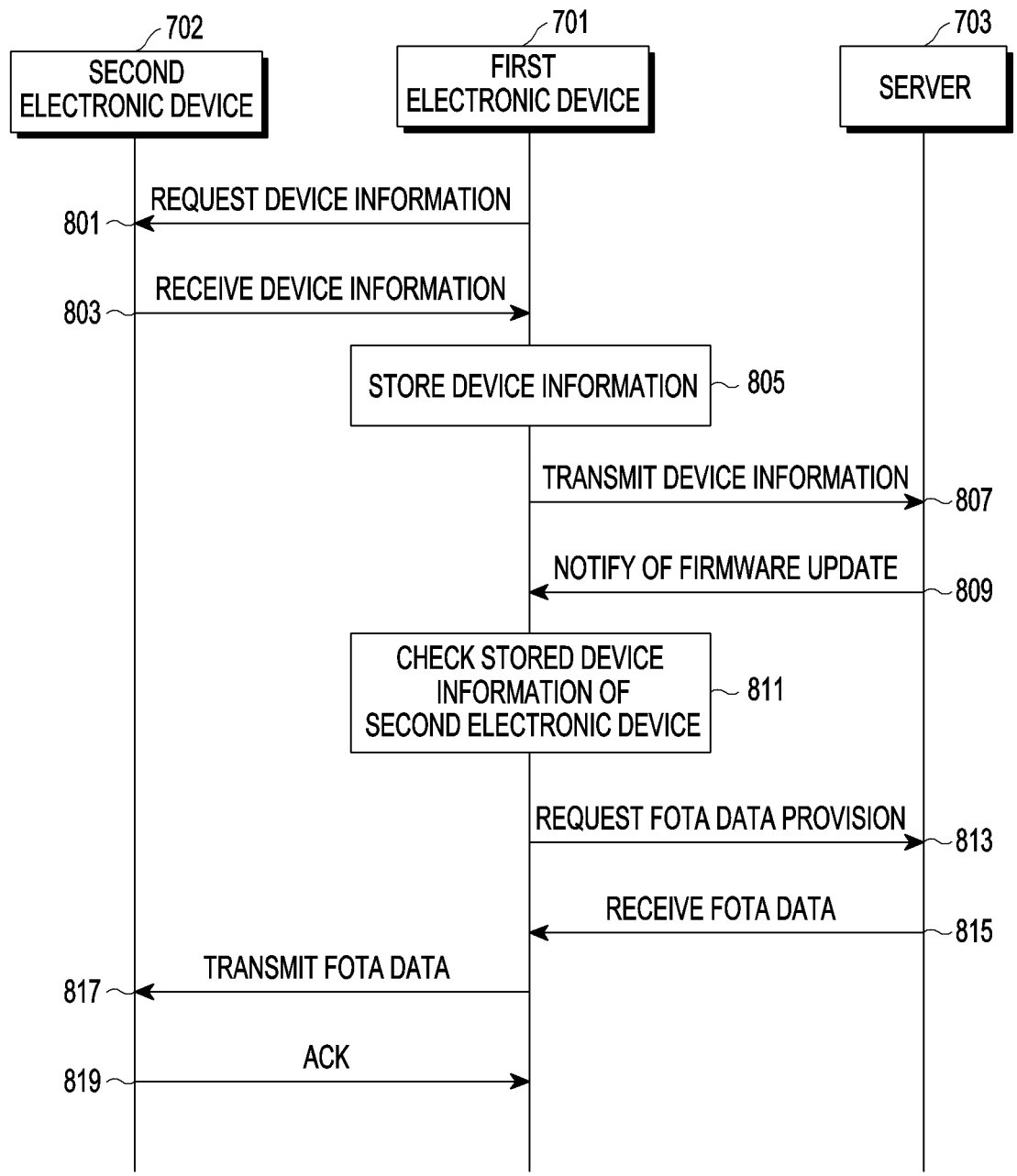
FIG. 8A and FIG. 8B are exemplary diagrams for describing a function or an operation of updating firmware of a second electronic device (e.g., cover device) according to various embodiments.
Figure 8B:
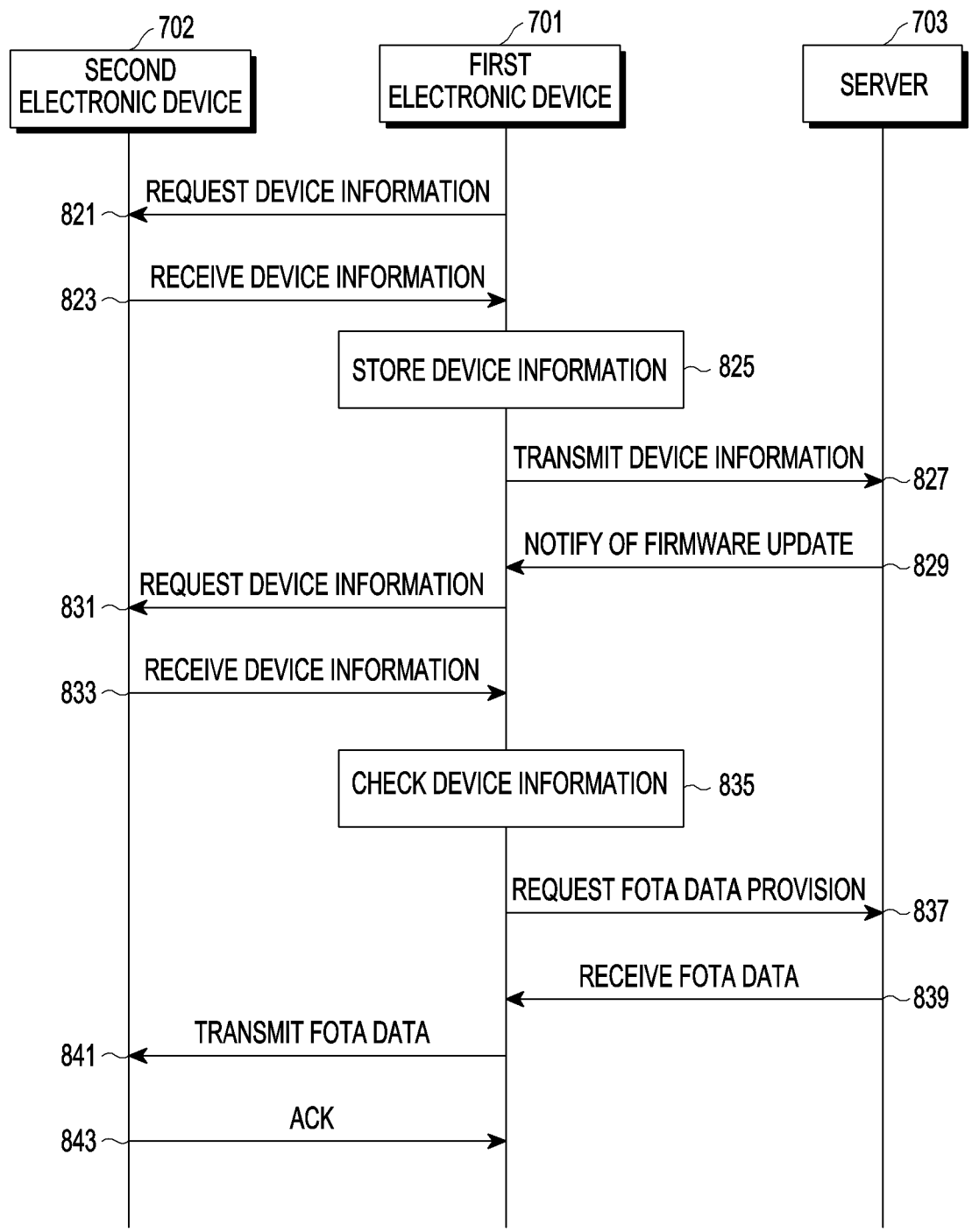

FIG. 8A and FIG. 8B are exemplary diagrams for describing a function or an operation of updating firmware of a second electronic device (e.g., cover device) according to various embodiments. FIG. 8A and FIG. 8B illustrate a function or an operation of updating firmware of a second electronic device 703 based on a notification message for updating firmware (e.g., firmware of the control module 210 in FIG. 2) of the second electronic device 702 (e.g., cover device 200) from a server 703. According to various embodiments of the disclosure, the first electronic device 701 (e.g., electronic device 101) according to various embodiments of the disclosure may be coupled to a second electronic device (e.g., cover device 200 in FIG. 2).

Referring to FIG. 8A, the first electronic device 701 (e.g., processor 120 in FIG. 1A) according to various embodiments of the disclosure may request device information of the second electronic device 702 by using a communication module (e.g., NFC communication module 192-2 in FIG. 2) in operation 801.

The first electronic device 701 (e.g., processor 120 in FIG. 1A) according to various embodiments of the disclosure may receive device information of the second electronic device 702 by using the communication module (e.g., NFC communication module 192-2 in FIG. 2) in operation 803.

The first electronic device 701 (e.g., processor 120 in FIG. 1A) according to various embodiments of the disclosure may store the received device information of the second electronic device 702 by using a memory (e.g., memory 130 in FIG. 1A) in operation 805.

The first electronic device 701 (e.g., processor 120 in FIG. 1A) according to various embodiments of the disclosure may transmit at least some of the device information of the first electronic device 701 and the device information of the second electronic device 702 to the server 703 by using the communication module (e.g., communication module 190 in FIG. 1A) in operation 807.

The first electronic device 701 (e.g., processor 120 in FIG. 1A) according to various embodiments of the disclosure may receive a notification indicating a request for an update of firmware of the second electronic device 702 from the server 703 by using the communication module (e.g., communication module 190 in FIG. 1A) in operation 809. The server 703 according to various embodiments of the disclosure may transmit a firmware update notification message to the first electronic device 701 based on device information received from the first electronic device 701. For example, the server 703 according to various embodiments of the disclosure may transmit a firmware update notification message to the first electronic device 101 based on firmware identification information regarding the processor of the second electronic device 702 and the model number of the second electronic device 702, among device information transmitted from the first electronic device 701. For example, the server 703 according to various embodiments of the disclosure may determine whether or not firmware update data matching with the firmware identification information regarding the processor of the second electronic device 702 and the model number of the second electronic device 702 is stored in the server 703. According to various embodiments of the disclosure, the firmware update notification message may include device information of the second electronic device 702, the firmware of which needs to be updated.

The first electronic device 701 (e.g., processor 120 in FIG. 1A) according to various embodiments of the disclosure may check second device information 702 included in the firmware update notification message and device information of the second electronic device 702 stored in the memory (e.g., memory 130) of the first electronic device 701, in operation 811. According to various embodiments of the disclosure, device information regarding multiple second electronic devices which are connected to the first electronic device 701, or which have been connected thereto, may be stored in the memory of the first electronic device 701. The first electronic device 701 (e.g., processor 120 in FIG. 1A) according to various embodiments of the disclosure may check second device information 702 most recently stored in the memory of the first electronic device 701 with reference to the current time. As a result of such a checking operation, the first electronic device 701 may determine whether or not the second electronic device (e.g., second electronic device 702) currently connected to the first electronic device 701 and the second electronic device (e.g., second electronic device 702) at the timepoint of transmission of device information to the server 703 according to operation 807 are the same second electronic device 702.

If it is confirmed as a result of operation 811 that the second electronic device 702 according to various embodiments of the disclosure matches with the device information of the second electronic device 702 provided by the server 703, the first electronic device 701 (e.g., processor 120 in FIG. 1A) according to various embodiments of the disclosure may request data (which may hereinafter be referred to as "FOTA data" for convenience of description) for a firmware update (which may hereinafter be referred to as "firmware over the air (FOTA)" for convenience of description) of the second electronic device 702 by using the communication module (e.g., communication module 190 in FIG. 1A) in operation 813. According to various embodiments of the disclosure, a request for provision of FOTA data regarding at least one second electronic device that has been connected to the first electronic device 701 previously, besides FOTA data regarding the second electronic device 702 currently connected to the first electronic device 701, may be transmitted to the server 703 in operation 813. For example, the first electronic device 701 may transmit at least some of pieces of information regarding multiple second electronic devices stored in the memory (e.g., memory 130 in FIG. 1A) to the server 703. Upon receiving at least some of the pieces of information regarding multiple second electronic devices from the first electronic device 701, the server 703 according to various embodiments of the disclosure may transmit FOTA data of the second electronic device 702 corresponding to each of the at least some of the pieces of information to the first electronic device 701.

The first electronic device 701 (e.g., processor 120 in FIG. 1A) according to various embodiments of the disclosure may receive the FOTA data by using the communication module (e.g., communication module 190 in FIG. 1A) in operation 815. For example, in operation 815, the communication module may receive the FOTA data via various types of networks, such as Wi-Fi, cellular network, and the like.

The first electronic device 701 (e.g., processor 120 in FIG. 1A) according to various embodiments of the disclosure may transmit the FOTA data received from the server 703 to the second electronic device 702 by using the communication module (e.g., NFC communication module 192-2 in FIG. 2) in operation 817. For example, in operation 815, the communication module may use NFC communication so as to transmit the FOTA data received from the server 703 to the second electronic device 702.

The first electronic device 701 (e.g., processor 120 in FIG. 1A) according to various embodiments of the disclosure may receive a response from the second electronic device 702 by using the communication module (e.g., NFC communication module 192-2 in FIG. 2) in operation 819. According to various embodiments of the disclosure, the response according to operation 819 may include a response indicating that the FOTA data received by the second electronic device 702 has been correctly installed.

Referring to FIG. 8B, the first electronic device 701 (e.g., processor 120 in FIG. 1A) according to various embodiments of the disclosure may request device information of the second electronic device 702 by using a communication module (e.g., NFC communication module 192-2 in FIG. 2) in operation 821.

The first electronic device 701 (e.g., processor 120 in FIG. 1A) according to various embodiments of the disclosure may receive device information of the second electronic device 702 by using the communication module (e.g., NFC communication module 192-2 in FIG. 2) in operation 823.

The first electronic device 701 (e.g., processor 120 in FIG. 1A) according to various embodiments of the disclosure may store the received device information of the second electronic device 702 by using a memory (e.g., memory 130 in FIG. 1A) in operation 825.

The first electronic device 701 (e.g., processor 120 in FIG. 1A) according to various embodiments of the disclosure may transmit at least some of the device information of the first electronic device 701 and the device information of the second electronic device 702 to the server 703 by using the communication module (e.g., communication module 190 in FIG. 1A) in operation 827.

The first electronic device 701 (e.g., processor 120 in FIG. 1A) according to various embodiments of the disclosure may receive a notification indicating a request for an update of firmware of the second electronic device 702 from the server 703 by using the communication module (e.g., communication module 190 in FIG. 1A) in operation 829.

The first electronic device 701 (e.g., processor 120 in FIG. 1A) according to various embodiments of the disclosure may send a request for device information to the second electronic device 702 by using the communication module (e.g., NFC communication module 192-2 in FIG. 2) in operation 831.

The first electronic device 701 (e.g., processor 120 in FIG. 1A) according to various embodiments of the disclosure may receive device information from the second electronic device 702 by using the communication module (e.g., NFC communication module 192-2 in FIG. 2) in operation 833.

The first electronic device 701 (e.g., processor 120 in FIG. 1A) according to various embodiments of the disclosure may determine whether or not the device information received from the second electronic device 702 and device information of the second electronic device 702 (e.g., firmware version and mode number of the second electronic device 702) received from the server 703 according to operation 829 are identical, in operation 835.

If it is confirmed as a result of operation 835 that the second electronic device 702 according to various embodiments of the disclosure matches with the device information of the second electronic device 702 provided by the server 703, the first electronic device 701 (e.g., processor 120 in FIG. 1A) according to various embodiments of the disclosure may request FOTA data by using the communication module (e.g., communication module 190 in FIG. 1A) in operation 837.

The first electronic device 701 (e.g., processor 120 in FIG. 1A) according to various embodiments of the disclosure may receive FOTA data from the server 703 by using the communication module (e.g., communication module 190 in FIG. 1A) in operation 839.

The first electronic device 701 (e.g., processor 120 in FIG. 1A) according to various embodiments of the disclosure may transmit the FOTA data received from the server 703 to the second electronic device 702 by using the communication module (e.g., NFC communication module 192-2 in FIG. 2) in operation 841.

The first electronic device 701 (e.g., processor 120 in FIG. 1A) according to various embodiments of the disclosure may receive a response from the second electronic device 702 by using the communication module (e.g., NFC communication module 192-2 in FIG. 2) in operation 843. According to various embodiments of the disclosure, the response according to operation 819 may include a response indicating that the FOTA data received by the second electronic device 702 has been correctly installed.

Figure 9A:
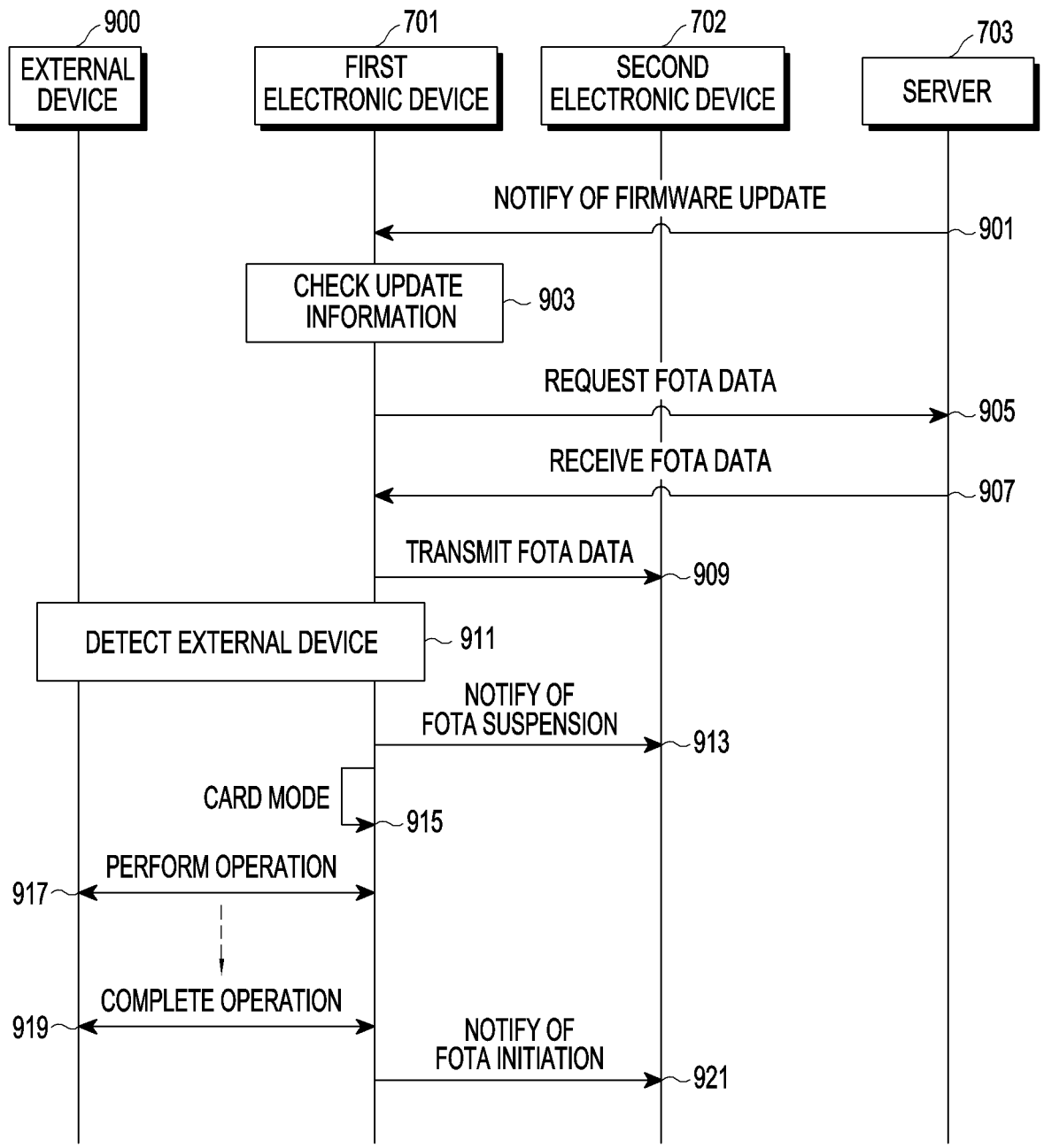
FIG. 9A and FIG. 9B are exemplary diagrams for describing a function or an operation of switching the operating mode of a first electronic device when a signal is received from an external device while updating firmware of a second electronic device (e.g., cover device) according to various embodiments.
Figure 9B:
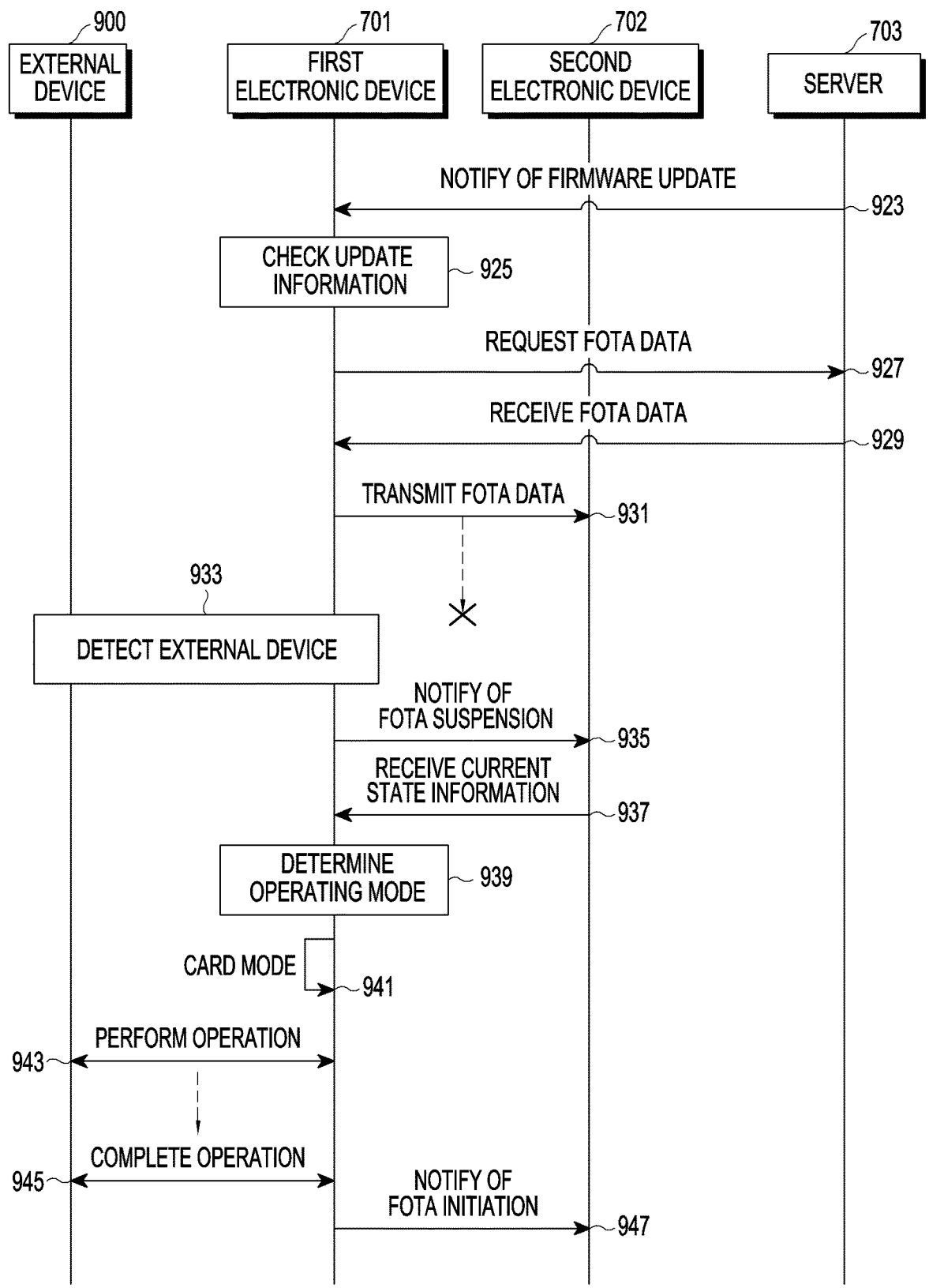

FIG. 9A and FIG. 9B are exemplary diagrams for describing a function or an operation of switching the operating mode of a first electronic device when a signal is received from an external device while updating a program of a second electronic device (e.g., cover device) according to various embodiments.

Referring to FIG. 9A, the first electronic device 701 (e.g., processor 120 in FIG. 1A) according to various embodiments of the disclosure may receive a firmware update notification message from a server 703 by using a communication module (e.g., communication module 190 in FIG. 1A) in operation 901.

If a program of the second electronic device 702 has been updated, and if the updated program needs to be provided to the first electronic device 701 or the second electronic device 702, the server 703 according to various embodiments of the disclosure may transmit a firmware update notification message to the first electronic device 701. In response to the firmware update request message transmitted from at least one of the first electronic device 701 and the second electronic device 702 periodically or aperiodically, the server 703 according to various embodiments of the disclosure may transmit a firmware update notification message to the first electronic device 701. According to various embodiments of the disclosure, the firmware update request message may include at least some of version information regarding the firmware currently installed in the second electronic device 702 and device information regarding the second electronic device 702.

Alternatively, if firmware of the second electronic device 703 needs to be updated (e.g., if a new version of firmware is available), the server 703 according to various embodiments of the disclosure may transmit a firmware update notification message including device information regarding the second electronic device 702 to the first electronic device 701, regardless of reception of the firmware update request message.

According to various embodiments of the disclosure, the firmware update notification message may include at least some of version information regarding the new firmware and device information regarding the electronic device (e.g., second electronic device 702) in which the new firmware needs to be installed. According to various embodiments of the disclosure, descriptions related to operation 901 may be equally applied to transmission/reception of a firmware update notification message according to various embodiments of the disclosure.

The first electronic device 701 (e.g., processor 120 in FIG. 1A) according to various embodiments of the disclosure may check update information in operation 903. The operation of checking update information according to various embodiments of the disclosure may be performed based on whether or not there is matching between at least some of version information regarding new firmware and device information regarding the electronic device (e.g., second electronic device 702) in which the new firmware needs to be installed. For example, if the firmware version information is different, and if the information regarding the device in which updated firmware needs to be installed is identical to the device information of the second electronic device 702, the first electronic device 701 may determine that the first electronic device 701 needs to request the server 703 to provide FOTA data.

The first electronic device 701 (e.g., processor 120 in FIG. 1A) according to various embodiments of the disclosure may request the server 703 to provide FOTA data by using the communication module (e.g., communication module 190 in FIG. 1A) in operation 905, based on the result of determination in operation 903.

The first electronic device 701 (e.g., processor 120 in FIG. 1A) according to various embodiments of the disclosure may receive the FOTA data from the server 703 by using the communication module (e.g., communication module 190 in FIG. 1A) in operation 907.

The first electronic device 701 (e.g., processor 120 in FIG. 1A) according to various embodiments of the disclosure may transmit the FOTA data received from the server 703 to the second electronic device 702 by using the communication module (e.g., NFC communication module 192-2 in FIG. 2) in operation 909.

The first electronic device 701 (e.g., processor 120 in FIG. 1A) according to various embodiments of the disclosure may detect an external device 900 (e.g., NFC reader device) by using the communication module (e.g., NFC communication module 192-2 in FIG. 2) in operation 911.

The first electronic device 701 (e.g., processor 120 in FIG. 1A) according to various embodiments of the disclosure may transmit an FOTA suspension notification message to the second electronic device 702 by using the communication module (e.g., NFC communication module 192-2 in FIG. 2), following detection of the external device 900, in operation 913. The first electronic device 701 (e.g., processor 120 in FIG. 1A) according to various embodiments of the disclosure may suspend transmission of the FOTA data, which is currently transmitted to the second electronic device 702 following detection of the external device 900.

The first electronic device 701 (e.g., processor 120 in FIG. 1A) according to various embodiments of the disclosure may switch the operating mode of the communication module (e.g., NFC communication module 192-2 in FIG. 2) of the first electronic device 701 from a reader mode (in other words, first operating mode) to a card mode (in other words, second operating mode) in operation 915. The reader mode according to various embodiments of the disclosure may refer to an operating mode in which, if a cover device 200 is authenticated, power and/or data can be transmitted to the cover device 200. The card mode according to various embodiments of the disclosure may refer to an operating mode in which an external electronic device (e.g., NFC reader device) is allowed to read data in the electronic device 101. For example, the card mode according to various embodiments of the disclosure may include a peer-to-peer (P2P) mode of NFC protocol.

The first electronic device 701 (e.g., processor 120 in FIG. 1A) according to various embodiments of the disclosure may perform and complete a designated operation (e.g., tagging the first electronic device 701 onto the external device 900, in order to enter/exit a building, and authenticating the user according to tagging) with the detected external device 900 by using the communication module (e.g., NFC communication module 192-2 in FIG. 2) in operations 917 and 919.

After the operation between the first electronic device 900 and the external device 900 is completed, the first electronic device 701 (e.g., processor 120 in FIG. 1A) according to various embodiments of the disclosure may transmit an FOTA initiation notification message to the second electronic device 702 so as to indicate that a firmware update has resumed, by using the communication module (e.g., NFC communication module 192-2 in FIG. 2) in operation 921. The first electronic device 701 (e.g., processor 120 in FIG. 1A) according to various embodiments of the disclosure may transmit the FOTA data transmitted from the server 703 to the second electronic device 702 by using the communication module (e.g., NFC communication module 192-2 in FIG. 2) in operation 921. The first electronic device 701 according to various embodiments of the disclosure may transmit only the remaining part of the FOTA data transmitted from the server 703 other than the FOTA data transmitted according to operation 909 to the second electronic device 702. According to various embodiments of the disclosure, the first electronic device 701 may transmit the entire FOTA data transmitted from the server 703, regardless of the FOTA data transmitted to the second electronic device 702 according to operation 909, again to the second electronic device 702. For example, the first electronic device 701 may re-perform FOTA data transmission (e.g., operation 909). Such a transmission scheme may be predesignated in the process of manufacturing the first electronic device 701 and/or the second electronic device 702, or may be designated by the user after manufacturing the first electronic device 701 and/or the second electronic device 702. The second electronic device 702 according to various embodiments of the disclosure may store (in other words, install) the FOTA data in the designated transmission scheme. For example, the second electronic device 702 according to various embodiments of the disclosure may store the received FOTA data received according to operation 909 and then receive the following part thereof from the first electronic device 701 or may delete the FOTA data stored in the second electronic device 702 according to operation 909 and then store the FOTA data again.

Referring to FIG. 9B, the first electronic device 701 (e.g., processor 120 in FIG. 1A) according to various embodiments of the disclosure may receive a firmware update notification message indicating that firmware of the second electronic device 702 needs to be updated, from the server 703 by using the communication module (e.g., communication module 190 in FIG. 1A) in operation 923.

The first electronic device 701 (e.g., processor 120 in FIG. 1A) according to various embodiments of the disclosure may check update information in operation 925. The operation of checking update information according to various embodiments of the disclosure may include an operation of determining whether or not device information of the second electronic device 702 included in the firmware update notification message is identical to device information of the second electronic device 702 acquired by the first electronic device 701, as in the case of operation 811 in FIG. 8A, for example.

The first electronic device 701 (e.g., processor 120 in FIG. 1A) according to various embodiments of the disclosure may request the server 703 to provide FOTA data by using the communication module (e.g., communication module 190 in FIG. 1A) in operation 927, based on the result of determination in operation 925, if device information of the second electronic device 702 included in the firmware update notification message is identical to device information of the second electronic device 702 acquired by the first electronic device 701.

The first electronic device 701 (e.g., processor 120 in FIG. 1A) according to various embodiments of the disclosure may receive FOTA data from the server 703 by using the communication module (e.g., communication module 190 in FIG. 1A) in operation 929.

The first electronic device 701 (e.g., processor 120 in FIG. 1A) according to various embodiments of the disclosure may transmit the FOTA data received from the server 703 to the second electronic device 702 by using the communication module (e.g., NFC communication module 192-2 in FIG. 2) in operation 931.

The first electronic device 701 (e.g., processor 120 in FIG. 1A) according to various embodiments of the disclosure may detect an external device 900 (e.g., NFC reader device) by using the communication module (e.g., NFC communication module 192-2 in FIG. 2) in operation 911.

The first electronic device 701 (e.g., processor 120 in FIG. 1A) according to various embodiments of the disclosure may transmit an FOTA suspension notification message to the second electronic device 702 by using the communication module (e.g., NFC communication module 192-2 in FIG. 2), following detection of the external device 900, in operation 913. The first electronic device 701 (e.g., processor 120 in FIG. 1A) according to various embodiments of the disclosure may suspend transmission of the FOTA data, which is currently transmitted to the second electronic device 702 following detection of the external device 900.

The first electronic device 701 (e.g., processor 120 in FIG. 1A) according to various embodiments of the disclosure may receive current state information regarding FOTA proceeding from the second electronic device 702 by using the communication module (e.g., NFC communication module 192-2 in FIG. 2) in operation 937. For example, the current state information regarding FOTA proceeding may include the size (in other words, amount) of FOTA data received by the second electronic device 702.

The first electronic device 701 (e.g., processor 120 in FIG. 1A) according to various embodiments of the disclosure may determine the operating mode of the communication module (e.g., NFC communication module 192-2 in FIG. 2) based on the state information received from the second electronic device 702, in operation 937. For example, if the ratio between the size of the FOTA data received by the second electronic device 702 and the size of the entire FOTA data to be transmitted to the second electronic device 702 is equal to or higher than a designated ratio (e.g., 95%), the first electronic device 701 (e.g., processor 120 in FIG. 1A) may maintain the operating mode of the communication module (e.g., NFC communication module 192-2 in FIG. 2) in the reader mode. According to various embodiments of the disclosure, if the ratio between the size of the FOTA data received by the second electronic device 702 and the size of the entire FOTA data to be transmitted to the second electronic device 702 is lower than the designated ratio (e.g., 95%), the first electronic device 701 (e.g., processor 120 in FIG. 1A) may switch the operating mode of the communication module (e.g., NFC communication module 192-2 in FIG. 2) to the card mode. FIG. 9B illustrates an exemplary case in which the operating mode is switched to the card mode.

The first electronic device 701 (e.g., processor 120 in FIG. 1A) according to various embodiments of the disclosure may switch the operating mode of communication module (e.g., NFC communication module 192-2 in FIG. 2) of the first electronic device 701 from the reader mode (in other words, first operating mode) to the card mode (in other words, second operating mode) in operation 939.

The first electronic device 701 (e.g., processor 120 in FIG. 1A) according to various embodiments of the disclosure may perform and complete a designated operation (e.g., tagging the first electronic device 701 onto the external device 900, in order to enter/exit a building, and authenticating the user according to tagging) with the detected external device 900 by using the communication module (e.g., NFC communication module 192-2 in FIG. 2) in operations 943 and 945.

After the operation between the first electronic device 900 and the external device 900 is completed, the first electronic device 701 (e.g., processor 120 in FIG. 1A) according to various embodiments of the disclosure may transmit an FOTA initiation notification message to the second electronic device 702 so as to indicate that a firmware update has resumed, by using the communication module (e.g., NFC communication module 192-2 in FIG. 2) in operation 947. The first electronic device 701 (e.g., processor 120 in FIG. 1A) according to various embodiments of the disclosure may transmit the FOTA data transmitted from the server 703 to the second electronic device 702 by using the communication module (e.g., NFC communication module 192-2 in FIG. 2) in operation 921.

Figure 10:
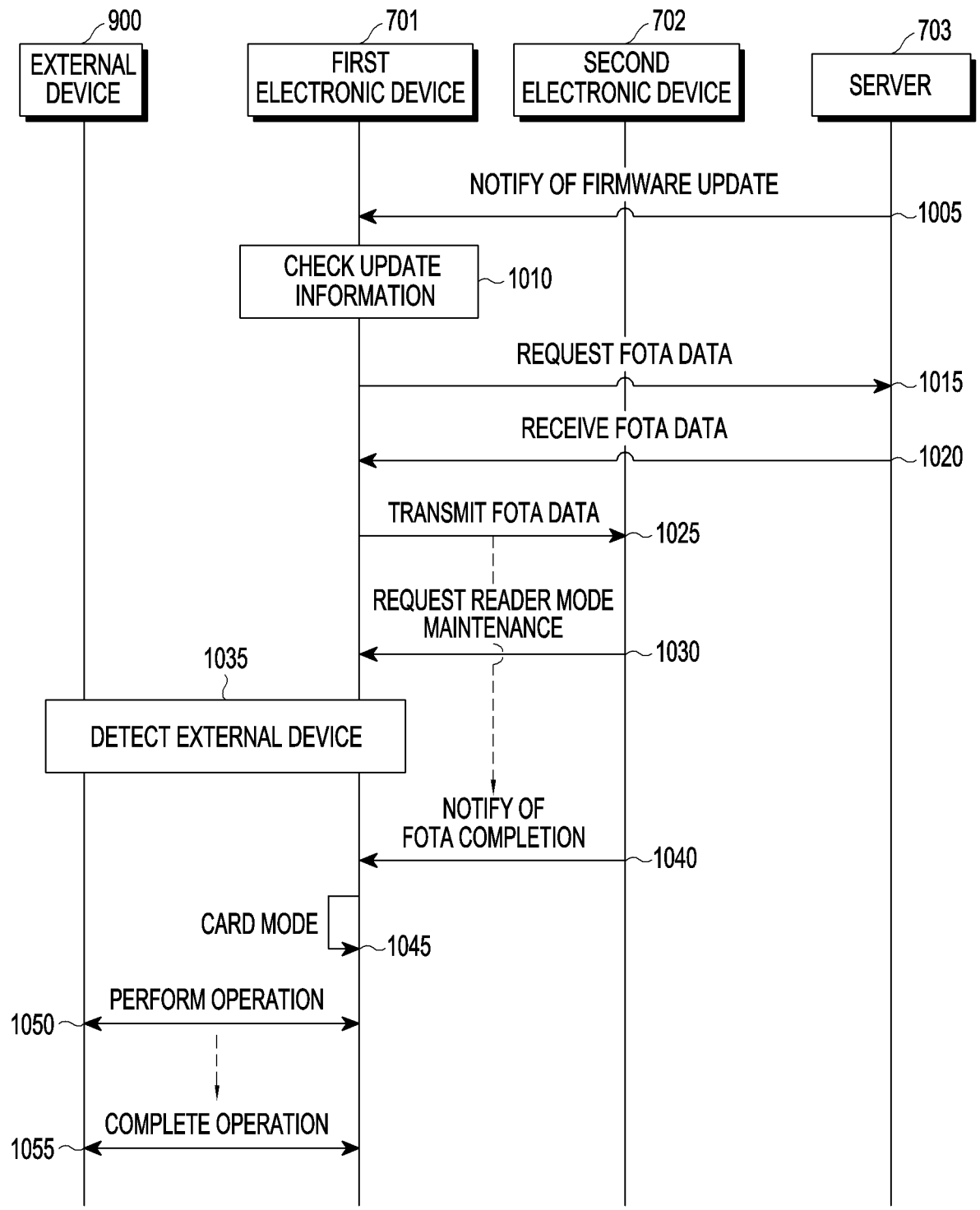
FIG. 10 is an exemplary diagram for describing a function or an operation of maintaining the operating mode of a first electronic device when a signal is received from an external device while updating firmware of a second electronic device (e.g., cover device) according to various embodiments.

FIG. 10 is an exemplary diagram for describing a function or an operation of maintaining the operating mode of a first electronic device 701 when a signal is received from an external device while updating firmware of a second electronic device 702 (e.g., cover device 200) according to various embodiments.

Referring to FIG. 10, the first electronic device 701 (e.g., processor 120 in FIG. 1A) according to various embodiments of the disclosure may receive a firmware update notification message indicating that firmware of the second electronic device 702 needs to be updated, from the server 703, by using the communication module (e.g., communication module 190 in FIG. 1A) in operation 1005.

The first electronic device 701 (e.g., processor 120 in FIG. 1A) according to various embodiments of the disclosure may check update information in operation 1010. The operation of checking update information according to various embodiments of the disclosure may include an operation of determining whether or not device information of the second electronic device 702 included in the firmware update notification message is identical to device information of the second electronic device 702 acquired by the first electronic device 701, as in the case of operation 811 in FIG. 8A, for example.

The first electronic device 701 (e.g., processor 120 in FIG. 1A) according to various embodiments of the disclosure may request the server 703 to provide FOTA data by using the communication module (e.g., communication module 190 in FIG. 1A) in operation 1015, based on the result of determination in operation 1010, if device information of the second electronic device 702 included in the firmware update notification message is identical to device information of the second electronic device 702 acquired by the first electronic device 701.

The first electronic device 701 (e.g., processor 120 in FIG. 1A) according to various embodiments of the disclosure may receive FOTA data from the server 703 by using the communication module (e.g., communication module 190 in FIG. 1A) in operation 1020.

The first electronic device 701 (e.g., processor 120 in FIG. 1A) according to various embodiments of the disclosure may transmit the FOTA data received from the server 703 to the second electronic device 702 by using the communication module (e.g., NFC communication module 192-2 in FIG. 2) in operation 1025.

The first electronic device 701 (e.g., processor 120 in FIG. 1A) according to various embodiments of the disclosure may receive a request that the reader mode be maintained, from the second electronic device 702, by using the communication module (e.g., NFC communication module 192-2 in FIG. 2) in operation 1030. The maintenance request according to operation 1030 may include data indicating a request that the reader mode be maintained, without switching to the card mode, even if an external device 900 is detected while transmitting FOTA data. Operation 1030 according to various embodiments of the disclosure may be performed after operation 1035.

The first electronic device 701 (e.g., processor 120 in FIG. 1A) according to various embodiments of the disclosure may detect an external device 900 (e.g., NFC reader device) by using the communication module (e.g., NFC communication module 192-2 in FIG. 2) in operation 1035. According to various embodiments of the disclosure, the first electronic device 701 may maintain the operating mode of communication module (e.g., NFC communication module 192-2) in the reader mode, without switching to the card mode, until FOTA data transmission is completed, even if the external device 900 has been detected, according to operation 1030. The first electronic device 701 according to various embodiments of the disclosure may transmit FOTA data to the second external device 702, following maintenance of the reader mode.

The first electronic device 701 (e.g., processor 120 in FIG. 1A) according to various embodiments of the disclosure may switch the operating mode of communication module (e.g., NFC communication module 192-2 in FIG. 2) from the reader mode to the card mode in operation 1045, following completion of FOTA data transmission.

The first electronic device 701 (e.g., processor 120 in FIG. 1A) according to various embodiments of the disclosure may perform and complete a designated operation with the detected external device 900 by using the communication module (e.g., NFC communication module 192-2 in FIG. 2) in operations 1050 and 1055.

FIG. 11A to FIG. 11E are exemplary diagrams for describing a function or an operation of switching the operating mode according to a user input when a signal is received from an external device while updating firmware of a second electronic device 702 (e.g., cover device 200) according to various embodiments. The electronic device 100 according to various embodiments of the disclosure may determine the operating mode of the communication module (e.g., NFC communication module 192-2 in FIG. 2) according to the user's selection input, if the electronic device 101 has detected an external device 900 while updating firmware of the cover device 200.

Figure 11A:
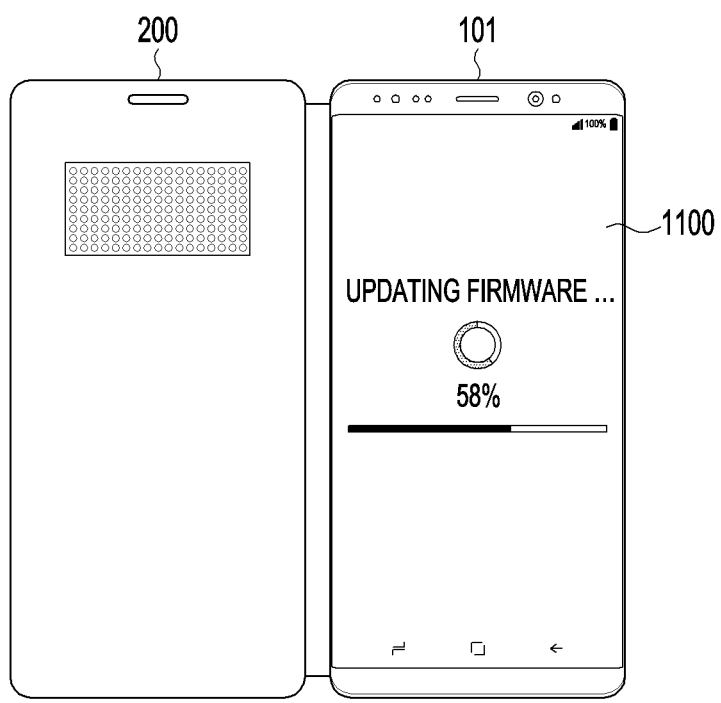
FIGS. 11A, 11B, 11C, 11D, and 11E are exemplary diagrams for describing a function or an operation of switching the operating mode according to a user input when a signal is received from an external device while updating firmware of a second electronic device (e.g., cover device) according to various embodiments.

Referring to FIG. 11A, the electronic device 101 may update firmware of the cover device 200 while being connected to the cover device 200. According to various embodiments of the disclosure, while updating firmware of the cover device 200, the display (e.g., display device 160 in FIG. 1) of the electronic device 101 may display a screen 1100 indicating that firmware of the cover device 200 is being updated, as illustrated in FIG. 11A. FIG. 11A illustrates an exemplary case in which the rate of transmission of FOTA data from the electronic device 101 to the cover device 200 is 58%.

Figure 11B:
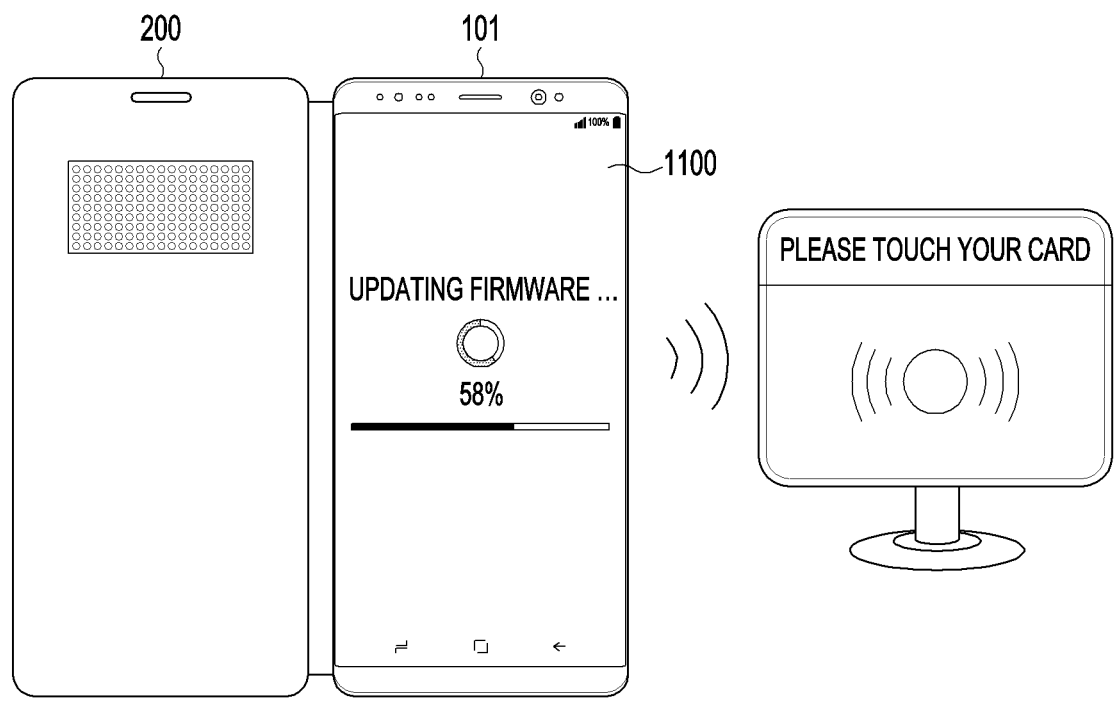

Referring to FIG. 11B, the electronic device 101 according to various embodiments of the disclosure may detect an external device 900 by using the communication module (e.g., NFC communication module 192-2 in FIG. 2) while updating firmware of the cover device 200.

Figure 11C:
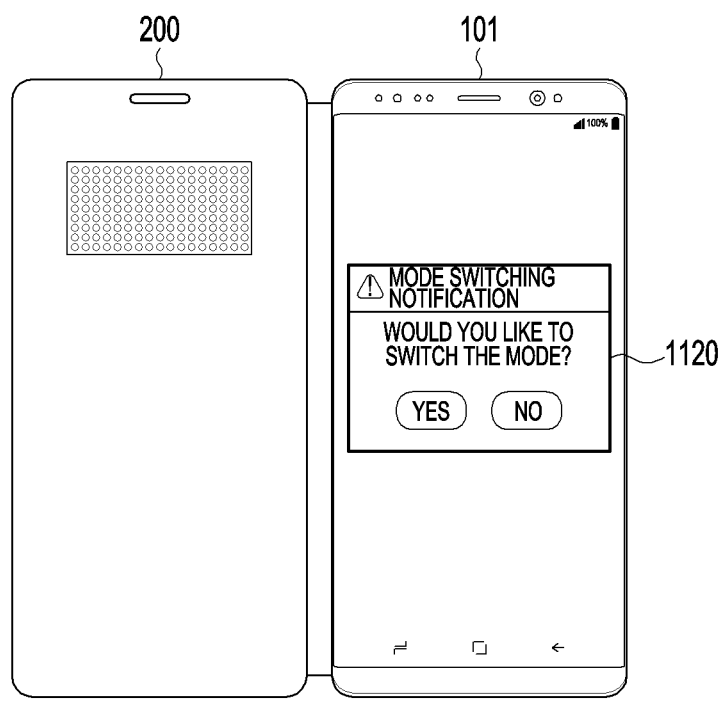

Referring to FIG. 11C, the electronic device 101 according to various embodiments of the disclosure may display a notification message 1120 on the display of the electronic device 101 so as to receive an input for switching the operating mode of the communication module (e.g., the NFC communication module 192-2 in FIG. 2), following detection of the external device 900.

Figure 11D:
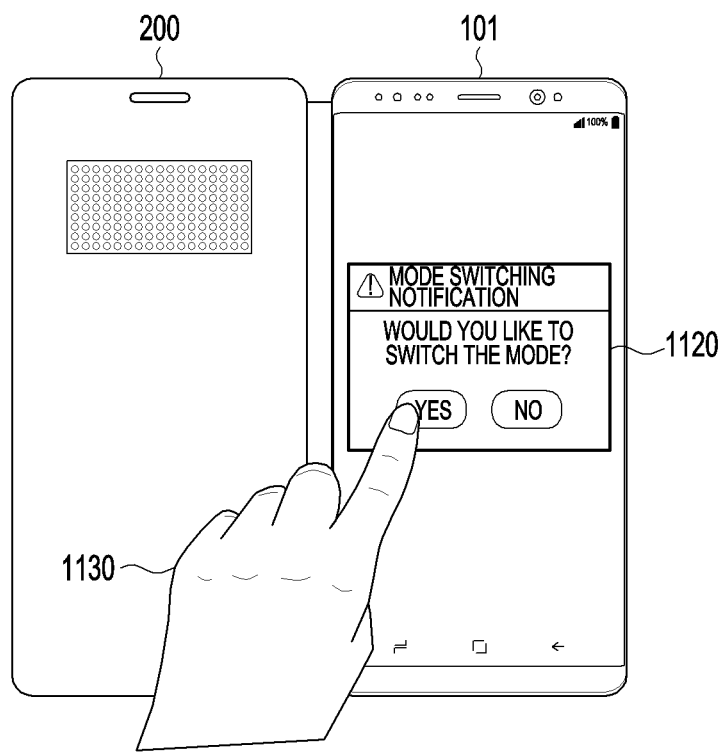

Referring to FIG. 11D, the electronic device 101 according to various embodiments of the disclosure may receive a selection input of the user 1130 regarding the operating mode switching via the notification message 1120. FIG. 11D illustrates an exemplary case in which an input for switching the operating mode by the user 1130 is received.

Figure 11E:
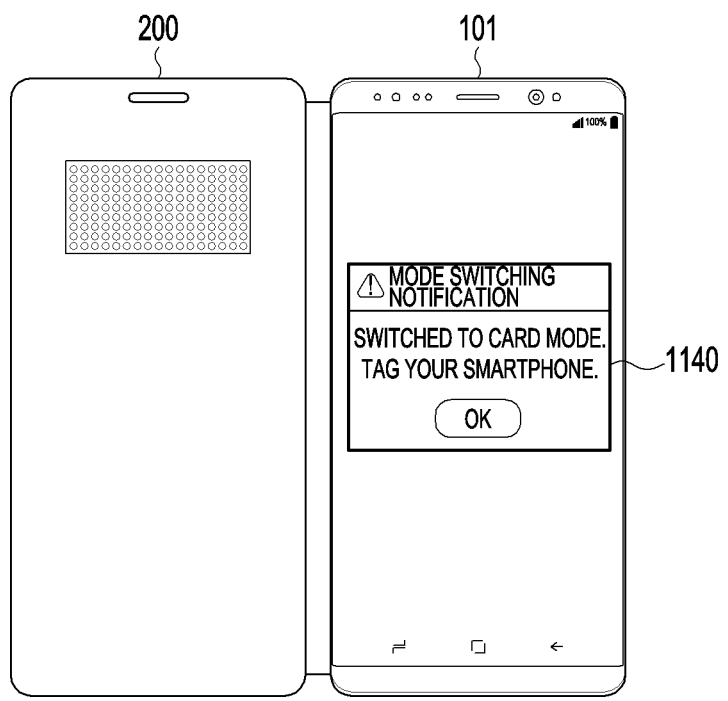

Referring to FIG. 11E, the electronic device 101 according to various embodiments of the disclosure may display a notification message 1140 indicating that the operating mode of the communication module (e.g., NFC communication module 192-2 in FIG. 2) has changed (e.g., from the reader mode to the card mode) in response to the selection input of the user 1130 as illustrated in FIG. 11D. According to various embodiments of the disclosure, transmission of FOTA data to the cover device 200 may be suspended, following the operating mode switching.

FIG. 12A to FIG. 12D are exemplary diagrams for describing a function or an operation of activating an inactivated application, following connection of a cover device, according to various embodiments.

Figure 12A:
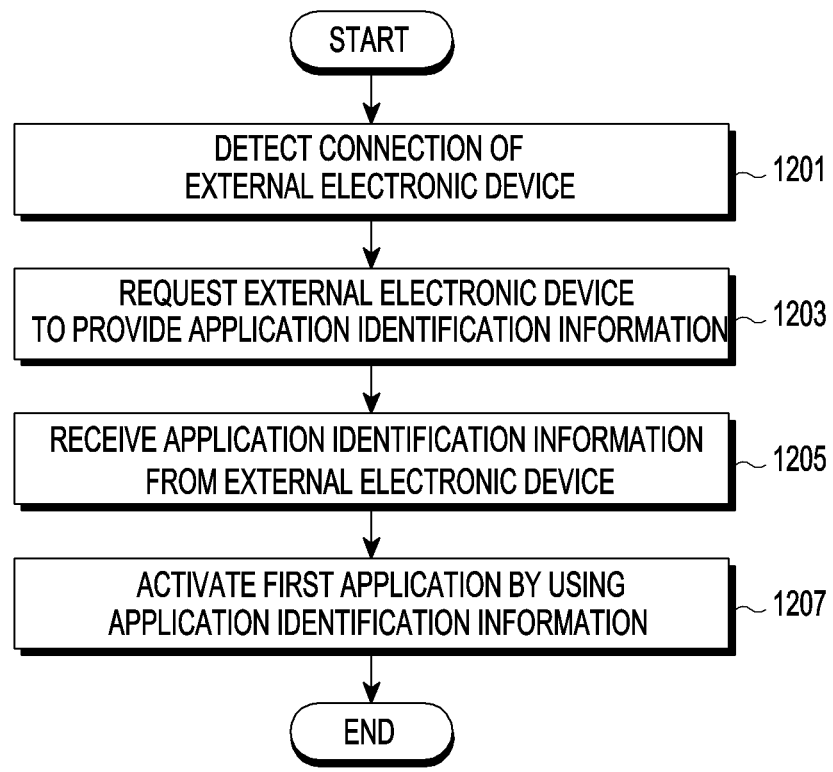
FIGS. 12A, 12B, 12C, and 12D are exemplary diagrams for describing a function or an operation of activating an inactivated application according to connection of a cover device according to various embodiments.

Referring to FIG. 12A, the electronic device (e.g., electronic device 101 in FIG. 1) according to various embodiments of the disclosure may detect connection of an external electronic device (e.g., cover device 200 in FIG. 2) by using the sensor module (e.g., sensor module 176 in FIG. 2) in operation 1201.

The electronic device (e.g., electronic device 101 in FIG. 1) according to various embodiments of the disclosure may request the external electronic device (e.g., cover device 200 in FIG. 2) to provide application identification information by using the communication module (e.g., NFC communication module 192-2 in FIG. 2) in operation 1203. According to various embodiments of the disclosure, the application identification information may include information for activating an inactivated application. According to various embodiments of the disclosure, the term "activation" may refer to a state in which a function or an operation not provided to the user is provided. For example, according to various embodiments of the disclosure, the term "activation" may include a function or an operation of displaying a shortcut icon of a first application (e.g., inactivated application) on the electronic device 101. According to various embodiments of the disclosure, the term "inactivation" may refer to a state in which the user cannot use a designated function or operation, or a state in which the electronic device 101 cannot provide (in other words, does not provide) the user with a designated function or operation. The application identification information according to various embodiments of the disclosure may include data such as a secure authentication key, for example.

The electronic device (e.g., electronic device 101 in FIG. 1) according to various embodiments of the disclosure may receive application identification information from the external electronic device (e.g., cover device 200 in FIG. 2) by using the communication module (e.g., NFC communication module 192-2 in FIG. 2) in operation 1205.

The electronic device (e.g., electronic device 101 in FIG. 1) according to various embodiments of the disclosure may activate the first application by using the application identification information in operation 1207. According to various embodiments of the disclosure, the application identification information may include an authentication key. According to various embodiments of the disclosure, the electronic device 101 may authenticate (in other words, activate) the first application according to whether or not the authentication key regarding the first application and the authentication key transmitted from the external electronic device are identical. According to various embodiments of the disclosure, the electronic device 101 may authenticate the first application if the authentication keys are identical. According to various embodiments of the disclosure, various authentication methods may be applied to authenticate the first application.

Figure 12B:
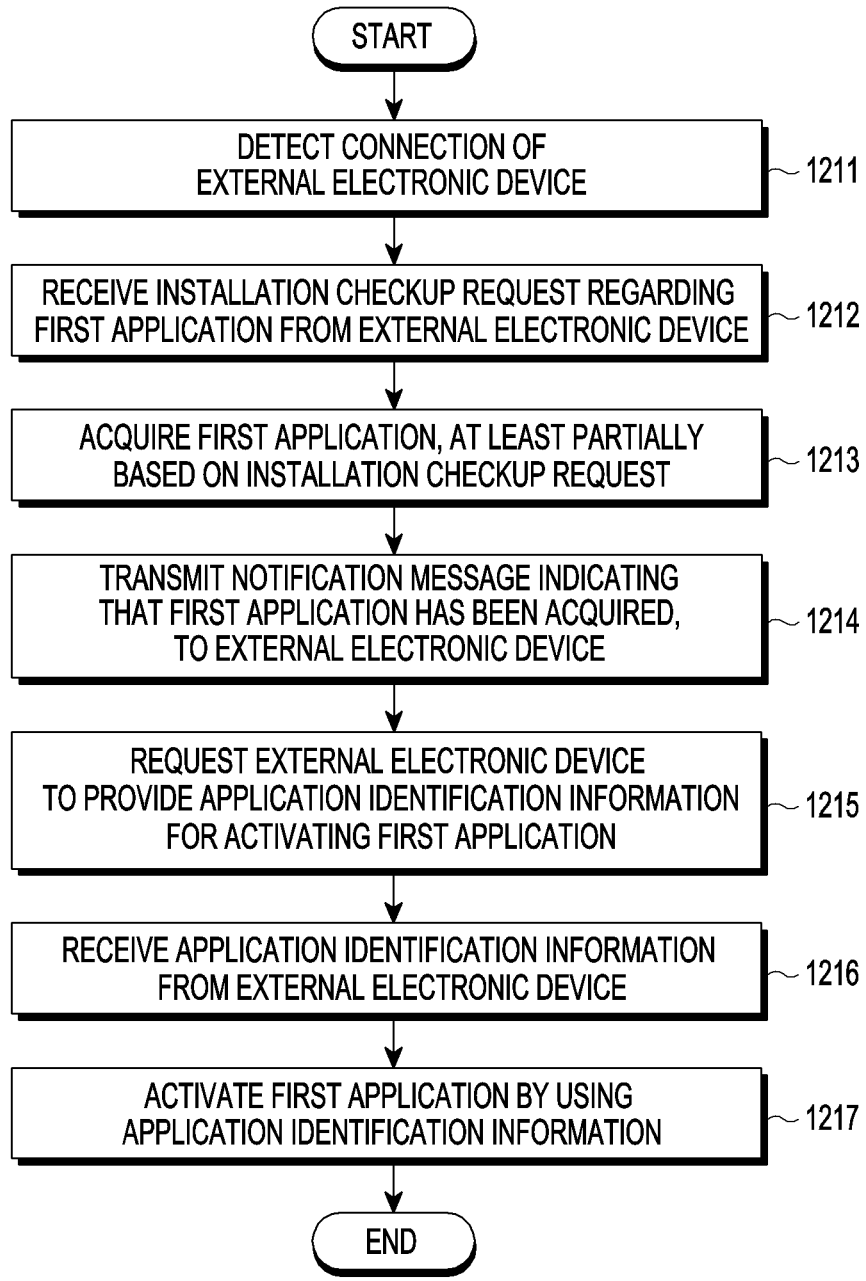

Referring to FIG. 12B, the electronic device (e.g., electronic device 101 in FIG. 1) according to various embodiments of the disclosure may detect connection of an external electronic device (e.g., cover device 200 in FIG. 2) by using a sensor module (e.g., sensor module 176 in FIG. 2) in operation 1211.

The electronic device (e.g., electronic device 101 in FIG. 1) according to various embodiments of the disclosure may receive an installation checkup request of a first application (e.g., inactivated application) from the external electronic device (e.g., cover device 200 in FIG. 2) by using the communication module (e.g., NFC communication module 192-2 in FIG. 2) in operation 1212.

The electronic device (e.g., electronic device 101 in FIG. 1) according to various embodiments of the disclosure may acquire the first application from the server (e.g., server 108 in FIG. 1) by using the communication module (e.g., communication module 190 in FIG. 1A) in operation 1213.

The electronic device (e.g., electronic device 101 in FIG. 1) according to various embodiments of the disclosure may transmit a notification message indicating that the first application has been acquired, to the external electronic device (e.g., cover device 200 in FIG. 2) by using the communication module (e.g., NFC communication module 192-2 in FIG. 2) in operation 1214.

The electronic device (e.g., electronic device 101 in FIG. 1) according to various embodiments of the disclosure may request the external electronic device (e.g., cover device 200 in FIG. 2) to provide application identification information by using the communication module (e.g., NFC communication module 192-2 in FIG. 2) in operation 1215.

The electronic device (e.g., electronic device 101 in FIG. 1) according to various embodiments of the disclosure may receive application identification information from the external electronic device (e.g., cover device 200 in FIG. 2) by using the communication module (e.g., NFC communication module 192-2 in FIG. 2) in operation 1216.

The electronic device (e.g., electronic device 101 in FIG. 1) according to various embodiments of the disclosure may activate the first application by using the application identification information in operation 1217.

Figure 12C:
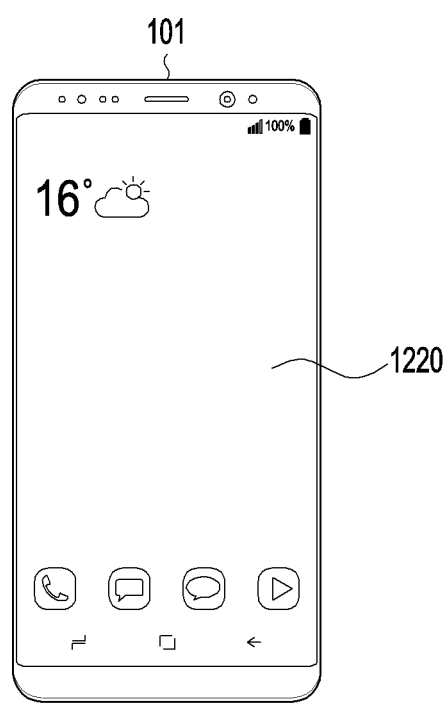

Referring to FIG. 12C, the electronic device 101 according to various embodiments of the disclosure may display no shortcut icon regarding the first application on the screen 1220 if no external electronic device (e.g., cover device 200 in FIG. 2) is coupled thereto.

Figure 12D:
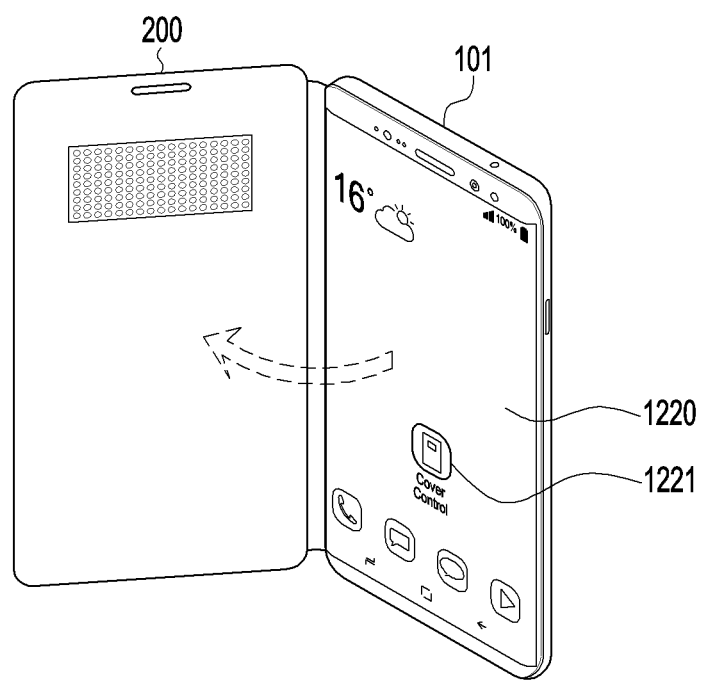

FIG. 12D illustrates an operation in which the front cover portion of the external electronic device is opened after the electronic device 101 and the external electronic device (e.g. cover device 200 in FIG. 2) are connected. According to various embodiments of the disclosure, the first application may be activated according to various embodiments of the disclosure described with reference to FIG. 12A or FIG. 12B, and a shortcut icon 1221 regarding the first application may be displayed on the display of the electronic device 101 as illustrated in FIG. 12D.

Figure 13A:
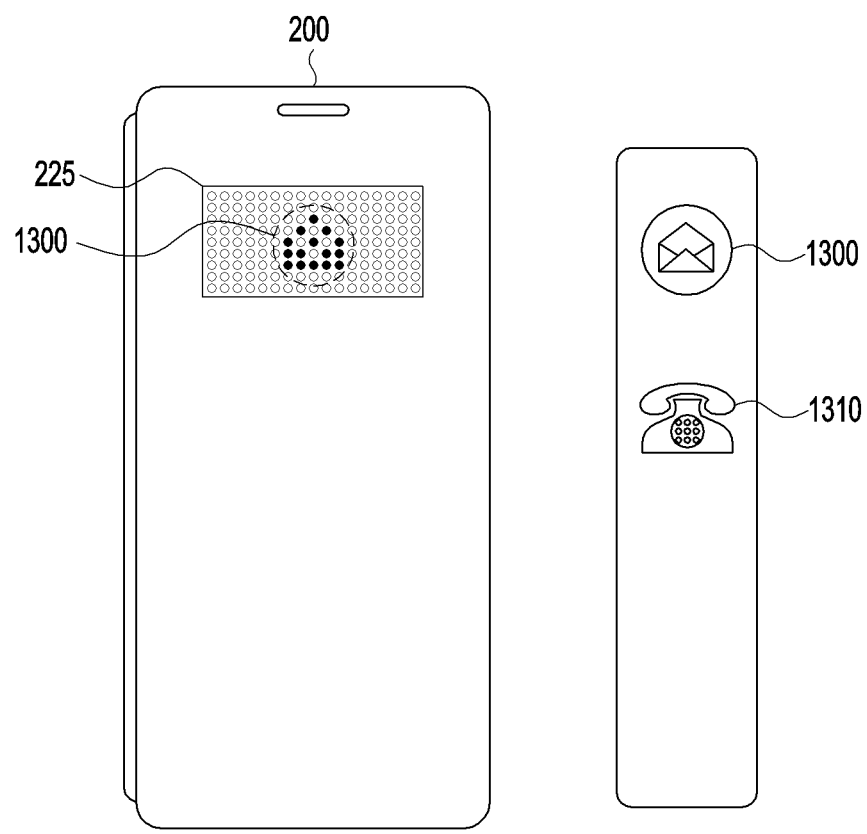
FIG. 13A and FIG. 13B are exemplary diagrams for describing a function or an operation of displaying an interface, which has been updated according to an update of firmware of a cover device, on a cover device according to various embodiments.
Figure 13B:
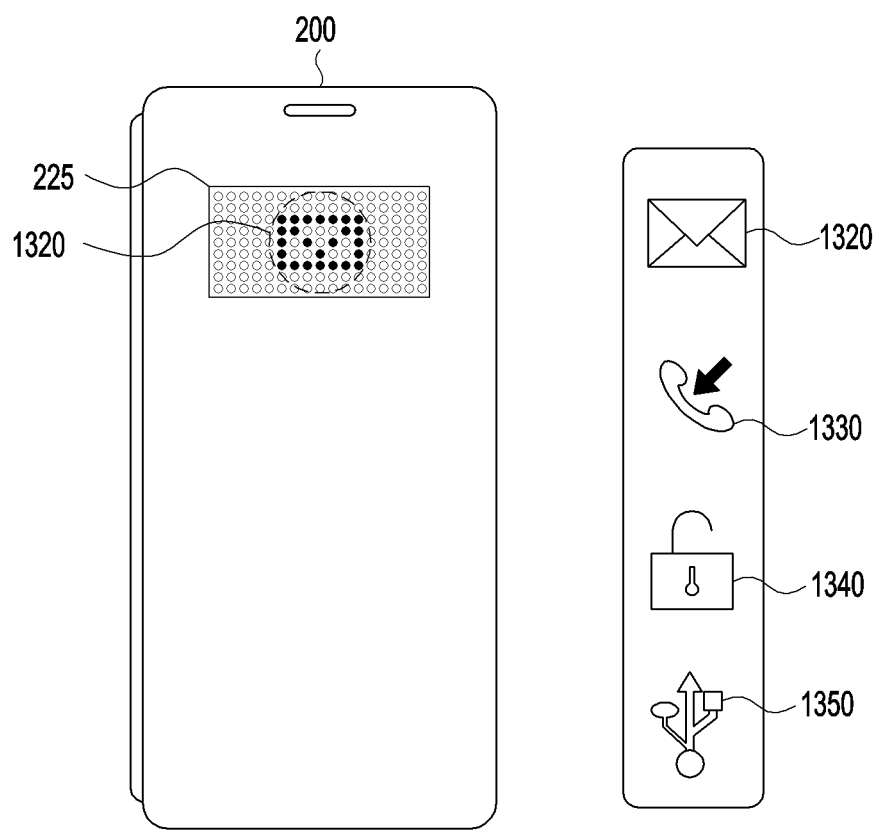

FIG. 13A and FIG. 13B are exemplary diagrams for describing a function or an operation of displaying an interface, which has been updated following an update of firmware of a cover device, on the cover device according to various embodiments.

FIG. 13A illustrates examples of interfaces 1300 and 1310 displayed on the cover device 200 before firmware of the cover device 200 according to various embodiments is fully updated. According to various embodiments of the disclosure, one interface (e.g., interface 1300) of two interfaces 1300 and 1310 having designated shapes may be displayed on the light-emitting element 225 (in other words, display module 220) before the firmware of the cover device 200 is updated.

FIG. 13B illustrates examples of interfaces 1320, 1330, 1340, and 1350 displayed on the cover device 200 after firmware of the cover device 200 according to various embodiments is fully updated. According to various embodiments of the disclosure, after firmware of the cover device 200 is fully updated, the number of interfaces (e.g., interfaces 1320, 1330, 1340, and 1350) that can be displayed on the light-emitting element 225 may increase. According to various embodiments of the disclosure, the shapes of the interfaces (e.g., interfaces 1320 and 1330) may be changed following a firmware update. The light-emitting element 225 according to various embodiments of the disclosure may display one interface (e.g., interface 1320) among four interfaces 1320, 1330, 1340, and 1350 having designated shapes.

Figure 14A:
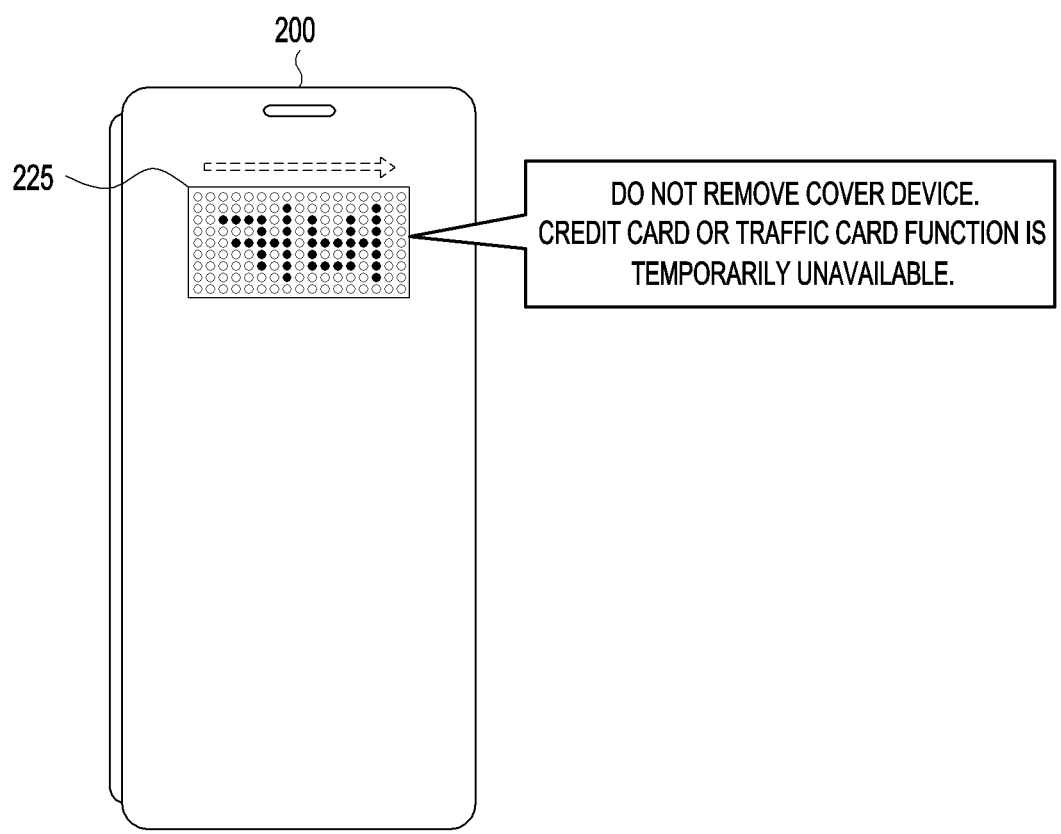
FIG. 14A and FIG. 14B are exemplary diagrams for describing a notification message provided when an electronic device according to various embodiments transmits data to a cover device.
Figure 14B:
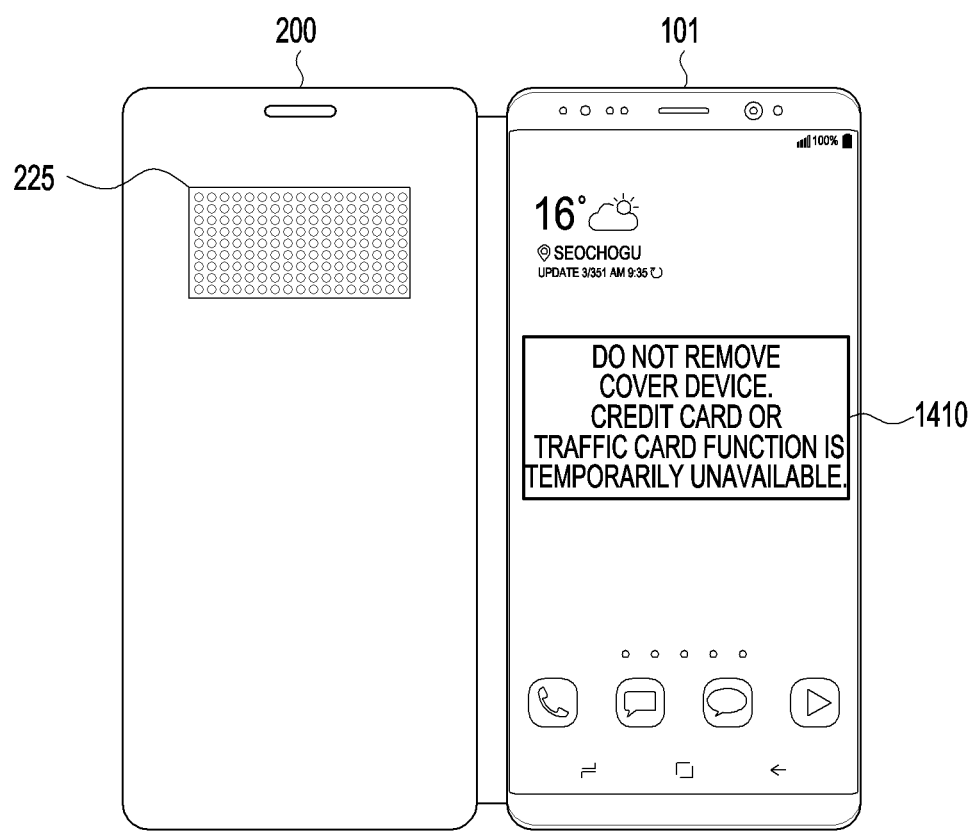

FIG. 14A and FIG. 14B are exemplary diagrams for describing a notification message provided when an electronic device according to various embodiments transmits data to a cover device.

Referring to FIG. 14A, while firmware of the cover device 200 according to various embodiments is updated (in other words, while the reader mode is maintained), a designated message (e.g., "Do not remove cover device. Credit card or traffic card function is temporarily unavailable.") may be displayed on the light-emitting element 225 of the cover device 200 as illustrated in FIG. 14A. FIG. 14A illustrates an embodiment in which the content of the designated message is successively displayed on the light-emitting element 225 due to the limitation on the space of the light-emitting element 225. According to various embodiments of the disclosure, the content of the designated message may be transmitted from the electronic device 101 to the cover device 200 via a radio-frequency signal.

Referring to FIG. 14B, the electronic device 101 according to various embodiments of the disclosure may display a notification message 1410 including the content of a designated message on the display (e.g., display device 160 in FIG. 1) of the electronic device 101.

Figure 15A:
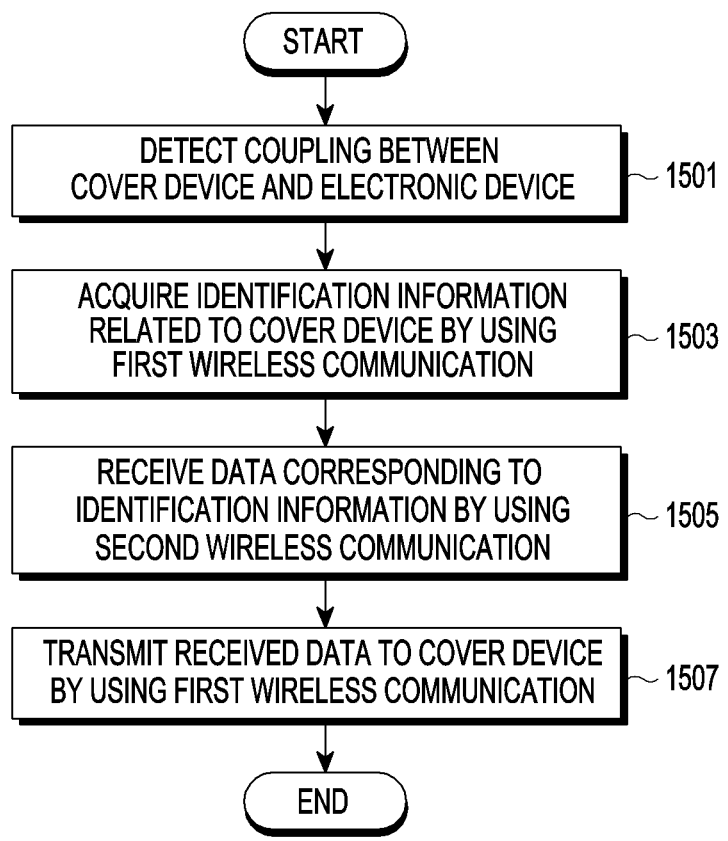
FIGS. 15A, 15B, and 15C are exemplary diagrams for describing a method for operating an electronic device according to various embodiments.
Figure 15B:
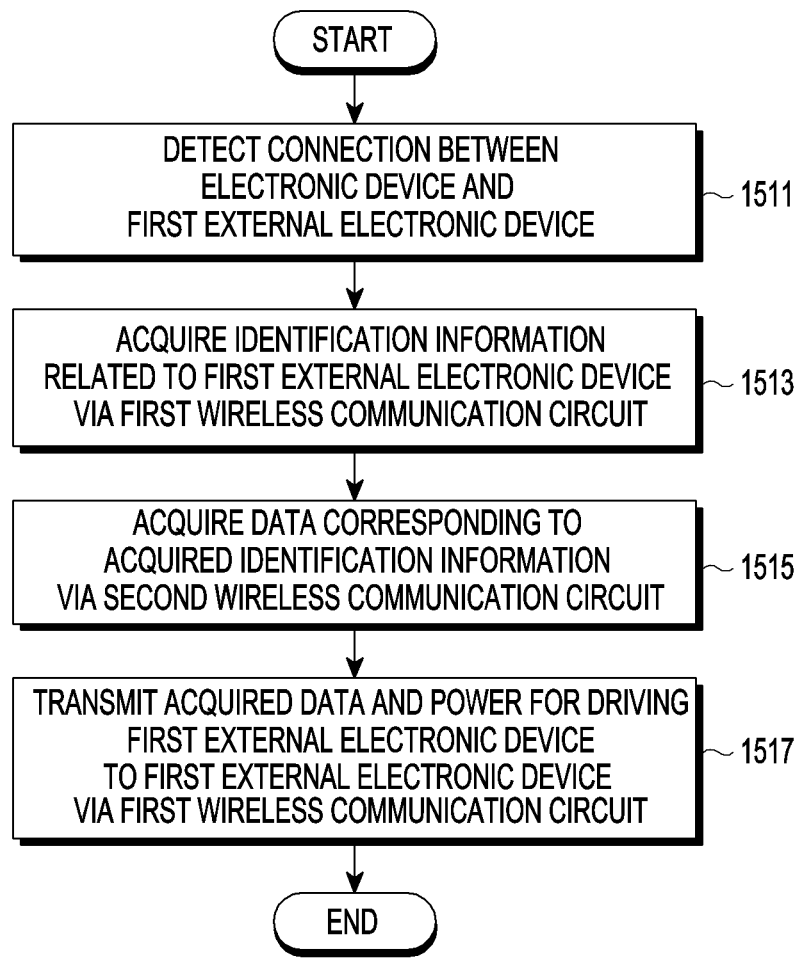
Figure 15C:
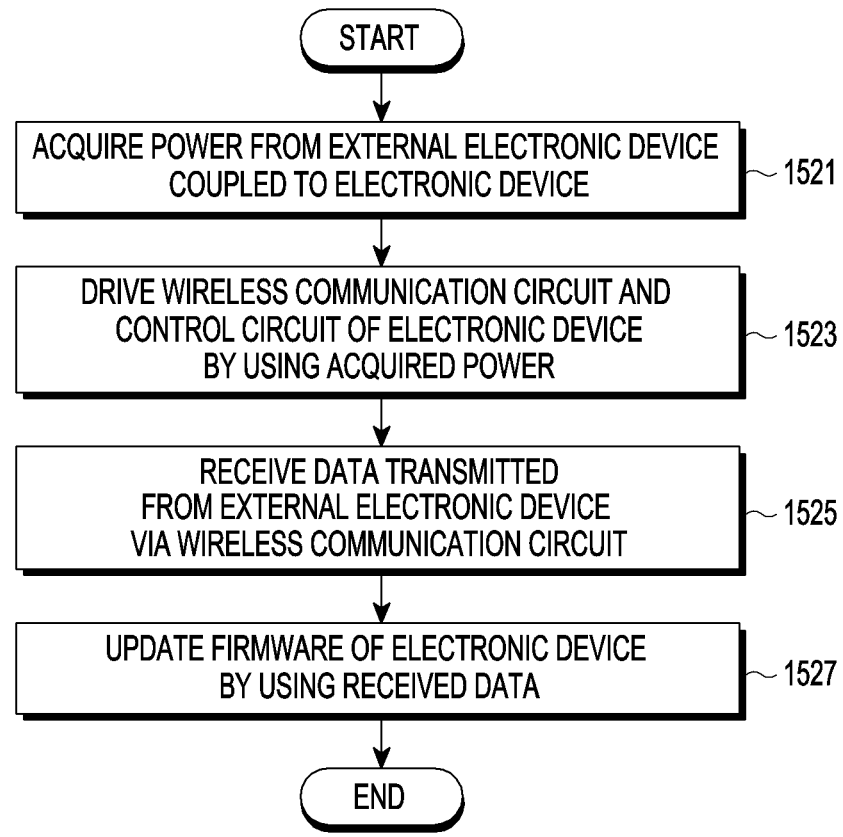

FIG. 15A to FIG. 15C are exemplary diagrams for describing a method for operating an electronic device according to various embodiments.

Referring to FIG. 15A, the electronic device 101 (e.g., processor 120 in FIG. 1A) according to various embodiments of the disclosure may detect coupling between the cover device 200 and the electronic device 101 by using a sensor module (e.g., sensor module 176 in FIG. 2) in operation 1501.

The electronic device 101 (e.g., processor 120 in FIG. 1A) according to various embodiments of the disclosure may acquire identification information related to the cover device 200 from the cover device 200 by using first wireless communication in operation 1503.

The electronic device 101 (e.g., processor 120 in FIG. 1A) according to various embodiments of the disclosure may receive data corresponding to the acquired identification information from the server (e.g., server 703 in FIG. 7) by using second wireless communication in operation 1505.

The electronic device 101 (e.g., processor 120 in FIG. 1A) according to various embodiments of the disclosure may transmit the received data to the cover device 200 by using first wireless communication in operation 1507.

Referring to FIG. 15B, the electronic device 101 (e.g., processor 120 in FIG. 1A) according to various embodiments of the disclosure may detect coupling between a first external electronic device (e.g., cover device 200 in FIG. 2) and the electronic device 101 by using a sensor module (e.g., sensor module 176 in FIG. 2) in operation 1511.

The electronic device 101 (e.g., processor 120 in FIG. 1A) according to various embodiments of the disclosure may acquire identification information related to the first external electronic device (e.g., cover device 200 in FIG. 2) from a second external electronic device (e.g., server 703 in FIG. 7) via a first wireless communication circuit (e.g., NFC communication module 192-2 in FIG. 2) in operation 1513.

The electronic device 101 (e.g., processor 120 in FIG. 1A) according to various embodiments of the disclosure may acquire data corresponding to the acquired identification information from a second external electronic device (e.g., server 703 in FIG. 7) via a second wireless communication circuit (e.g., communication module 190 in FIG. 1A) in operation 1515.

The electronic device 101 (e.g., processor 120 in FIG. 1A) according to various embodiments of the disclosure may transmit the acquired data and power for driving the first external electronic device (e.g., cover device 200 in FIG. 2) to the first external electronic device (e.g., cover device 200 in FIG. 2) via the first wireless communication circuit (e.g., NFC communication module 192-2 in FIG. 2) in operation 1517.

Referring to FIG. 15C, the electronic device 200 (e.g., second processor 221 in FIG. 3) according to various embodiments of the disclosure may acquire power from an external electronic device (e.g. electronic device 101 in FIG. 1) coupled to the electronic device 200 in operation 1521.

The electronic device 200 (e.g., second processor 221 in FIG. 3) according to various embodiments of the disclosure may drive the wireless communication circuit (e.g., wireless communication circuit 212 in FIG. 3) of the electronic device 200 and the control circuit (e.g., control module 210 in FIG. 2) thereof by using the acquired power in operation 1523.

The electronic device 200 (e.g., second processor 221 in FIG. 3) according to various embodiments of the disclosure may receive data transmitted from the external electronic device (e.g. electronic device 101 in FIG. 1) via the wireless communication circuit (e.g., wireless communication circuit 212 in FIG. 2) in operation 1525.

The electronic device 200 (e.g., second processor 221 in FIG. 3) according to various embodiments of the disclosure may update firmware of the electronic device 200 by using the received data in operation 1527.

Figure 16:
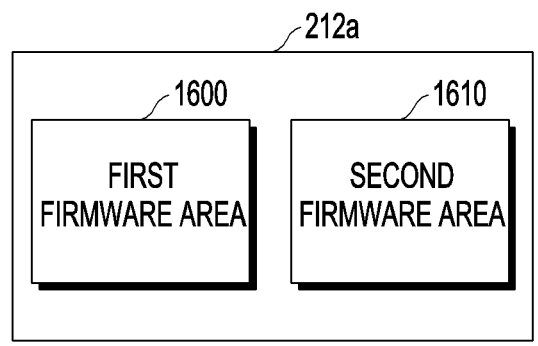
FIG. 16 is an exemplary diagram for describing the structure of a memory of a cover device according to various embodiments.

FIG. 16 is an exemplary diagram for describing the structure of a memory of a cover device 200 according to various embodiments.

Referring to FIG. 16, the memory 212a of the cover device 200 according to various embodiments of the disclosure may include a first firmware area 1600 configured to store data regarding firmware currently executed in the cover device 200 and a second firmware area 1610 configured to store FOTA data transmitted from the electronic device 101. According to various embodiments of the disclosure, the first firmware area 1600 and the second firmware 1610 may be logically divided areas. According to various embodiments of the disclosure, the memory 212a may include, depending on the storage capacity thereof, a single memory area (in other words, the area is not logically divided) or may include multiple logically divided memory areas as illustrated in FIG. 16. For example, if the storage capacity of the memory 212a is equal to or lower than a threshold capacity (in other words, if the same has a relatively small storage capacity), the memory 212a may include a single memory area. If the storage capacity of the memory 212a exceeds the threshold capacity (in other words, if the same has a relatively large storage capacity), the memory 212a may include multiple logically divided memory areas as illustrated in FIG. 16.

Figure 17:
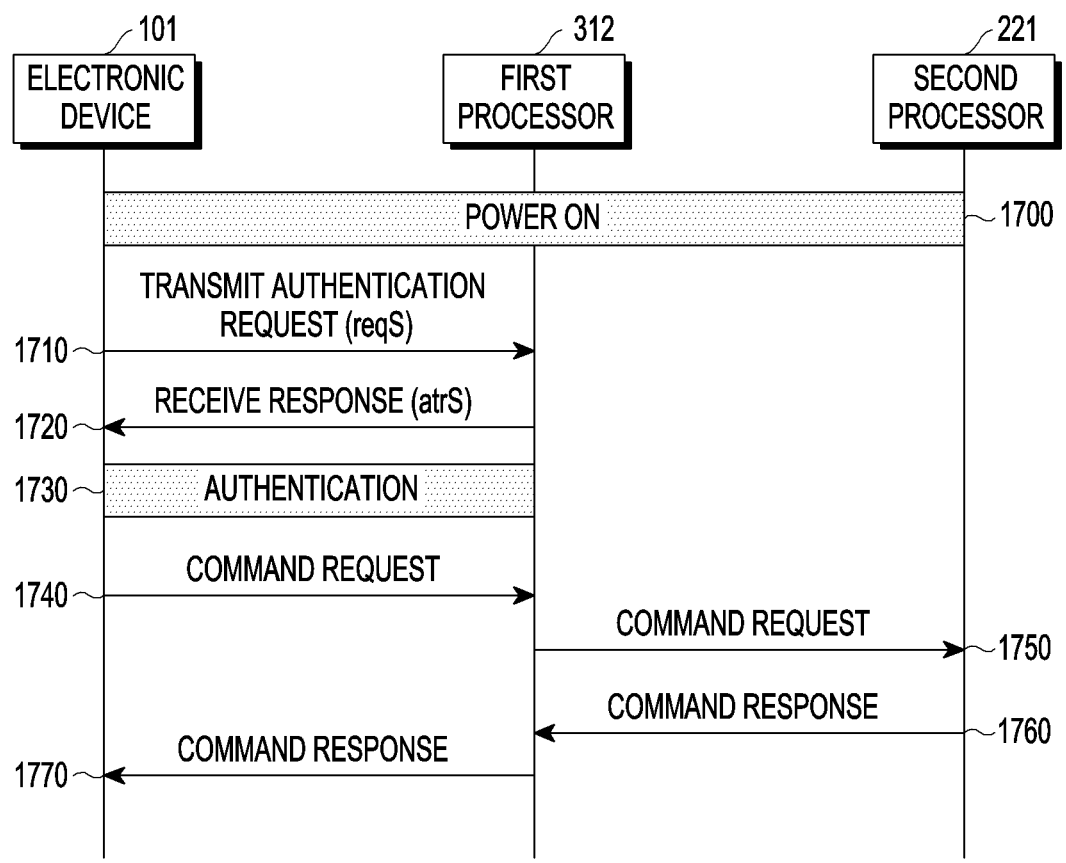
FIG. 17 is an exemplary diagram for describing a function or an operation of controlling a cover device, after an electronic device and the cover device perform authentication, according to various embodiments.

FIG. 17 is an exemplary diagram for describing a function or an operation of controlling a cover device, after an electronic device and the cover device perform authentication, according to various embodiments.

Referring to FIG. 17, the electronic device 101, the first processor 312, and the second processor 221 according to various embodiments of the disclosure may be supplied with power and enter a power-on state in operation 1700.

The electronic device 101 (e.g., processor 120 in FIG. 1A) according to various embodiments of the disclosure may transmit an authentication request (reqS) by using a communication module (e.g., NFC communication module 192-2 in FIG. 2) in operation 1710.

The electronic device 101 (e.g., processor 120 in FIG. 1A) according to various embodiments of the disclosure may receive a response (atrS) to the authentication request (reqS) by using the communication module (e.g., NFC communication module 192-2 in FIG. 2) in operation 1720.

The electronic device 101 (e.g., processor 120 in FIG. 1A) according to various embodiments of the disclosure may perform authentication with the first processor 312 by using the communication module (e.g., NFC communication module 192-2 in FIG. 2) in operation 1730.

The electronic device 101 (e.g., processor 120 in FIG. 1A) according to various embodiments of the disclosure may transmit a command (CMD) request for performing a designated operation to the first processor 312 by using the communication module (e.g., NFC communication module 192-2 in FIG. 2) in operation 1740.

The first processor 132 according to various embodiments of the disclosure may transmit the command request to the second processor 221 in operation 1750.

The second processor 221 according to various embodiments of the disclosure may transmit a response to the command request to the first processor 312 in operation 1760.

The electronic device 101 (e.g., processor 120 in FIG. 1A) according to various embodiments of the disclosure may receive the response to the command request from the first processor 312 by using the communication module (e.g., NFC communication module 192-2 in FIG. 2) in operation 1770.

Figure 18:
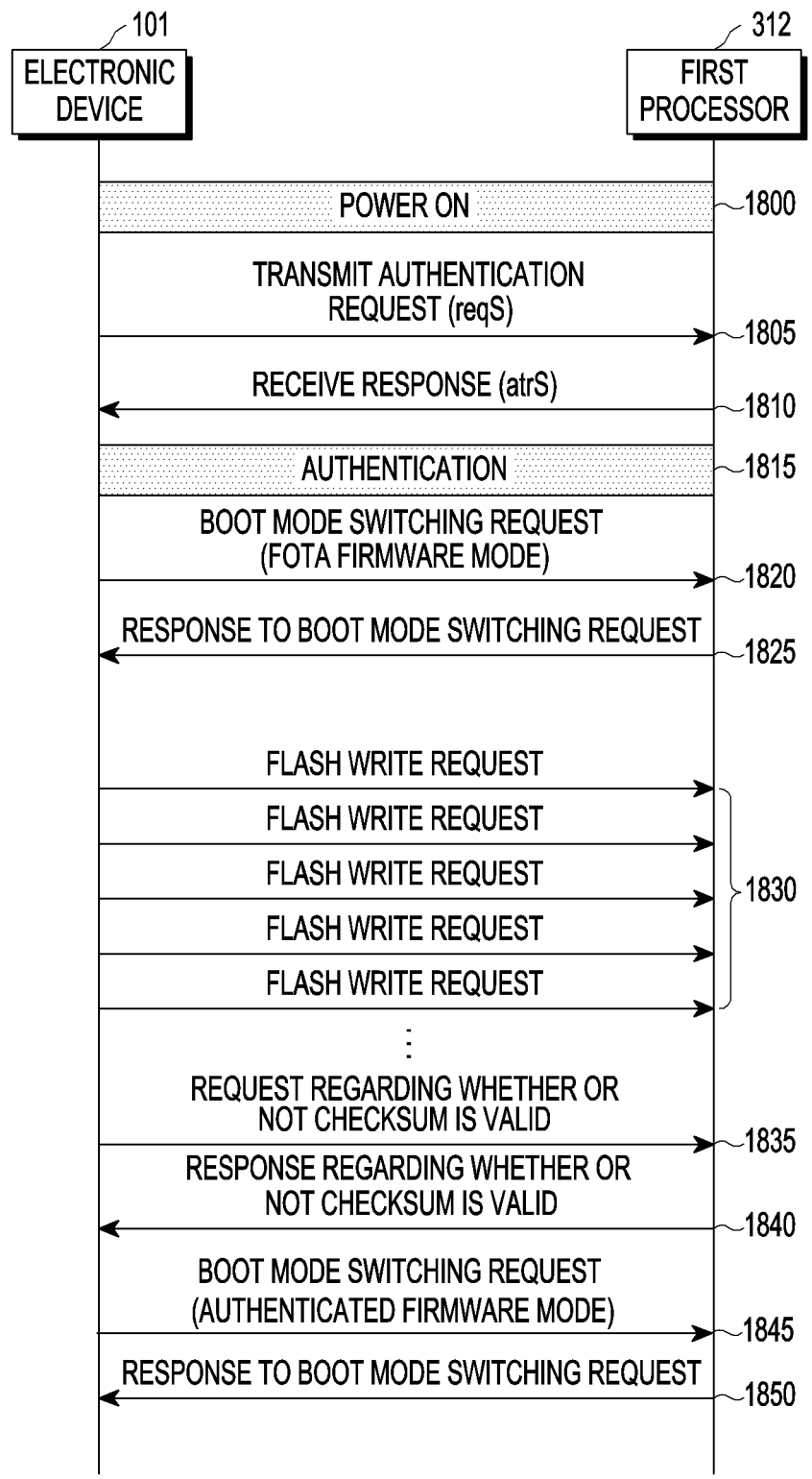
FIG. 18 is an exemplary diagram for describing a function or an operation of updating firmware related to an authentication module, after an electronic device and a cover device perform authentication, according to various embodiments.

FIG. 18 is an exemplary diagram for describing a function or an operation of updating firmware related to a first processor, after an electronic device and a cover device perform authentication, according to various embodiments.

Referring to FIG. 18, the electronic device 101 (e.g., processor 120 in FIG. 1A) and the first processor 312 according to various embodiments of the disclosure may be supplied with power and enter a power-on mode in operation 1800.

The electronic device 101 (e.g., processor 120 in FIG. 1A) according to various embodiments of the disclosure may transmit an authentication request (reqS) by using a communication module (e.g., NFC communication module 192-2 in FIG. 2) in operation 1805. In connection with the authentication request (reqS) according to various embodiments of the disclosure, "S" may refer to the type (e.g., type S) of the NFC non-standard protocol.

The electronic device 101 (e.g., processor 120 in FIG. 1A) according to various embodiments of the disclosure may receive a response (atrS) to the authentication request (reqS) by using the communication module (e.g., NFC communication module 192-2 in FIG. 2) in operation 1810. In connection with the authentication response (atrS) according to various embodiments of the disclosure, "S" may refer to the type (e.g., type S) of the NFC non-standard protocol.

The electronic device 101 (e.g., processor 120 in FIG. 1A) according to various embodiments of the disclosure may perform authentication with the first processor 312 by using the communication module (e.g., NFC communication module 192-2 in FIG. 2) in operation 1815.

The electronic device 101 (e.g., processor 120 in FIG. 1A) according to various embodiments of the disclosure may transmit a request for switching the boot mode of the cover device 200 or the first processor 312 to the first processor 312 by using the communication module (e.g., NFC communication module 192-2 in FIG. 2) in operation 1820. According to various embodiments of the disclosure, the request for switching the boot mode may include a request for switching from an authenticated firmware (F/W) mode to an FOTA firmware (F/W) mode.

The electronic device 101 (e.g., processor 120 in FIG. 1A) according to various embodiments of the disclosure may receive a response to boot mode switching by using the communication module (e.g., NFC communication module 192-2 in FIG. 2) in operation 1825.

The electronic device 101 (e.g., processor 120 in FIG. 1A) according to various embodiments of the disclosure may transmit data for updating firmware of the first processor 312 (e.g., flash write request) to the first processor 312 by using the communication module (e.g., NFC communication module 192-2 in FIG. 2) in operation 1830.

The electronic device 101 (e.g., processor 120 in FIG. 1A) according to various embodiments of the disclosure may transmit a request regarding whether or not the checksum is valid to the first processor 312 by using the communication module (e.g., NFC communication module 192-2 in FIG. 2) in operation 1835.

The electronic device 101 (e.g., processor 120 in FIG. 1A) according to various embodiments of the disclosure may receive a request regarding whether or not the checksum is valid from the first processor 312 by using the communication module (e.g., NFC communication module 192-2 in FIG. 2) in operation 1840.

If the checksum is valid, the electronic device 101 (e.g., processor 120 in FIG. 1A) according to various embodiments of the disclosure may transmit a request for switching the boot mode of the cover device 200 or the first processor 312 to an authenticated firmware mode to the authentication module 212*b* by using the communication module (e.g., NFC communication module 192-2 in FIG. 2) in operation 1845.

The electronic device 101 (e.g., processor 120 in FIG. 1A) according to various embodiments of the disclosure may receive a response to the request according to operation 1845 from the authentication module 212*b* by using the communication module (e.g., NFC communication module 192-2 in FIG. 2) in operation 1850.

Figure 19:
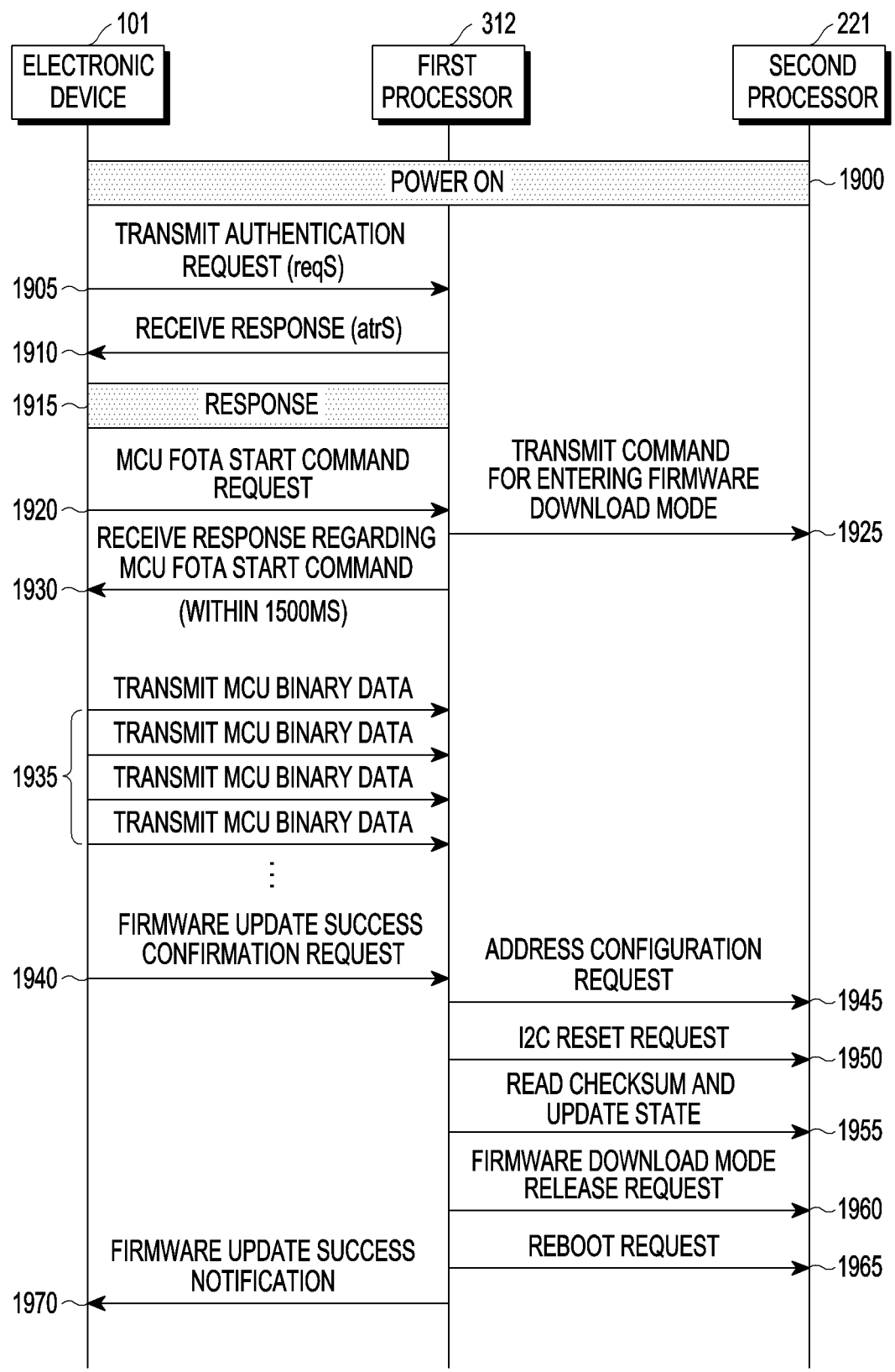
FIG. 19 is an exemplary diagram for describing a function or an operation of updating firmware related to a processor, after an electronic device and a cover device perform authentication, according to various embodiments.

FIG. 19 is an exemplary diagram for describing a function or an operation of updating firmware related to a second processor 221, after an electronic device 101 and a cover device 200 perform authentication, according to various embodiments.

Referring to FIG. 19, the electronic device 101 (e.g., processor 120 in FIG. 1A), the first processor 312, and the second processor 221 according to various embodiments of the disclosure may be supplied with power and enter a power-on state in operation 1900.

The electronic device 101 (e.g., processor 120 in FIG. 1A) according to various embodiments of the disclosure may transmit an authentication request (reqS) by using a communication module (e.g., NFC communication module 192-2 in FIG. 2) in operation 1905.

The electronic device 101 (e.g., processor 120 in FIG. 1A) according to various embodiments of the disclosure may receive a response (atrS) to the authentication request (reqS) by using the communication module (e.g., NFC communication module 192-2 in FIG. 2) in operation 1910.

The electronic device 101 (e.g., processor 120 in FIG. 1A) according to various embodiments of the disclosure may perform authentication with the first processor 312 by using the communication module (e.g., NFC communication module 192-2 in FIG. 2) in operation 1915.

The electronic device 101 (e.g., processor 120 in FIG. 1A) according to various embodiments of the disclosure may transmit a command (CMD) for starting FOTA of the second processor 221 to the first processor 312 by using the communication module (e.g., NFC communication module 192-2 in FIG. 2) in operation 1920.

The first processor 312 according to various embodiments of the disclosure may transmit a command that instructs the cover device 200 or the second processor 221 to enter a firmware (F/W) download mode to the second processor 221, according to the command transmitted from the electronic device 101, in operation 1925.

The electronic device 101 (e.g., processor 120 in FIG. 1A) according to various embodiments of the disclosure may receive a response to the command that instructs firmware (F/W) download mode entry from the first processor 312 by using the communication module (e.g., NFC communication module 192-2 in FIG. 2) in operation 1930. According to various embodiments of the disclosure, after the first processor 312 transmits a response according to operation 1930 to the electronic device 101, the second processor 221 may delete firmware data regarding the second processor 221 stored in the memory (e.g., memory 212a in FIG. 2A) (in other words, firmware data currently stored in the cover device 200) within 1500 ms (sec).

The electronic device 101 (e.g., processor 120 in FIG. 1A) according to various embodiments of the disclosure may transmit FOTA data (e.g., MCU binary data) for performing FOTA of the second processor 221 to the first processor 312 by using the communication module (e.g., NFC communication module 192-2 in FIG. 2) in operation 1935.

The electronic device 101 (e.g., processor 120 in FIG. 1A) according to various embodiments of the disclosure may transmit a request for confirming whether or not firmware of the second processor 221 has been successfully updated to the first processor 312 by using the communication module (e.g., NFC communication module 192-2 in FIG. 2) in operation 1940. According to various embodiments of the disclosure, the request for confirming whether or not the firmware has been successfully updated may include a checksum confirmation request.

The first processor 312 according to various embodiments of the disclosure may request the second processor 221 to configure an address regarding the checksum and the firmware update state in operation 1945.

The first processor 312 according to various embodiments of the disclosure may request the second processor 221 to reset inter-IC (I2C) in operation 1950.

The first processor 312 according to various embodiments of the disclosure may request the second processor 221 to read the checksum and the firmware update state in operation 1955.

The first processor 312 according to various embodiments of the disclosure may transmit a command for requesting release of the firmware download mode to the second processor 221 in operation 1960.

The first processor 312 according to various embodiments of the disclosure may transmit a request for rebooting the second processor 221 to the second processor 221 in operation 1965.

The electronic device 101 (e.g., processor 120 in FIG. 1A) according to various embodiments of the disclosure may receive a response indicating a successful firmware update from the first processor 312 by using the communication module (e.g., NFC communication module 192-2 in FIG. 2) in operation 1970.

Figure 20:
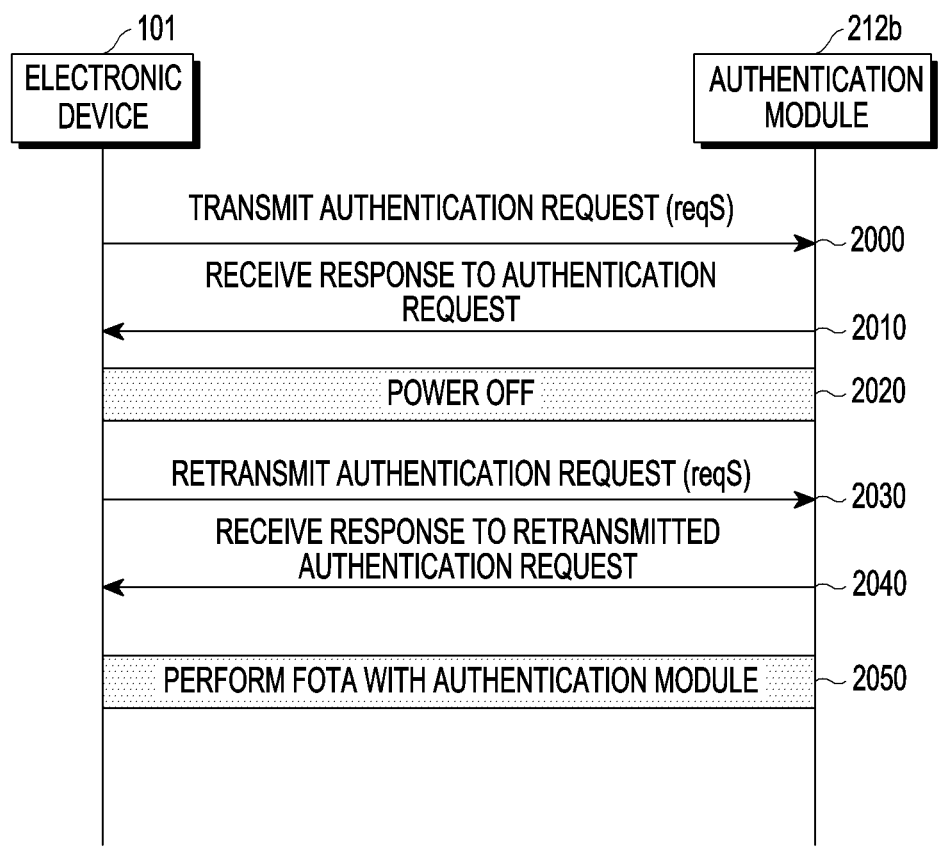
FIG. 20 is an exemplary diagram for describing a function or an operation of performing an additional update, when a firmware update regarding an authentication module of a cover device has failed, according to various embodiments.
Figure 21:
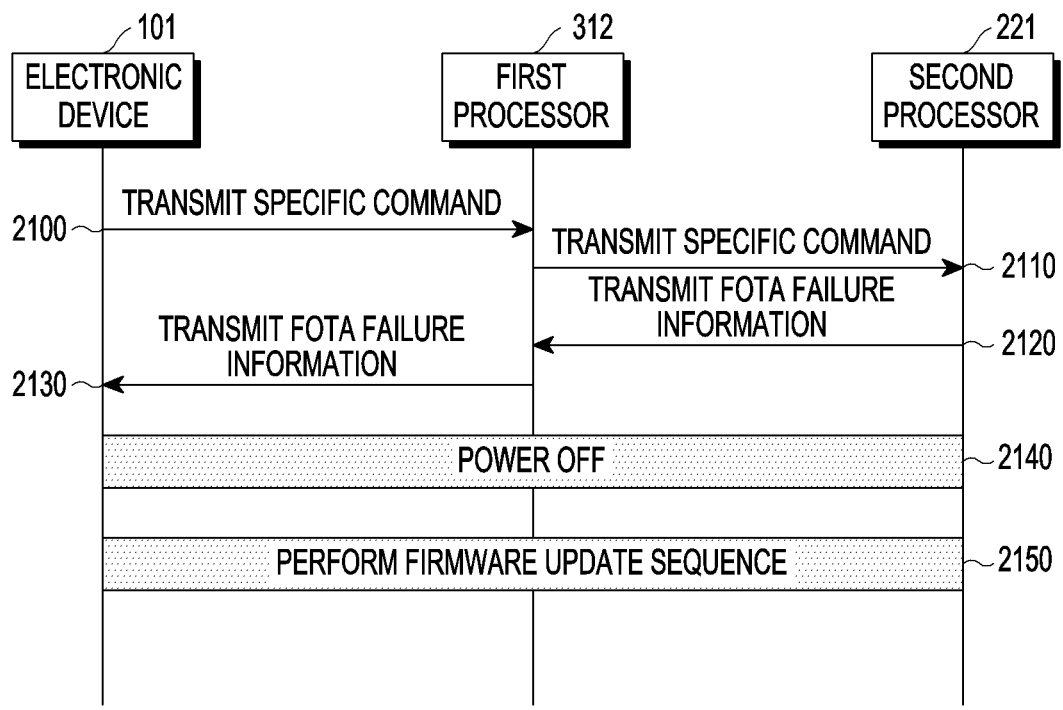
FIG. 21 is an exemplary diagram for describing a function or an operation of performing an additional update, when a firmware update regarding a processor of a cover device has failed, according to various embodiments.

According to various embodiments of the disclosure, an event such as a firmware update failure may occur due to occurrence of an event such as separation of the cover device 200 from the electronic device while the firmware of the cover device 200 is updated. FIG. 20 and FIG. 21 illustrate a function or an operation of performing an additional update in the case of such a failure to update the firmware of the cover device 200.

FIG. 20 is an exemplary diagram for describing a function or an operation of performing an additional update, when a firmware update regarding an authentication module of a cover device has failed, according to various embodiments.

Referring to FIG. 20, the electronic device 101 according to various embodiments of the disclosure may transmit an authentication request (reqS) for performing authentication with an authentication module 212b by using a communication module (e.g., NFC communication module 192-2 in FIG. 2) in operation 2000.

The electronic device 101 according to various embodiments of the disclosure may receive a response including specific data (e.g., data indicating failure of FOTA, such as "00 (false)") from the authentication module 212b by using the communication module (e.g., NFC communication module 192-2 in FIG. 2) in operation 2010.

The electronic device 101 according to various embodiments of the disclosure may switch the state of the communication module (e.g., NFC communication module 192-2 in FIG. 2) to a power-off state, in response to receiving specific data transmitted from the authentication module 212b, in operation 2020.

Referring to FIG. 20, the electronic device 101 according to various embodiments of the disclosure may retransmit an authentication request (reqS) for performing authentication with the authentication module 212b by using the communication module (e.g., NFC communication module 192-2 in FIG. 2) in operation 2030. In order to transmit the authentication request, the electronic device 101 according to various embodiments of the disclosure may supply power to the communication module (e.g., NFC communication module 192-2 in FIG. 2) such that the state of the communication module switches to a power-on state.

The electronic device 101 according to various embodiments of the disclosure may again receive a response to the retransmitted authentication request, including specific data (e.g., data indicating failure of FOTA, such as "00 (false)"), from the authentication module 212b by using the communication module (e.g., NFC communication module 192-2 in FIG. 2) in operation 2040.

Upon again receiving the response including specific data (e.g., data indicating failure of FOTA, such as "00 (false)"), from the authentication module 212b, the electronic device 101 according to various embodiments of the disclosure may perform FOTA with the authentication module 212b by using the communication module (e.g., NFC communication module 192-2 in FIG. 2) in operation 2050. In connection with operation 2050, the same FOTA sequence of the authentication module 212b described with reference to FIG. 18 may be applied.

FIG. 21 is an exemplary diagram for describing a function or an operation of performing an additional update, when a firmware update regarding a processor of a cover device has failed, according to various embodiments.

Referring to FIG. 21, the electronic device 101 according to various embodiments of the disclosure may transmit a specific command regarding the second processor 221 to the first processor 312 by using a communication module (e.g., NFC communication module 192-2 in FIG. 2) in operation 2100.

The first processor 312 according to various embodiments of the disclosure may transmit the specific command regarding the second processor 221 received from the electronic device 101 to the second processor 221 in operation 2110.

The second processor 221 according to various embodiments of the disclosure may transmit erroneous (in other words, unexpected) cyclic redundancy check (CRC) information resulting from FOTA failure to the first processor 312 in operation 2120.

The first processor 312 according to various embodiments of the disclosure may transmit the erroneous CRC information received from the second processor 221 to the electronic device 101 in operation 2130.

The electronic device 101 according to various embodiments of the disclosure may block power supplied to the communication module (e.g., NFC communication module 192-2 in FIG. 2) such that the state of the communication module (e.g., NFC communication module 192-2 in FIG. 2) is switched to a power-off state in operation 2140.

The electronic device 101 according to various embodiments of the disclosure may perform a firmware update sequence regarding the second processor 221 by using the communication module (e.g., NFC communication module 192-2 in FIG. 2) in operation 2150. The electronic device 101 according to various embodiments of the disclosure may supply power to the communication module (e.g., NFC communication module 192-2 in FIG. 2), in order to perform operation 2150, such that the state of the communication module (e.g., NFC communication module 192-2 in FIG. 2) is switched to a power-on state. According to various embodiments of the disclosure, in connection with operation 2150, the same FOTA sequence of the second processor 221 described with reference to FIG. 19 may be applied.

Figure 22:
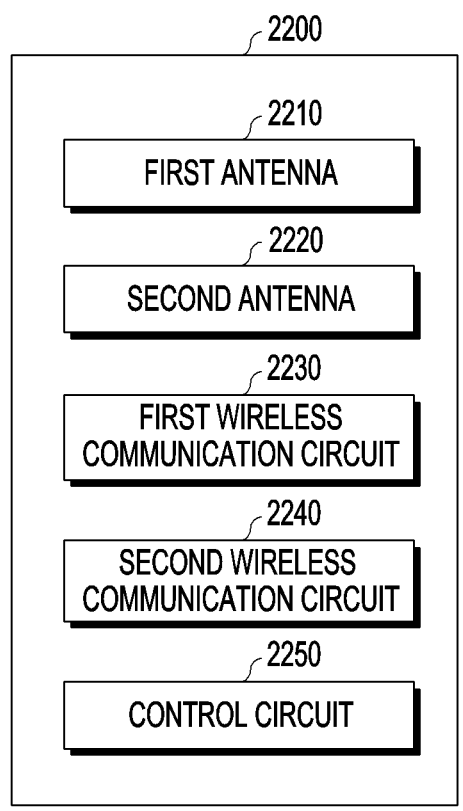
FIG. 22 is an exemplary diagram for describing an electronic device according to various embodiments.

FIG. 22 is an exemplary diagram for describing an electronic device according to various embodiments.

The electronic device 2200 (e.g. electronic device 101) according to various embodiments of the disclosure may include a first antenna 2210 (e.g. NFC antenna 197-3 in FIG. 2), a second antenna 2220 (e.g., antenna module 197 in FIG. 1B), a first wireless communication circuit 2230 (e.g., NFC communication module 192-2 in FIG. 2), a second wireless communication circuit 2240 (e.g., communication module 190 in FIG. 1A), and a control circuit 2250 (e.g., processor 120 in FIG. 1A).

The first antenna 2210 according to various embodiments of the disclosure may be connected to the first wireless communication circuit 2230 and configured to provide first wireless communication. The second antenna 2210 according to various embodiments of the disclosure may be connected to the second wireless communication circuit 2240 and configured to provide second wireless communication. The control circuit 2250 according to various embodiments of the disclosure may drive software (e.g., program 140), for example, so as to control at least one different component (e.g., hardware or software component) of the electronic device 2200, connected to the control circuit 2250, and to perform various kinds of data processing and computation. The electronic device 2200 according to various embodiments of the disclosure may perform at least some of the functions or operations performed by the electronic device 101 in FIG. 1A.

An electronic device (e.g., electronic device 101 in FIG. 1) according to various embodiments of the disclosure may include: a housing; a first antenna (e.g., NFC antenna 197-3 in FIG. 2 or first antenna 2210 in FIG. 22) and a second antenna (antenna module 197 in FIG. 1B or second antenna 2220 in FIG. 22) housed in the housing; a first wireless communication circuit (e.g., NFC communication module 192-2 in FIG. 2 or first wireless communication circuit 2230 in FIG. 22) configured to provide first wireless communication by using the first antenna; a second wireless communication circuit (e.g., communication module 190 in FIG. 1A or second wireless communication circuit 2240 in FIG. 22) configured to provide second wireless communication by using the second antenna; and a control circuit (e.g., processor 120 in FIG. 1A or control circuit 2250 in FIG. 22) housed in the housing and operably connected to the first wireless communication circuit and the second wireless communication circuit. The control circuit may be configured to: detect coupling between a cover device that can be coupled to a surface of the electronic device and the electronic device, the cover device including a third antenna (e.g., first antenna 250 or second antenna 260) and a third wireless communication circuit (wireless communication circuit 212 in FIG. 2) configured to provide the first wireless communication by using the third antenna; acquire identification information related to the cover device from the cover device via the first wireless communication circuit, at least based on the detection; acquire data corresponding to the identification information from an external electronic device (e.g., server 108 in FIG. 1) via the second wireless communication circuit; and transmit the data to the third wireless communication circuit included in the cover device via the first wireless communication circuit.

According to various embodiments of the disclosure, the data transmitted to the third wireless communication circuit may include data for updating a program of the cover device.

According to various embodiments of the disclosure, the control circuit may be further configured to reacquire identification information of the cover device via the first wireless communication circuit when a notification message indicating an update regarding the program of the cover device has been received from the external electronic device via the second communication circuit.

According to various embodiments of the disclosure, the electronic device may further include a memory configured to store the acquired identification information. The control circuit may be configured to: compare, when a notification message indicating an update regarding the program of the cover device has been received from the external electronic device via the second communication circuit, identification information included in the notification message with identification information stored in the memory; and acquire data corresponding to the identification information from the external electronic device via the second wireless communication circuit, at least based on the result of comparison.

According to various embodiments of the disclosure, the control circuit may be configured to transmit data regarding an application program that can be executed in the cover device as at least a part of the data transmitted to the third wireless communication circuit.

According to various embodiments of the disclosure, the control circuit may be configured to transmit the data acquired from the external electronic device to the third wireless communication circuit, based on at least some of designated time information, designated position information, and use pattern information of the electronic device.

According to various embodiments of the disclosure, the electronic device may further include a touch screen display (e.g., display device 160 in FIG. 1) exposed through at least a part of the housing. The control circuit may be configured to receive, from the cover device, application identification information for displaying an interface for executing an inactivated application program on the touch screen display via the first communication circuit, if connection of the cover device is detected.

According to various embodiments of the disclosure, the control circuit may be configured to display an interface for executing the inactivated application program on the touch screen display when the received application identification information is identical to application identification information stored in the electronic device.

According to various embodiments of the disclosure, the first wireless communication may include short-range wireless communication. The short-range wireless communication may include at least one of NFC communication, RFID communication, Bluetooth, Wi-Fi direct, and IrDA communication. The second wireless communication may include long-range wireless communication. The long-range wireless communication may include at least one of cellular communication, Wi-Fi, Internet, LAN, and WAN.

An electronic device according to various embodiments of the disclosure may include: a first antenna (e.g., NFC antenna 197-3 in FIG. 2 or first antenna 2210 in FIG. 22) configured to provide short-range wireless communication; a second antenna (e.g., antenna module 197 in FIG. 1B or second antenna 2220 in FIG. 22) configured to provide long-range wireless communication; a first wireless communication circuit (e.g., NFC communication module 192-2 in FIG. 2 or first wireless communication circuit 2230 in FIG. 22) configured to perform communication with a first external electronic device (e.g., cover device 200 in FIG. 2) by using the first antenna; a second wireless communication circuit (e.g., communication module 190 in FIG. 1A or second wireless communication circuit 2240 in FIG. 22) configured to perform communication with a second external electronic device (e.g., server 108 in FIG. 1) by using the second antenna; and a control circuit (e.g., processor 120 in FIG. 1A or control circuit 2250 in FIG. 22) operably connected to the first wireless communication circuit and the second wireless communication circuit. The control circuit may be configured to: detect connection of the first external electronic device with the electronic device via the first wireless communication circuit; acquire identification information related to the first external electronic device from the first external electronic device via the first wireless communication circuit, at least based on the detection; acquire data corresponding to the identification information from the second external electronic device via the second wireless communication circuit; and transmit power for driving the first external electronic device and the data to the first external electronic device via the first wireless communication circuit.

According to various embodiments of the disclosure, the first wireless communication circuit may be configured to operate in one of a first operating mode for transmitting a signal to the first external electronic device and a second operating mode for receiving a signal from the first external electronic device connected to the electronic device or from a third external electronic device adjacent to the electronic device.

According to various embodiments of the disclosure, the control circuit may be configured to transmit power for driving the first external electronic device and the data to the first external electronic device, in the first operating mode.

According to various embodiments of the disclosure, the control circuit may be configured such that, when a signal output from the third external electronic device is detected while transmitting the power and the data to the first external electronic device in the first operating mode, the control circuit switches to the second operating mode and receives the signal output from the third external electronic device.

According to various embodiments of the disclosure, the control circuit may be configured to receive a request for maintaining the first operating mode from the first external electronic device via the first wireless communication circuit.

According to various embodiments of the disclosure, the control circuit may be configured such that, when a signal output from the third external electronic device is detected while transmitting the power and the data to the first external electronic device in the first operating mode, the control circuit switches to the second operating mode and receives the signal output from the third external electronic device after transmission of the data is completed.

An electronic device (e.g. cover device 200 in FIG. 2) according to various embodiments of the disclosure may include: a housing; an antenna (e.g. first antenna 250 in FIG. 2, first antenna 450 in FIG. 4, second antenna 260 in FIG. 2, or second antenna 460 in FIG. 4) housed in the housing; a wireless communication circuit (e.g., wireless communication circuit 212 in FIG. 2) configured to provide wireless communication by using the antenna; and a control circuit (e.g., first processor 312 or second processor 221 in FIG. 3) operably connected to the wireless communication circuit. The control circuit may be configured to: acquire power from an external electronic device (e.g., electronic device 101 in FIG. 1) coupled to a surface of the electronic device, via the wireless communication circuit; receive data transmitted from the external electronic device via the wireless communication circuit while the wireless communication circuit and the control circuit are driven based on the acquired power; and update a program of the electronic device by using the received data.

According to various embodiments of the disclosure, the housing may include a first surface (e.g., first surface 500 in FIG. 5) covering the front surface of the external electronic device and a second surface (e.g., second surface 510 in FIG. 5) covering at least some of the side surface and the rear surface of the external electronic device, and may include a display device exposed through at least a part of the first surface.

According to various embodiments of the disclosure, the display device may include at least one light-emitting element (e.g., light-emitting element 225 in FIG. 3). The light-emitting element may include at least one of a light-emitting diode (LED), an organic LED (OLED), an electrophoretic display (EPD), a liquid crystal display (LCD), and electronic ink (E-ink).

According to various embodiments of the disclosure, the control circuit, the antenna, and the wireless communication module may be housed on the second surface.

According to various embodiments of the disclosure, the electronic device may include a memory (e.g., memory 212a in FIG. 2) configured to store data for updating a program of the electronic device, transmitted from the external electronic device. The memory may include a first program area configured to store data regarding a program currently executed in the electronic device and a second program area configured to store data transmitted from the external electronic device.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a housing;
a first antenna and a second antenna housed in the housing;
a first wireless communication circuit configured to provide first wireless communication using the first antenna;
a second wireless communication circuit configured to provide second wireless communication using the second antenna; and
a control circuit housed in the housing and operably connected to the first wireless communication circuit and the second wireless communication circuit, wherein
the control circuit is configured to:
detect coupling between a cover device coupled to a surface of the electronic device and the electronic device, the cover device comprising a third antenna and a third wireless communication circuit configured to provide the first wireless communication using the third antenna;
acquire identification information related to the cover device from the cover device via the first wireless communication circuit, at least based on the detection;
acquire data corresponding to the identification information from an external electronic device via the second wireless communication circuit; and
transmit the acquired data to the third wireless communication circuit included in the cover device via the first wireless communication circuit,
wherein the data transmitted to the third wireless communication circuit comprises data for updating a program of the cover device, and
wherein the control circuit is configured to reacquire identification information of the cover device via the first wireless communication circuit when a notification message indicating an update regarding the program of the cover device is received from the external electronic device via the second communication circuit.

2. The electronic device of claim 1, further comprising a memory configured to store the acquired identification information, wherein
the control circuit is configured to:
compare, based on the notification message indicating an update regarding the program of the cover device being received from the external electronic device via the second communication circuit, identification information included in the notification message with identification information stored in the memory; and
acquire data corresponding to the identification information from the external electronic device via the second wireless communication circuit, at least based on the result of comparison.

3. The electronic device of claim 1, wherein the control circuit is configured to transmit data regarding an application program being executed in the cover device as at least a part of the data transmitted to the third wireless communication circuit.

4. The electronic device of claim 1, wherein the control circuit is configured to transmit the data acquired from the external electronic device to the third wireless communication circuit, based on at least one of designated time information, designated position information, or use pattern information of the electronic device.

5. The electronic device of claim 1, wherein the electronic device further comprises a touch screen display exposed through at least a part of the housing, and
the control circuit is configured to receive, from the cover device, application identification information for displaying an interface for executing an inactivated application program on the touch screen display via the first communication circuit, based on connection of the cover device being detected.

6. The electronic device of claim 5, wherein the control circuit is configured to display the interface for executing the inactivated application program on the touch screen display when the received application identification information is identical to application identification information stored in the electronic device.

7. The electronic device of claim 1, wherein the first wireless communication comprises short-range wireless communication; the short-range wireless communication comprises at least one of NFC communication, RFID communication, Bluetooth, Wi-Fi direct, or infrared data association (IrDA) communication; the second wireless communication comprises long-range wireless communication; and the long-range wireless communication comprises at least one of cellular communication, Wi-Fi, Internet, local area network (LAN), or wide area network (WAN).

8. An electronic device comprising:
a first antenna configured to provide short-range wireless communication;
a second antenna configured to provide long-range wireless communication;
a first wireless communication circuit configured to perform communication with a first external electronic device using the first antenna;
a second wireless communication circuit configured to perform communication with a second external electronic device using the second antenna; and
a control circuit operably connected to the first wireless communication circuit and the second wireless communication circuit, wherein
the control circuit is configured to:
detect connection of the first external electronic device with the electronic device via the first wireless communication circuit;
acquire identification information related to the first external electronic device from the first external electronic device via the first wireless communication circuit, at least based on the detection;
acquire data corresponding to the identification information from the second external electronic device via the second wireless communication circuit; and
transmit power for driving the first external electronic device and the data to the first external electronic device via the first wireless communication circuit,
wherein the first wireless communication circuit is configured to operate in one of a first operating mode for transmitting a signal to the first external electronic device or a second operating mode for receiving a signal from the first external electronic device connected to the electronic device or from a third external electronic device adjacent to the electronic device.

9. The electronic device of claim 8, wherein the control circuit is further configured to transmit the power for driving the first external electronic device and the data to the first external electronic device, in the first operating mode.

10. The electronic device of claim 8, wherein the control circuit is configured such that, when a signal output from the third external electronic device is detected while transmitting the power and the data to the first external electronic device in the first operating mode, the control circuit switches to the second operating mode and receives the signal output from the third external electronic device.

11. The electronic device of claim 8, wherein the control circuit is configured to receive a request for maintaining the first operating mode from the first external electronic device via the first wireless communication circuit.

12. The electronic device of claim 11, wherein the control circuit is configured such that, when a signal output from the third external electronic device is detected while transmitting the power and the data to the first external electronic device in the first operating mode, the control circuit switches to the second operating mode and receives the signal output from the third external electronic device after transmission of the data is completed.

* * * * *